United States Patent [19]
Wulff

[11] Patent Number: 6,164,866
[45] Date of Patent: Dec. 26, 2000

[54] AGGREGATE HAULING, SPREADING AND COMPACTING MACHINE

[76] Inventor: Lawrence H. Wulff, P.O. Box 537, Vernon, British Columbia, Canada, V1T 6M4

[21] Appl. No.: 09/086,388

[22] Filed: May 28, 1998

Related U.S. Application Data

[60] Provisional application No. 60/048,714, May 28, 1997, provisional application No. 60/048,716, May 28, 1997, provisional application No. 60/048,717, May 28, 1997, provisional application No. 60/067,104, Dec. 1, 1997, and provisional application No. 60/067,475, Dec. 1, 1997.

[51] Int. Cl.[7] .................................................. E01C 19/18
[52] U.S. Cl. .......................... 404/108; 404/104; 404/127
[58] Field of Search ............................ 104/85, 104, 108, 104/110, 127

[56] References Cited

U.S. PATENT DOCUMENTS

| | | | |
|---|---|---|---|
| 1,782,992 | 11/1930 | Johnson | 404/104 |
| 3,216,337 | 11/1965 | MacDonald | 404/104 |
| 4,861,191 | 8/1989 | Smith et al. | 404/104 |
| 5,344,254 | 9/1994 | Sartain | 404/104 |
| 5,615,973 | 4/1997 | Campbell | 404/110 |

*Primary Examiner*—Thomas B. Will
*Assistant Examiner*—Kristine M. Markovich
*Attorney, Agent, or Firm*—Antony C. Edwards

[57] ABSTRACT

An apparatus for hauling, spreading and compacting asphalt, gravel and like aggregates is a so-called belly-dump or bottom dump trailer with mechanisms for single pass delivery and compaction of aggregates to form road shoulders and the like.

11 Claims, 54 Drawing Sheets

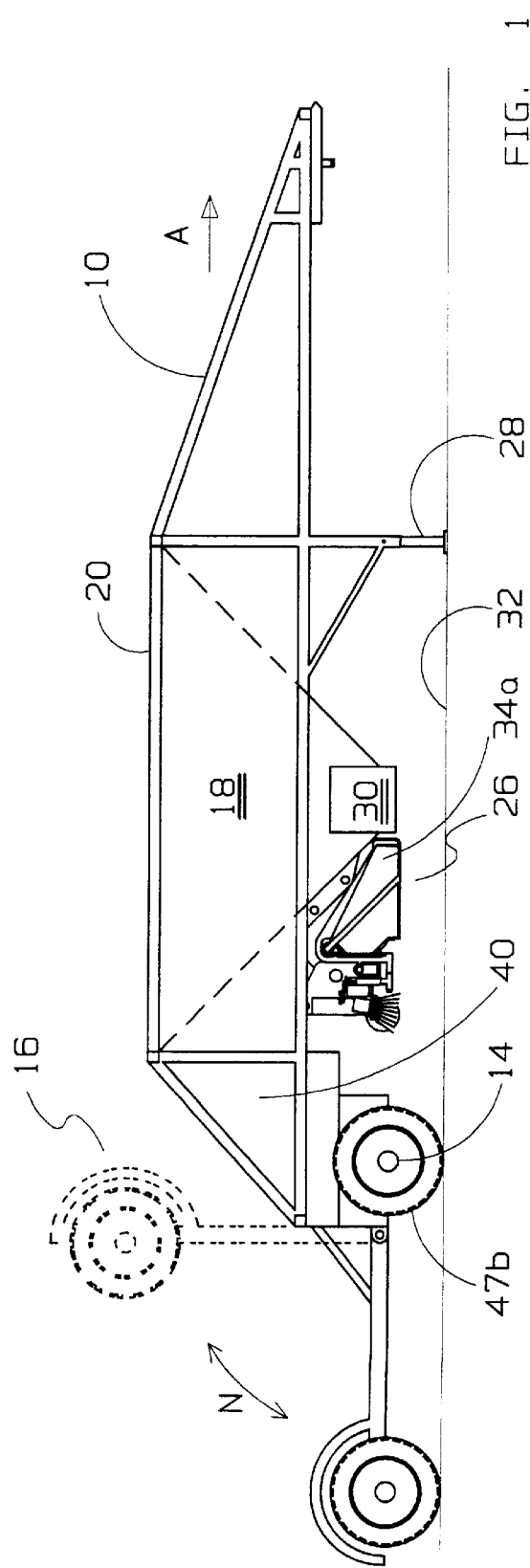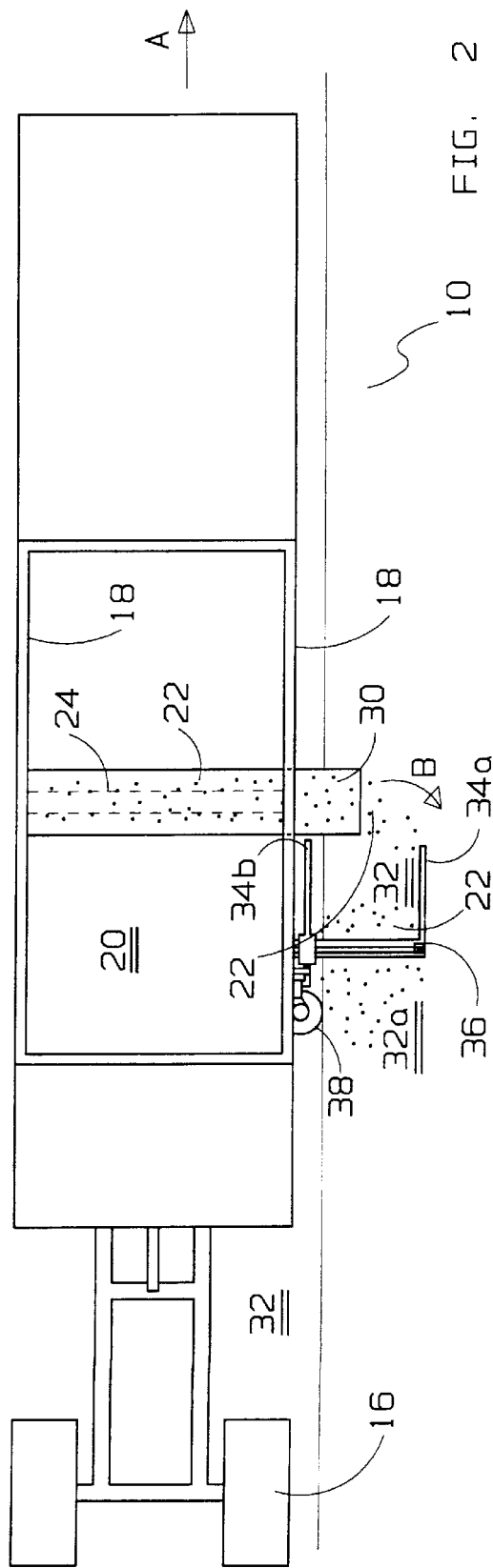

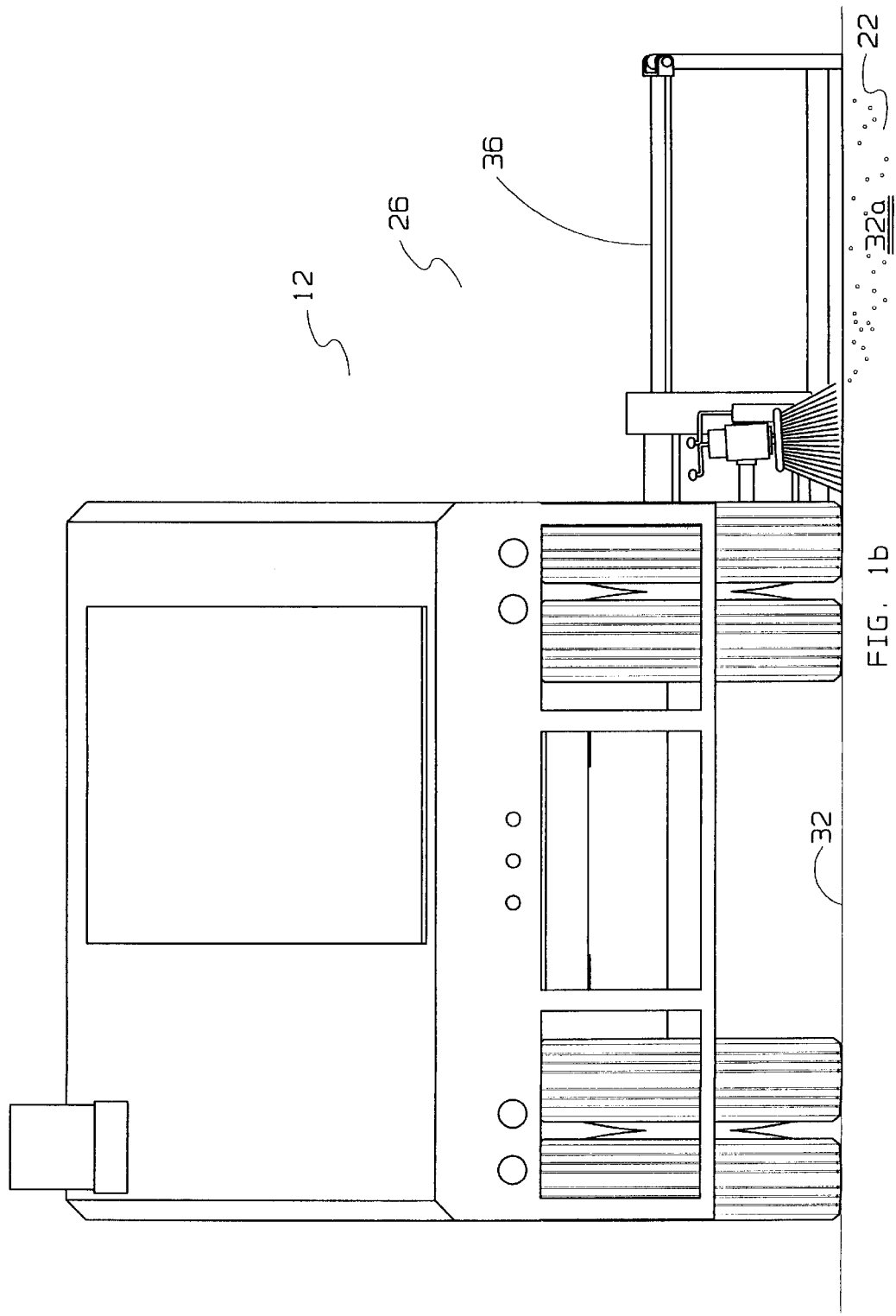

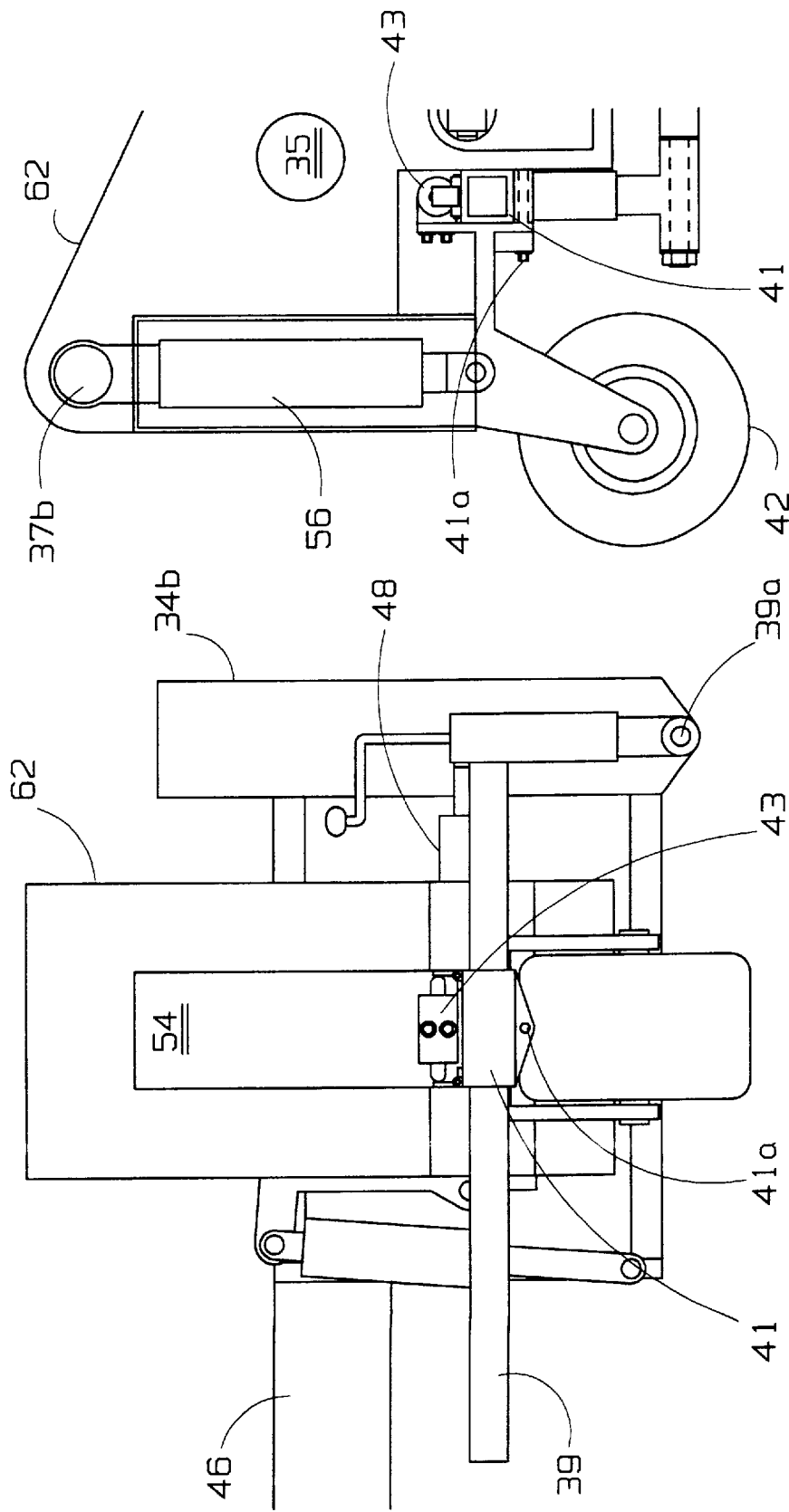

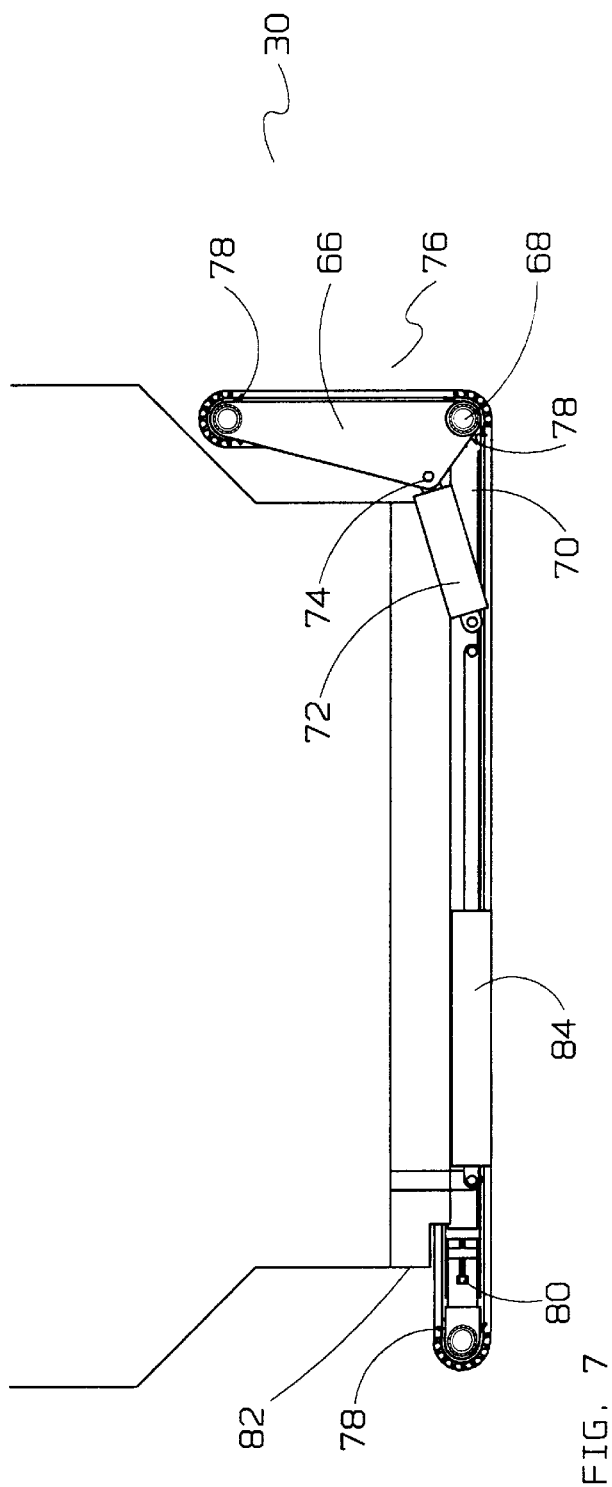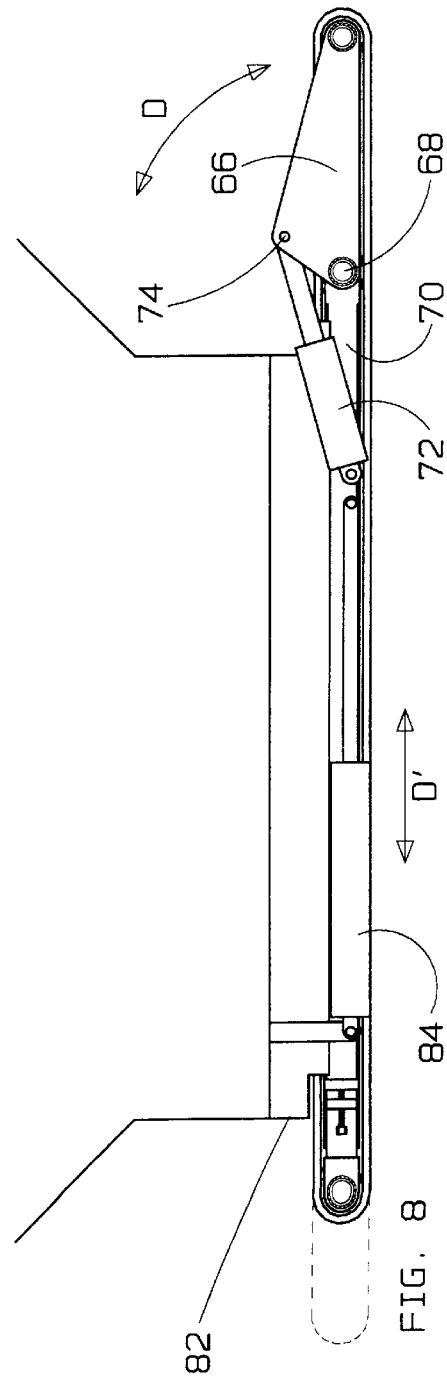

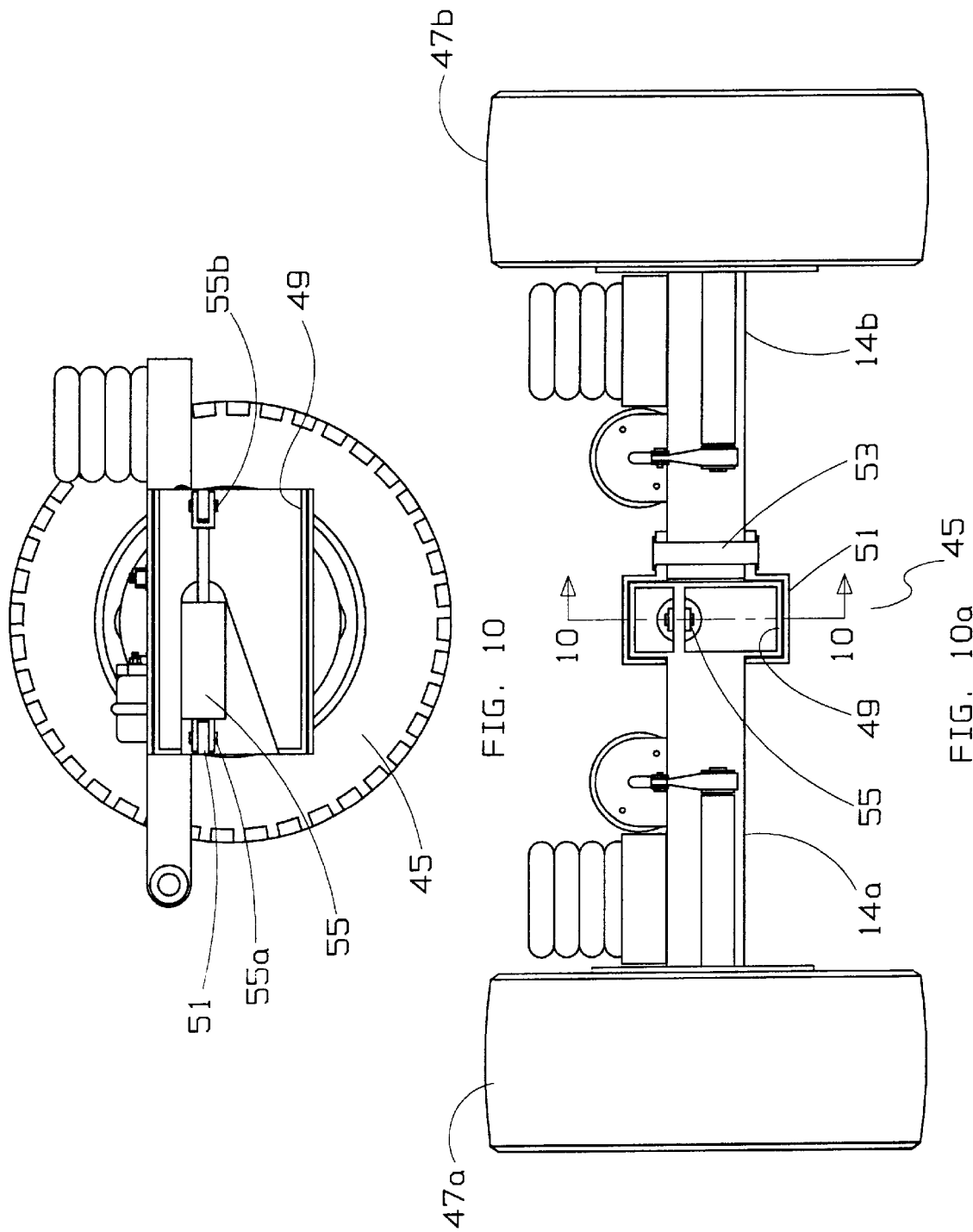

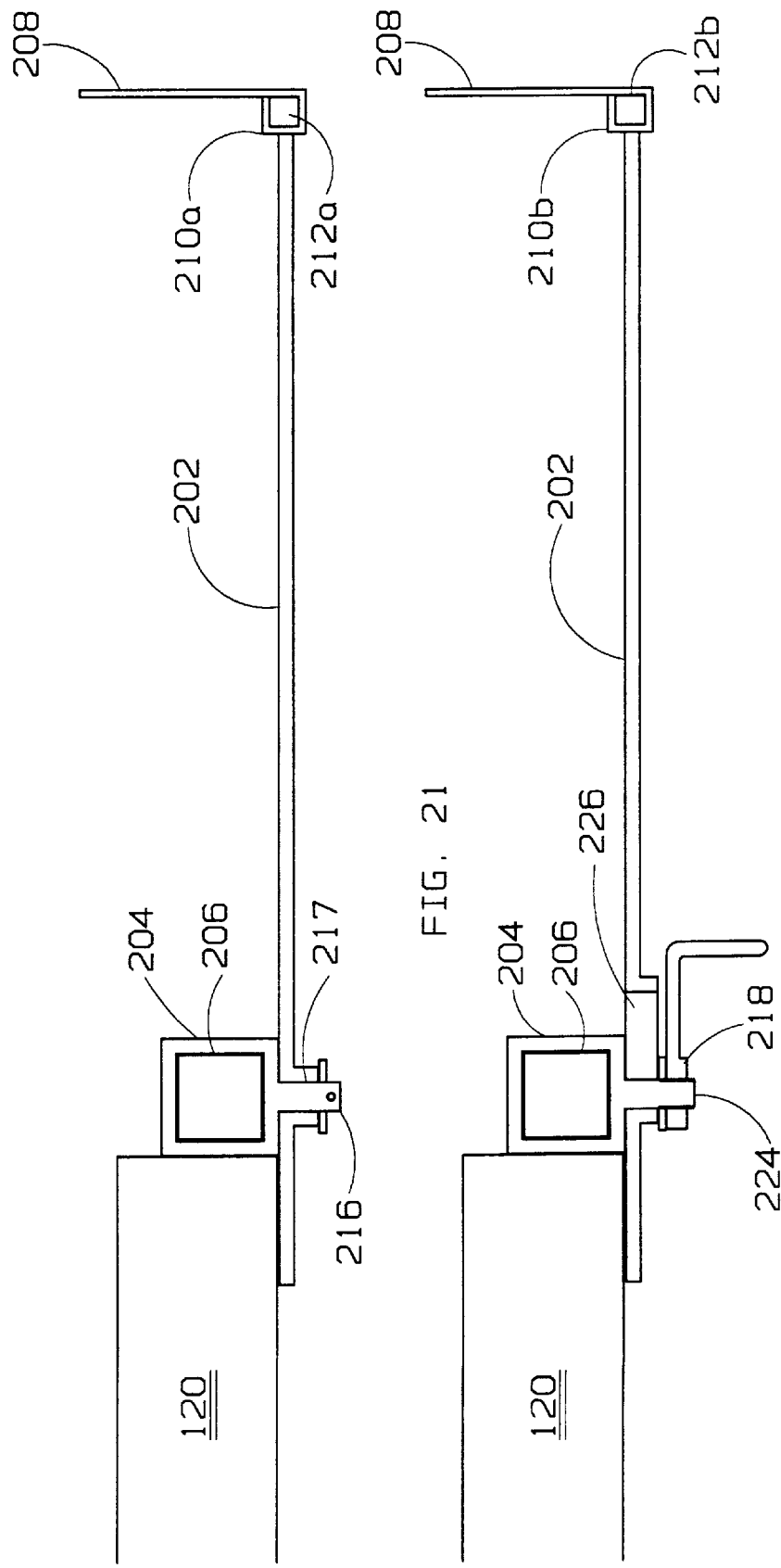

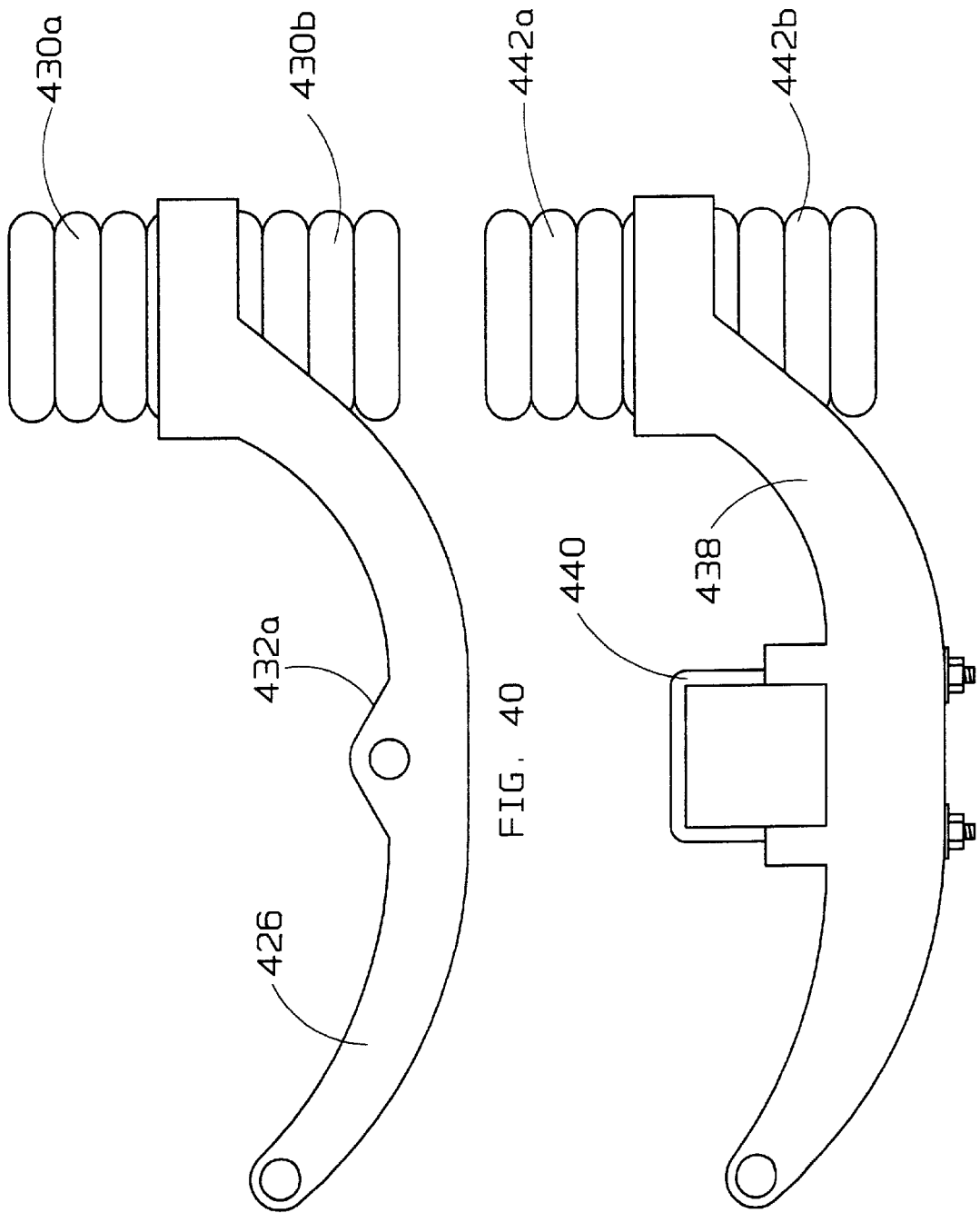

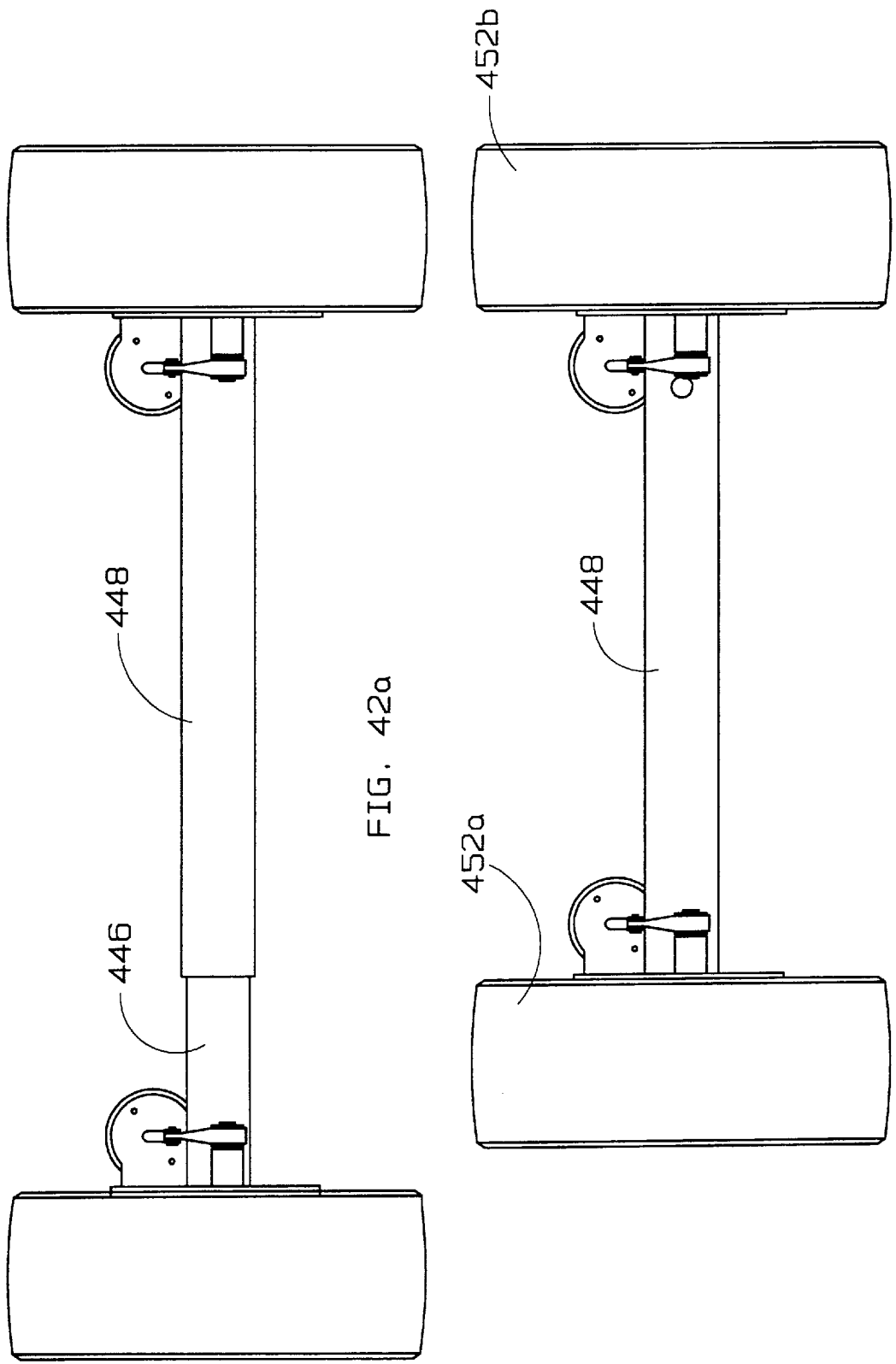

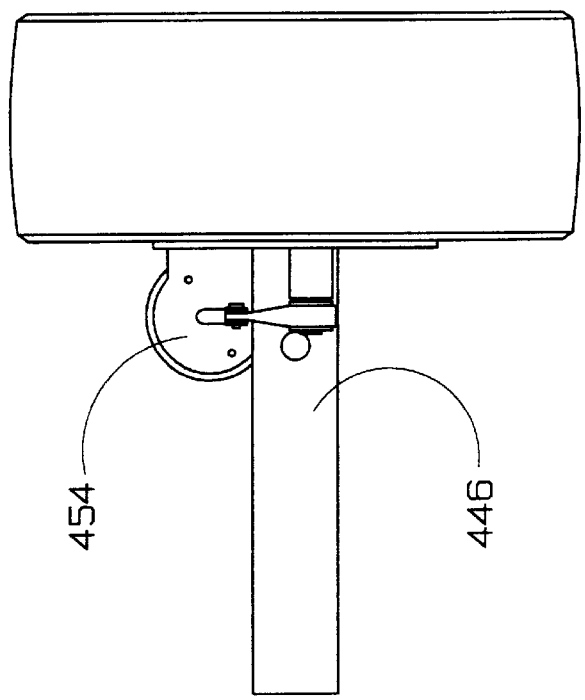
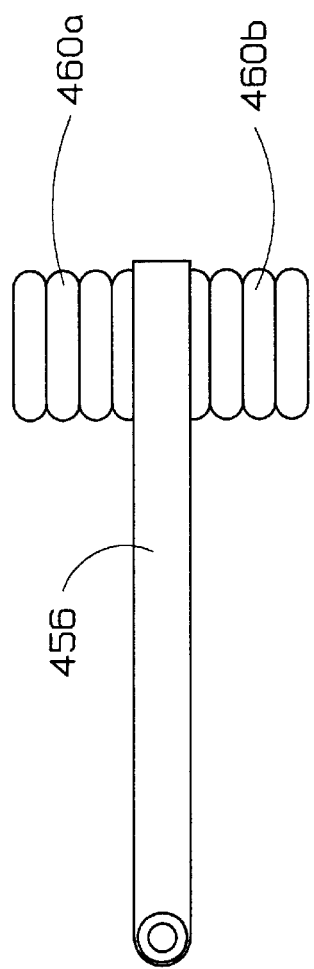
FIG. 45
FIG. 46

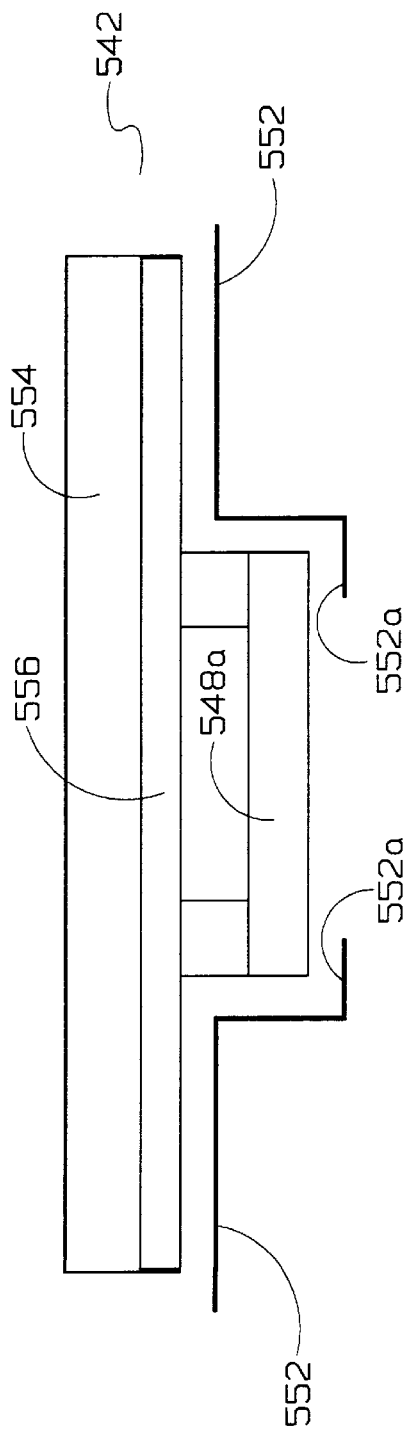
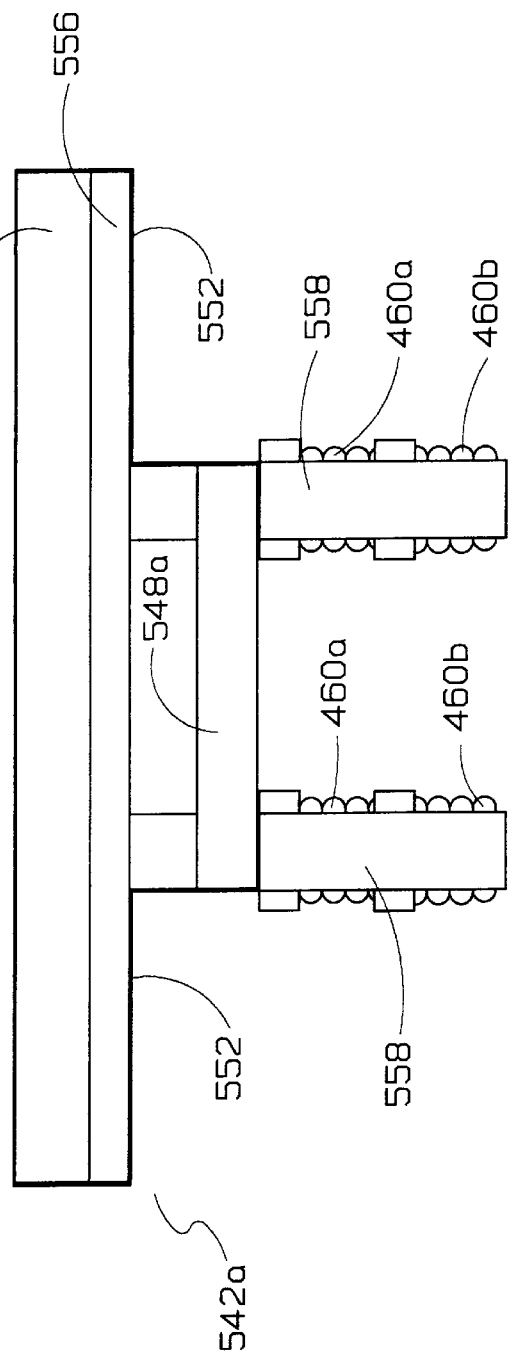

AGGREGATE HAULING, SPREADING AND COMPACTING MACHINE

CROSS REFERENCE TO RELATED APPLICATION

This application claims priority from United States Provisional Patent Application Nos. 60/048,714 filed May 28, 1997, 60/048,716 filed May 28, 1997, 60/048,717 filed May 28, 1997, 60/067,104 filed Dec. 1, 1997 and 60/067,475 filed Dec. 1, 1997.

FIELD OF THE INVENTION

This invention relates to an apparatus for hauling, spreading and compacting asphalt, gravel and like aggregates, and in particular, relates to so-called belly-dump or bottom dump trailer designs and to mechanisms for improved single pass delivery and compaction of aggregates to form road shoulders and the like.

BACKGROUND OF THE INVENTION

Many machines have been used in the past for spreading gravel along road surfaces and others have been used for placing asphalt. Current practices in road shouldering operations require the use of several machines to place the material to construction specifications. Machines used for placing asphalt are not easily mobilized and require the use of other machines for hauling or altering the slope of the material to satisfy construction specifications.

In the prior art, applicant is aware of U.S. Pat. No. 4,188,152 which issued to Kitt on Feb. 12, 1980 for a Gravel Spreader. Kitt teaches an apparatus for spreading, loose material, such as gravel, on a surface. The apparatus comprises an elongate material spreader for positioning generally parallel to the surface a distance above the surface. A frame extends forwardly and above the spreader to a pivotal connector for connecting the apparatus to a hopper trailer between the trailer and the surface. A first material retainer extends forwardly from the front of the spreader near one end of the spreader. A second material retainer extends forwardly from the front of the spreader. The first retainer is positionable a distance from the second retainer so that, when the material is distributed from the trailer a distance from the front of the spreader in a forward direction, the material is spread between the first and second retainers and between the bottom edge of the spreader and the surface, as the trailer moves in the forward direction along the surface.

The disadvantage of the Kitt device is that it must be followed by a road grader to place the material at an angle to the road surface. Consequently, there is little benefit to using the Kitt device over a conventional bottom dump trailer. The present invention on the other hand can place a desirable width of spreadable material at an angle inclined relative to the road surface. The Kitt device places material on the ground along the side of the device approximately 8 feet ahead of a spreader blade. The present invention places material directly into, or immediately ahead of, a blade cavity. This makes efficient use of the material in that material is not wasted. The placing of material into, or immediately ahead of, the blade cavity makes possible the accurate placing of material as the trailer is manoeuvred around sharp corners on the roadway. The present invention also allows the material to be placed over a roadside curb by means of a laterally extendable conveyor. The conveyor of the Kitt device is fixed relative to the trailer. The Kitt device can spread material from the edge of the trailer outward in one direction only. The present invention can spread material on either side of the trailer or under the trailer. In one embodiment, the blade in the present invention is located to the front of the trailer which allows for better visibility for the operator and better weight distribution when hauling material. The blade on the Kitt device cannot be seen at all by the operator when the trailer is making a left turn.

Applicant is also aware of U.S. Pat. No. 3,680,451 which issued to Birtchet on Aug. 1, 1972 for a Roadway Sloping Attachment for Asphalt paving Machine. Birtchet teaches an attachment for an asphalt paving machine which permits the machine to slope the outer edge of a roadway to a desired angle. A material spreading assembly is disclosed which includes a pivoted blade having means for adjusting the angle of the lower surface of the blade relative to the bottom line of the strike-off board. The pivoted blade portion is located between the end gate and the main blade (or board) so that the assembly when attached to a paving machine serves to lay down an angled shoulder to the roadway as a part of the continuous surface laying operation.

Applicant is also aware of U.S. Pat. No. 5,304,013 which issued to Parsons on Apr. 19, 1994 for a Road Shouldering Compacting Apparatus. Parsons discloses an offset compactor for use on a grader as the grader travels along the road. An adjustable connection is provided between the grader and the ground engagement member permitting displacement of the member laterally from either side of the grader allowing use of the ground engagement member on opposite sides of the grader. The ground engagement member is selectively adjustable so as to be selectively raised or lowered. The ground engagement member which, as taught by Parsons, is a pair of wheels, which are swung on an arm about a centrally located pivot so that the position of the wheels when swung out to either side of the grader are fixed. It is neither taught nor suggested to use the compacting wheels as load bearing wheels during transportation, nor to selectively adjustably extend the wheels laterally outwardly of the vehicle as taught in the present invention.

SUMMARY OF THE INVENTION

In summary, the vehicle for hauling and spreading spreadable material of the present invention, wherein the vehicle has a bin for holding the spreadable material and the bin has a lower aperture therein for gravity feeding therethrough of the spreadable material, and wherein the vehicle has a longitudinal axis corresponding to a direction of forward motion of the vehicle, includes, delivery means cooperating with the lower aperture for unloading, delivery and dispensing the spreadable material on opposite lateral sides of the vehicle at a first lateral distance selectively spaced laterally outwardly of the vehicle on either of the opposite lateral sides of the vehicle, a selectively inclinable blade, selectively laterally translatable a second lateral distance corresponding to the first lateral distance, the selectively inclinable blade selectively laterally translatable on mounting and translation means mounted to the vehicle, the blade mounted generally perpendicular to the longitudinal axis, the mounting and translation means for selectively laterally outwardly translating the blade outward of the lateral side corresponding to the lateral side on which the spreadable material is dispensed by the delivery means, selective inclination means for selectively inclining the blade relative to a ground surface adjacent the vehicle, selective elevating and lowering means cooperating with the mounting and translation means for selectively lowering the selectively inclinable blade into proximity to the ground surface while the vehicle is translating in the direction of forward motion.

The selectively inclinable blade may have pivotally mounted at an end thereof a second blade member selectively pivotable about a generally vertical axis of rotation between an end cap position generally perpendicular to the selectively inclinable blade so as to extend forwardly of the selectively inclinable blade in the direction of forward motion, and pivotable from the end cap position to a slope trimmer position generally co-planar with the blade.

The second blade may be selectively inclinable by selective inclination means relative to the selectively inclinable blade when the second blade is in the slope trimmer position.

The selectively inclinable blade may be selectively rotatable by the selective rotation means about a generally vertical axis of rotation so as to selectively rotate the blade out of the generally perpendicular orientation to the longitudinal axis.

The invention further includes a shoulder compactor wherein the shoulder compactor is a rear vehicle wheel of the vehicle, the rear wheel mounted on a laterally translatable member, laterally selectively translatable outwardly of the vehicle aft of the blade to either of the lateral sides of the vehicle by selective lateral translation means.

BRIEF DESCRIPTION OF THE DRAWINGS

Spreading Machine With Rear Mounted Blade

FIG. 1 is, in side elevation view, a trailer incorporating a first embodiment of the spreading machine of the present invention.

FIG. 1b is, in rear elevation view, the trailer of FIG. 1a with the blade extended horizontally laterally outwardly of the trailer.

FIG. 1e is, in plan view, the trailer of FIG. 1a.

FIG. 2 is, in plan view, the trailer of FIG. 1 with the spreading machine deployed.

FIG. 6b is an enlarged view of FIG. 6.

FIG. 6c is an enlarged view of FIG. 6a.

FIG. 7 is, in side elevation view, the conveyor mechanism of the spreading machine of the present invention in its retracted position ready for transport.

FIG. 8 is the conveyor mechanism of FIG. 7 in its deployed position ready to be extended to a discharge position laterally outward of the trailer.

FIG. 10 is, in side elevation view, the axle dog-tracking slider assembly of the spreading machine of the present invention which allows for steering of the trailer axle to position the blade along the edge of the road surface.

FIG. 10a is, in end elevation view, the slider assembly of FIG. 10.

FIG. 10b is, in plan view, the dog-tracked axle of FIG. 10a.

Spreading Machine With Forward Mounted Blade

Figure 11:
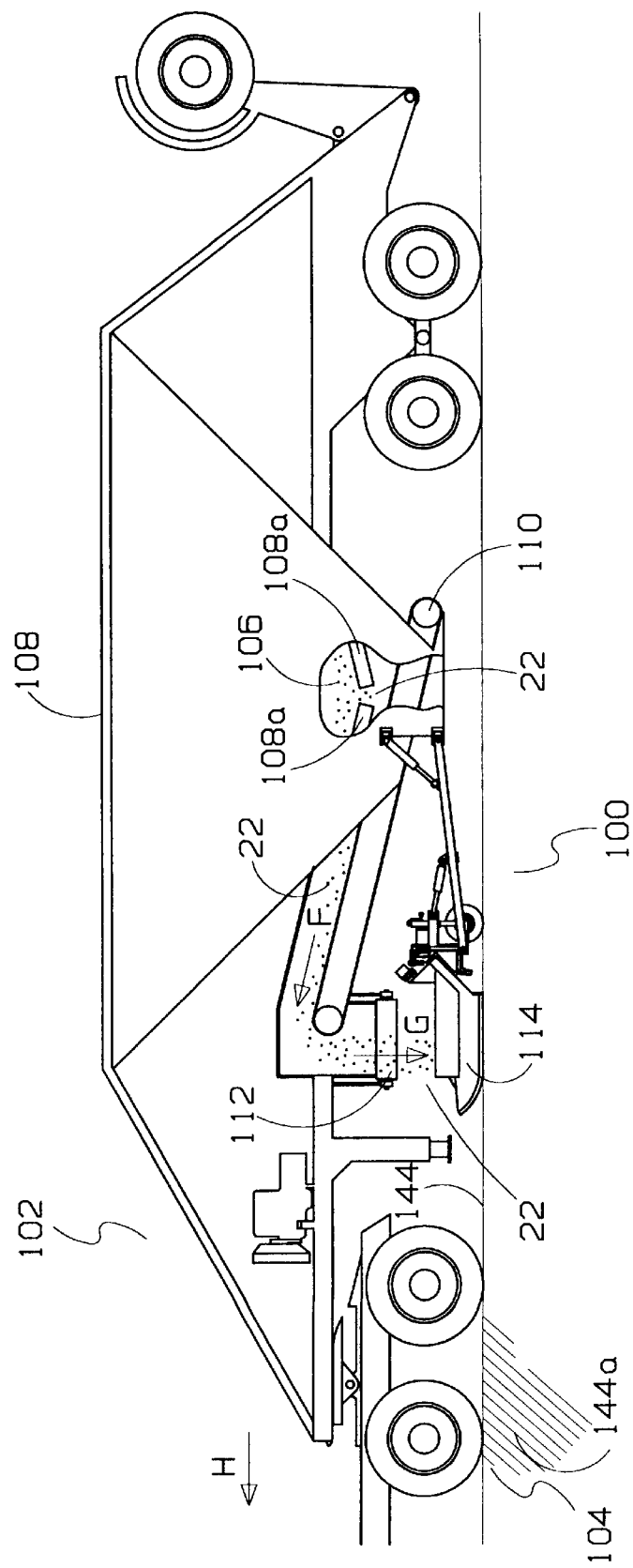

FIG. 11 is, in side elevation view, a trailer incorporating an alternative embodiment of the spreading machine of the present invention.

Figure 12:
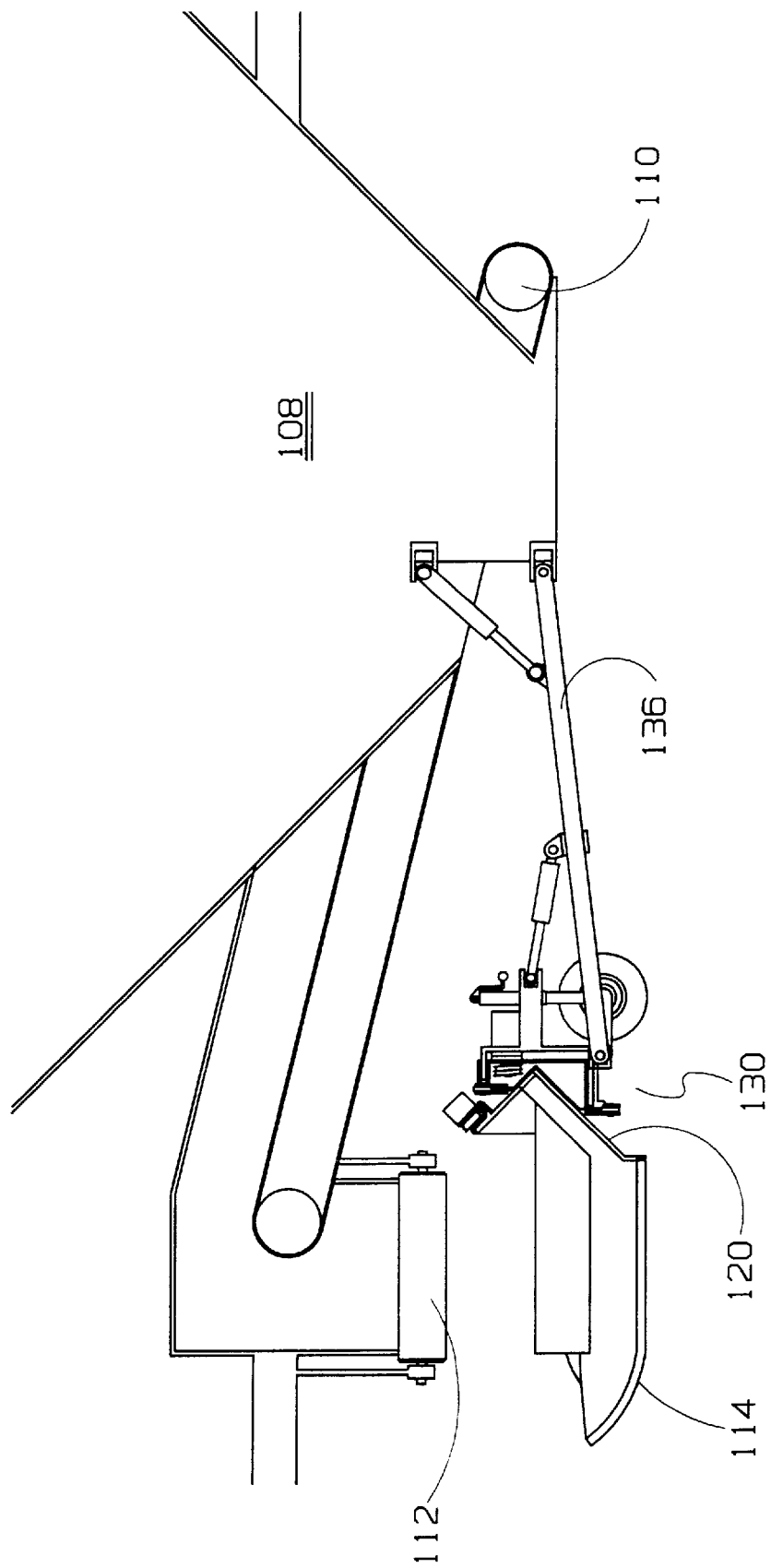

FIG. 12 is an enlarged view of FIG. 11 illustrating the conveyor and blade assemblies.

Figure 13:
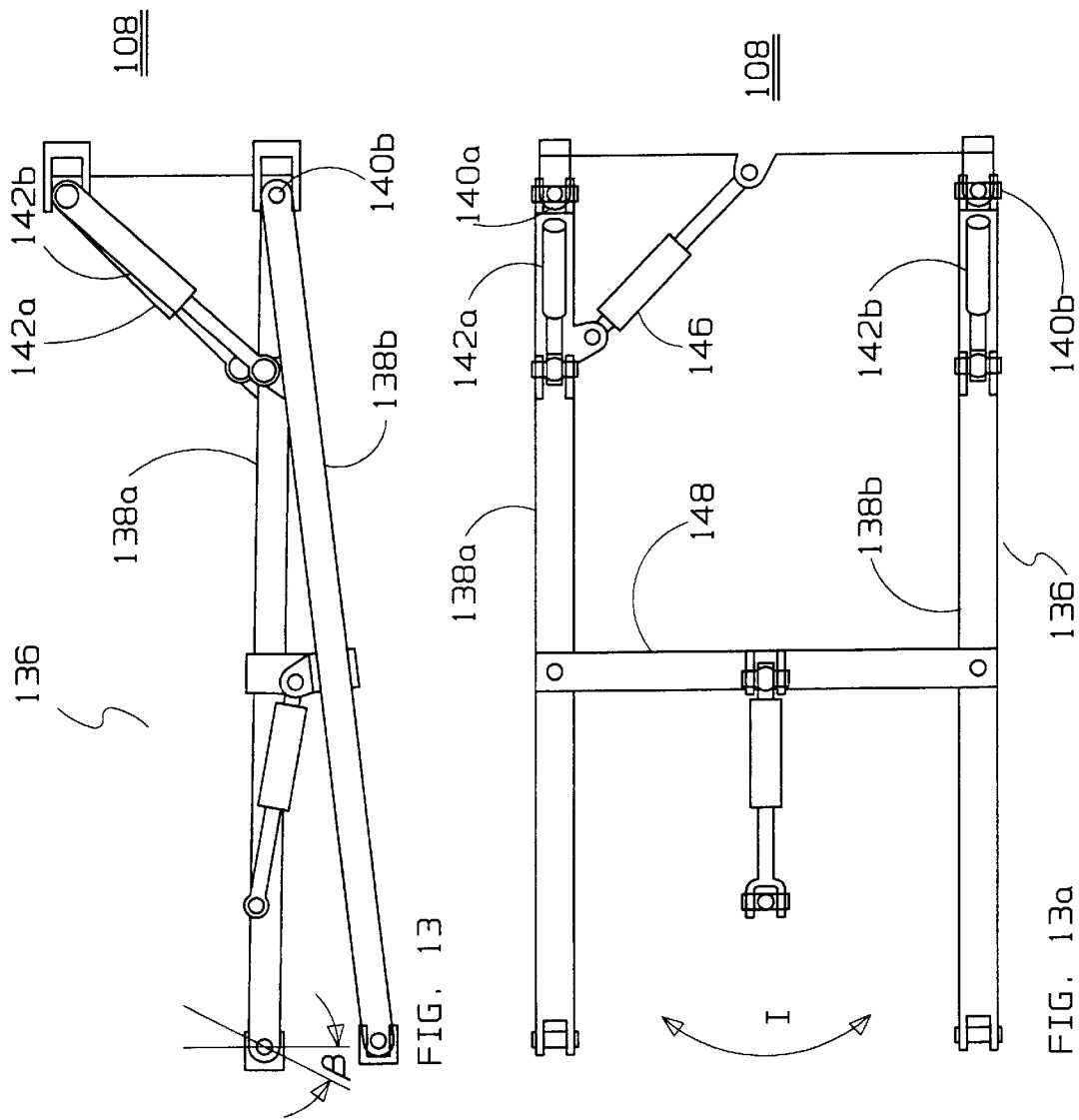

FIG. 13 is, in side elevation view, the frame assembly of the spreader of FIG. 11.

FIG. 13a is, in plan view, the frame assembly of FIG. 13.

Figure 14:
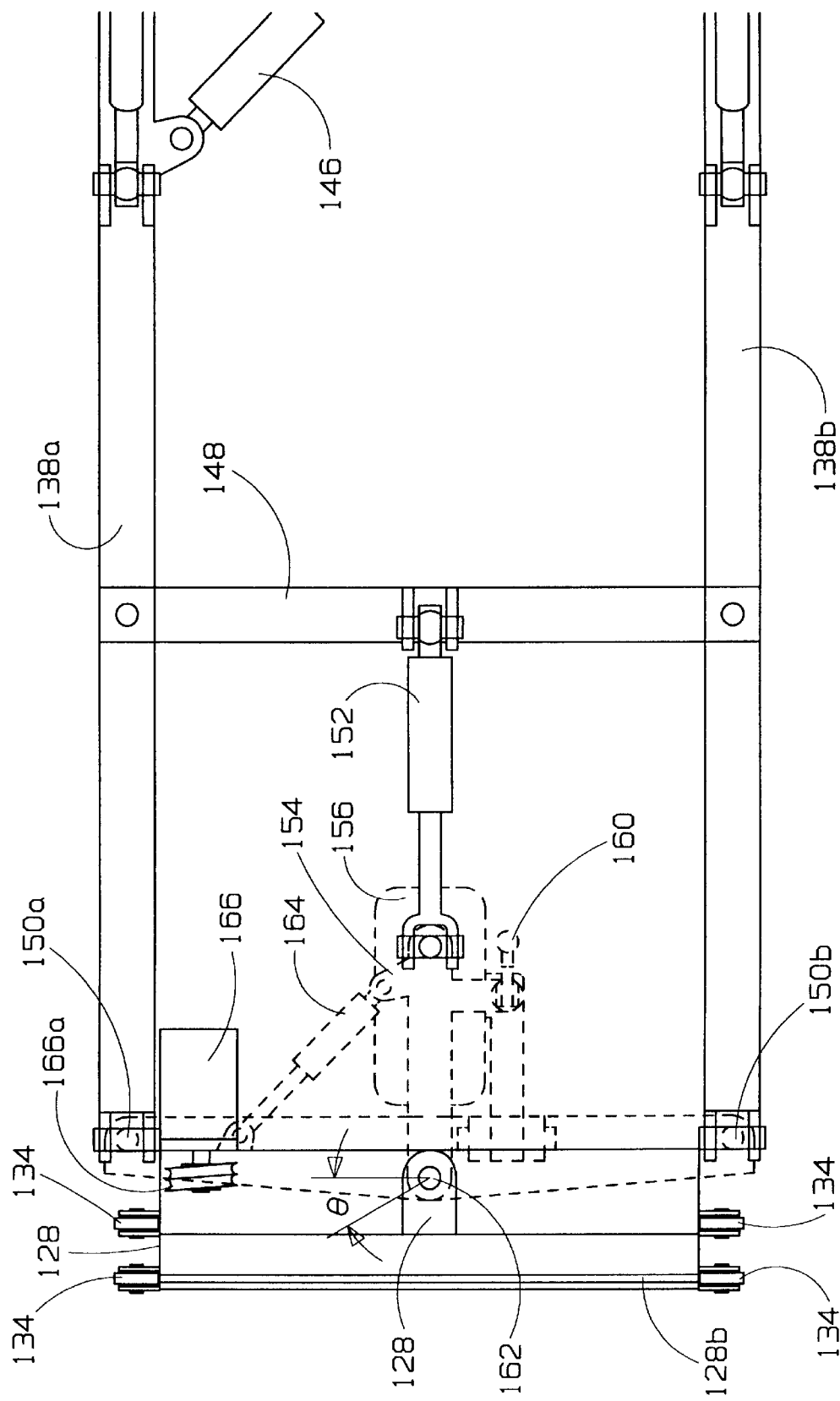
Figure 15:
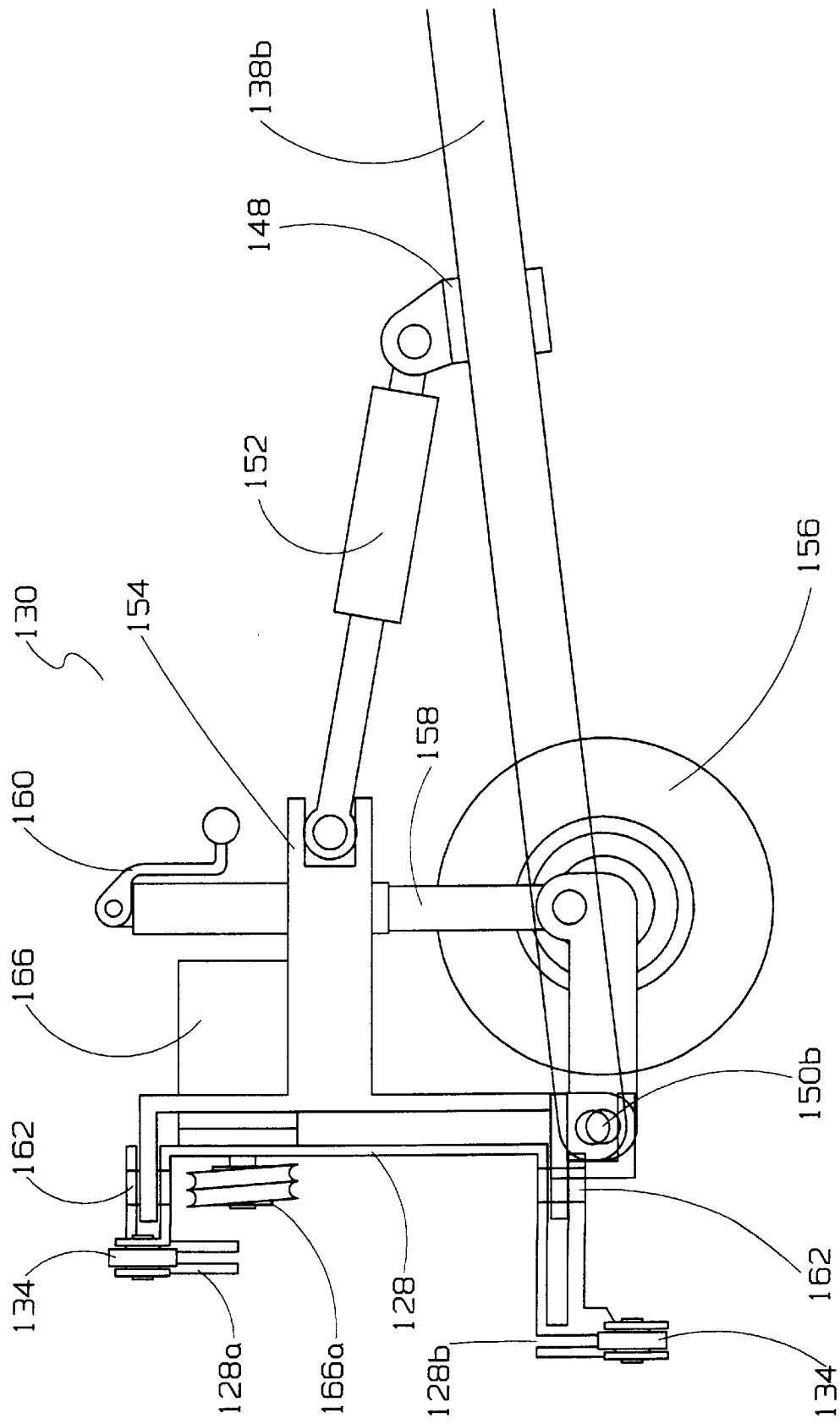

FIG. 14 is, in plan view, the pivot arrangement and slide bracket for the blade, FIG. 15 is, in side elevation view, the blade slide bracket and wheel bracket of FIG. 14.

Figure 16:
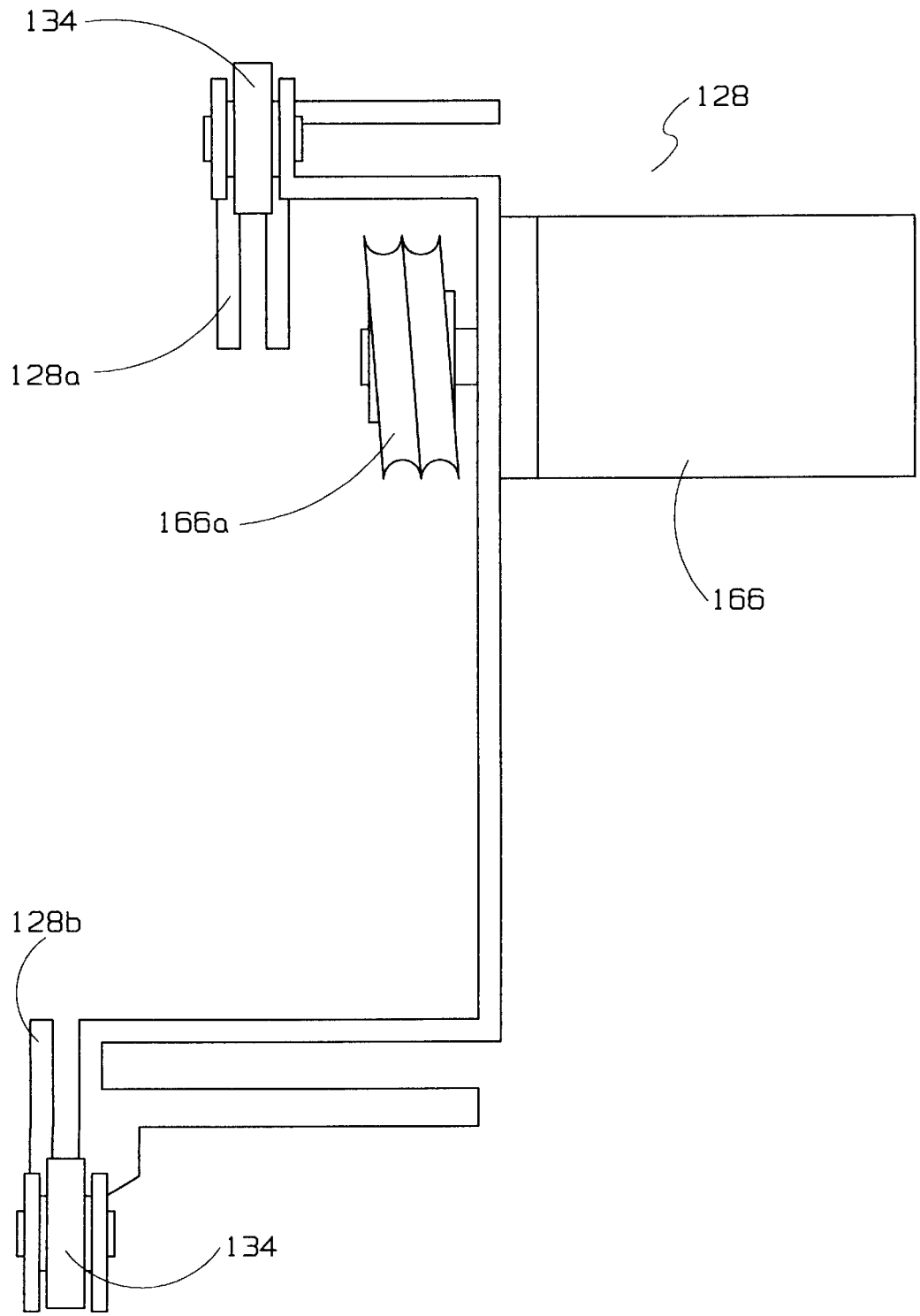

FIG. 16 is, in side elevation view, the blade slide bracket.

Figure 17:
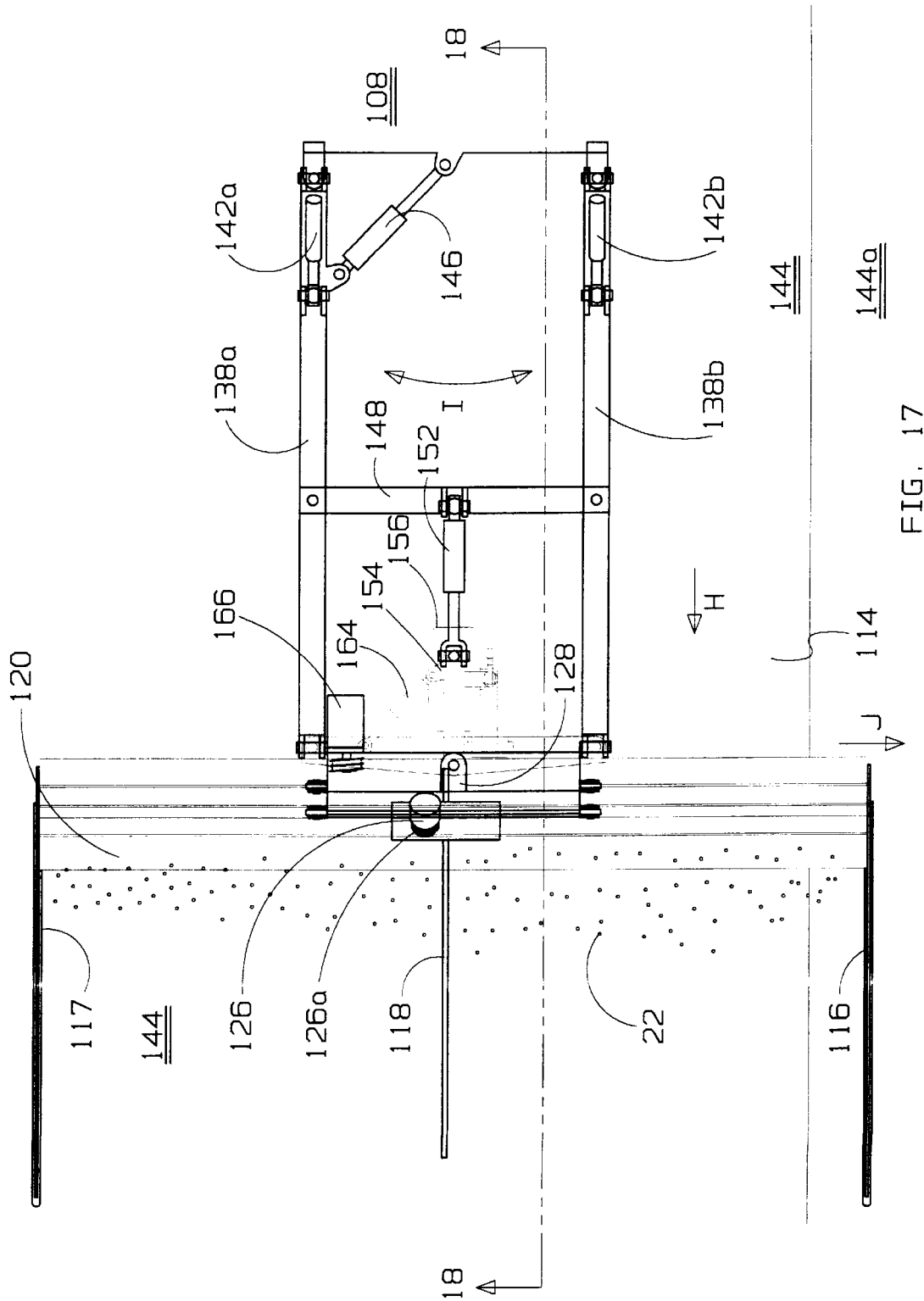

FIG. 17 is, in plan view, the blade and frame assembly.

Figure 18:
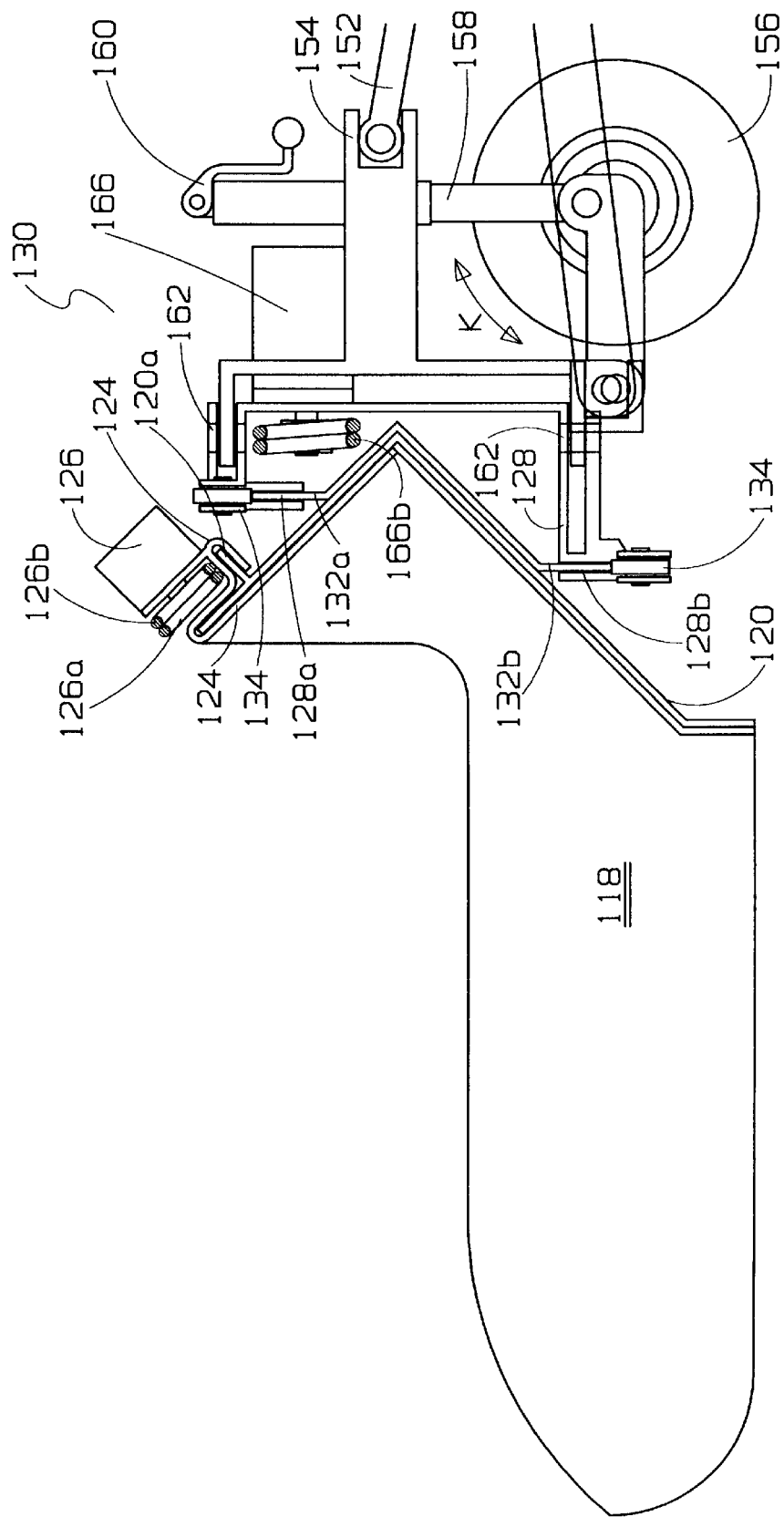

FIG. 18 is, in side elevation view, the inside retainer fence or barrier assembly of FIG. 17 along line 18—18.

Figure 19:
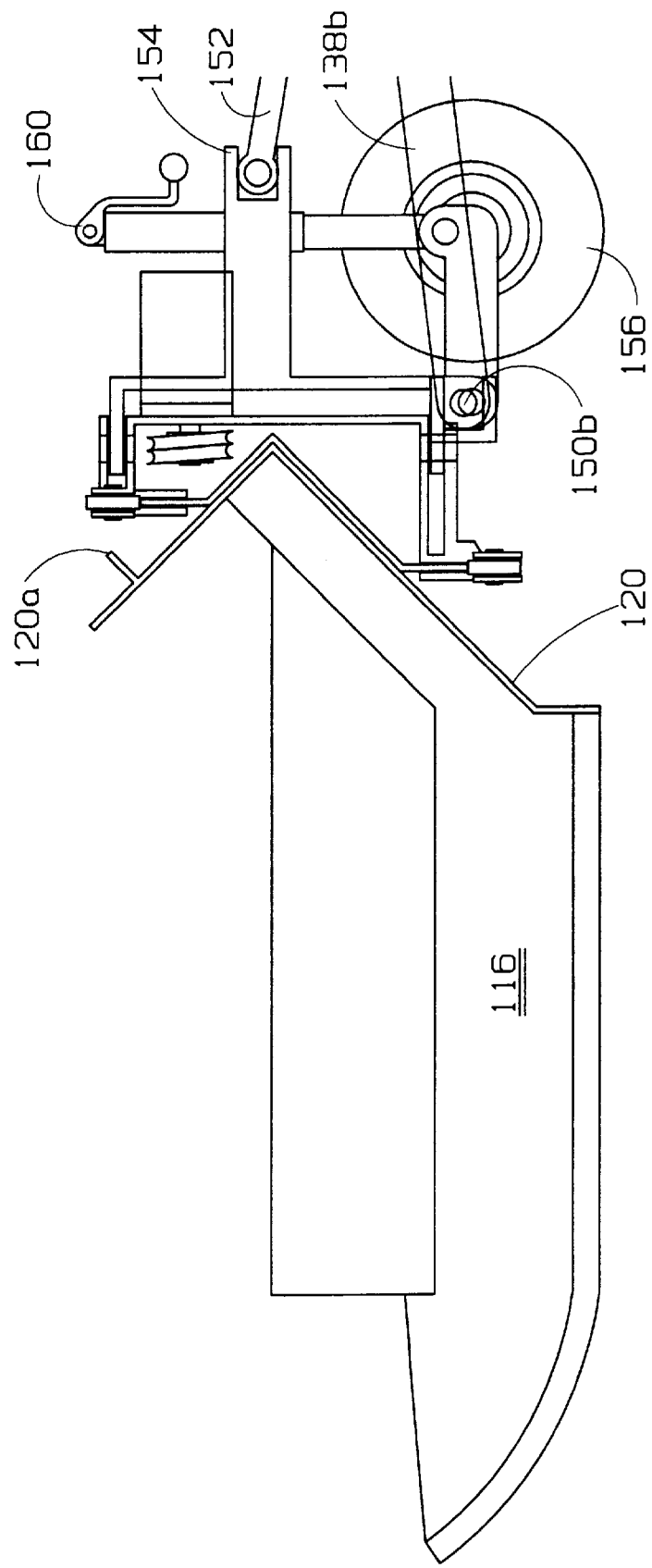

FIG. 19 is, in side elevation view, the outside retainer fence or barrier of FIG. 17.

Combination Adjustable Retainer Fence and Blade Extension

Figure 20:
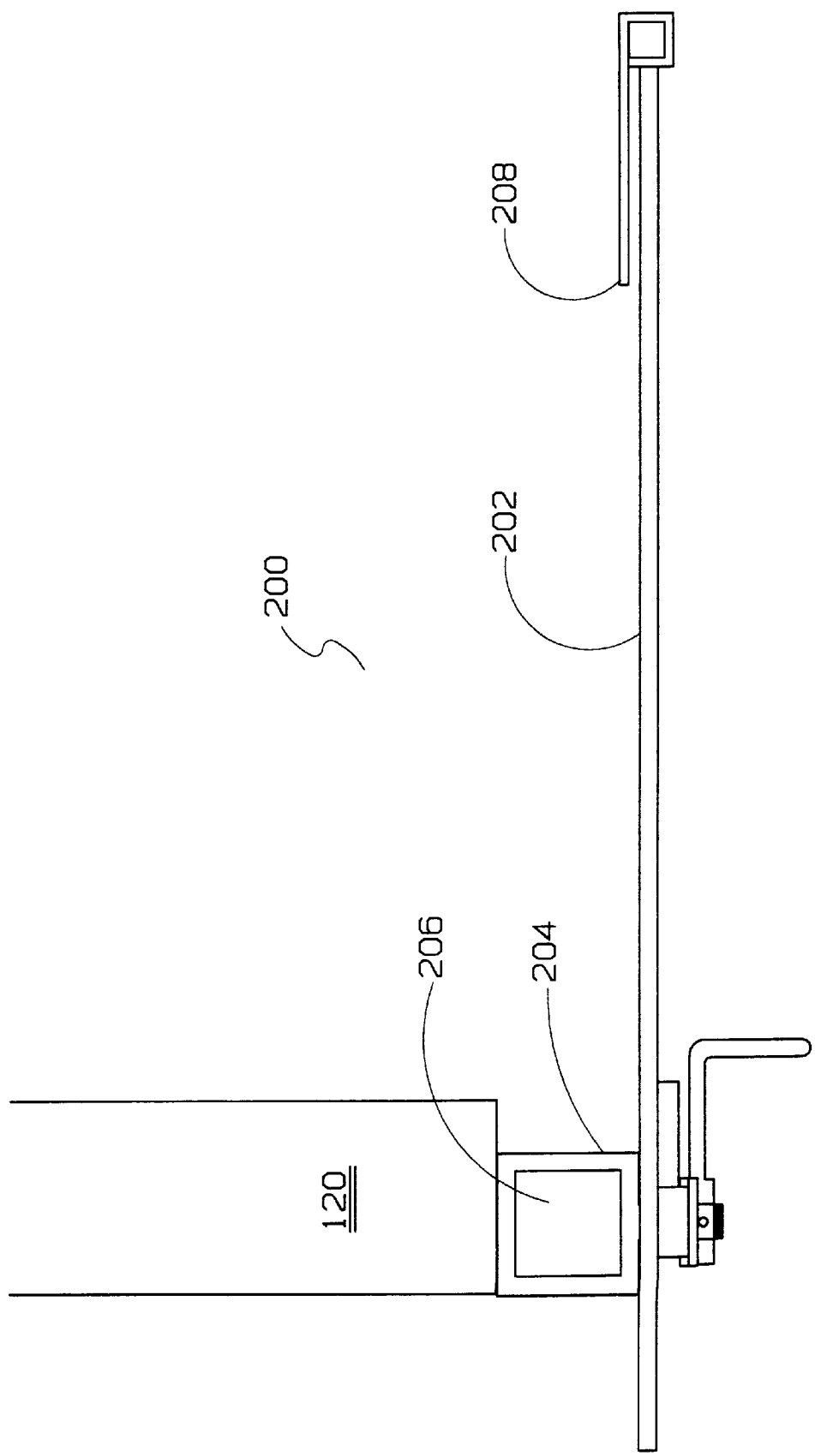

FIG. 20 is, in plan view, the manually positionable retainer fence mounted to a blade in the fence position.

Figure 23:
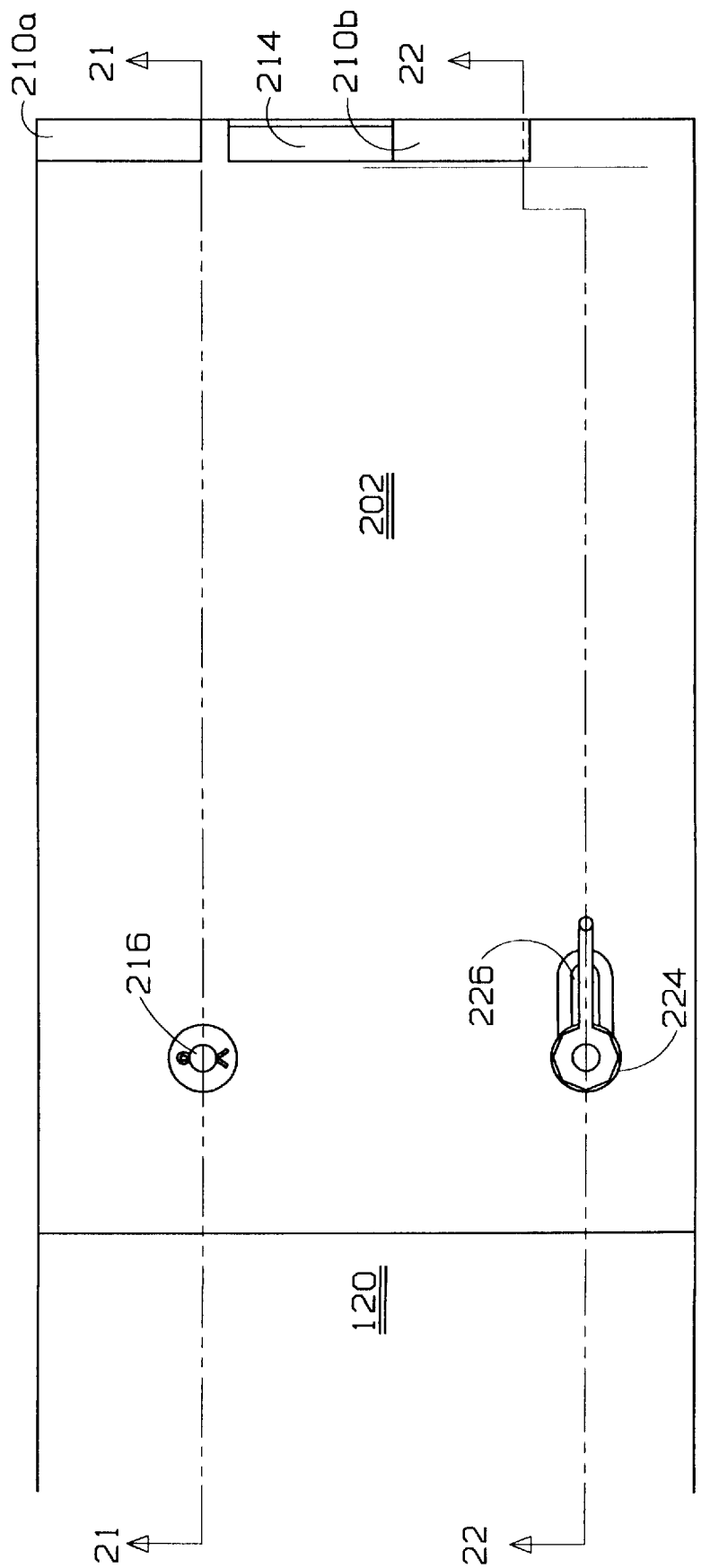

FIG. 21 is, in sectional plan view, the retainer fence of FIG. 23 along line 22—22.

FIG. 22 is, in sectional plan view, the retainer fence of FIG. 23 along line 22—22.

FIG. 23 is, in elevation view, the retainer fence of FIG. 20 showing the swivel and adjustment pins.

Figure 24:
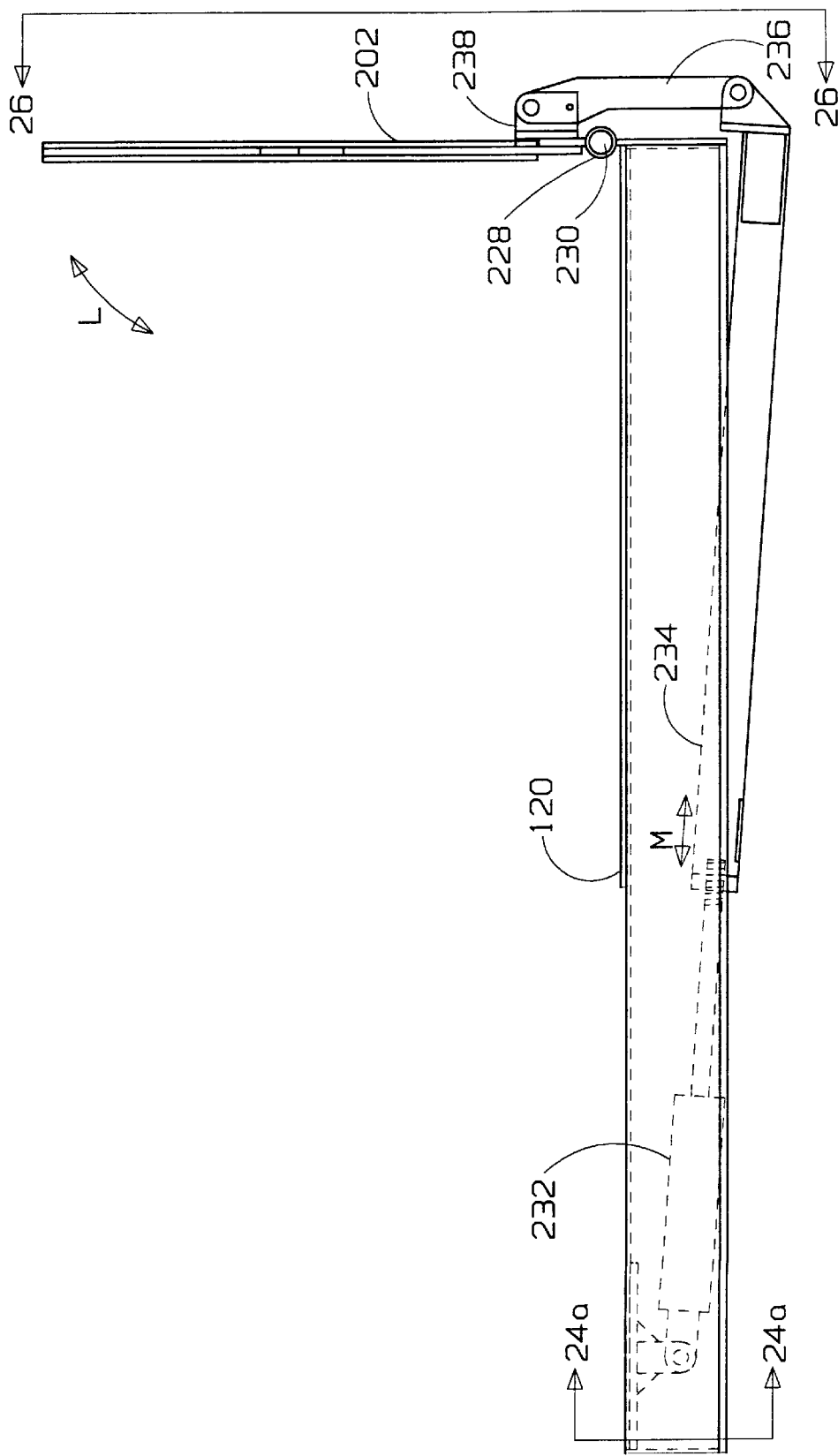

FIG. 24 is, in plan view, a hydraulic embodiment of the positionable fence of FIG. 20.

Figure 24A:
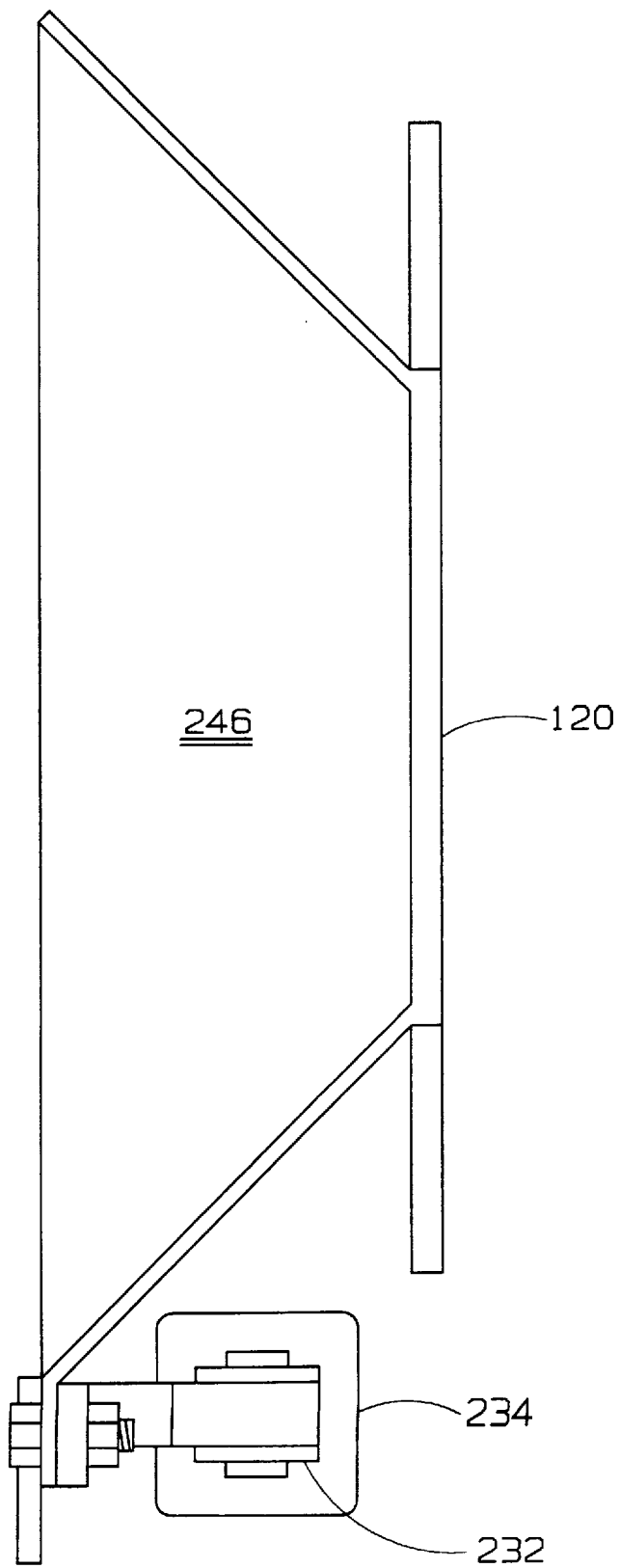

FIG. 24a is a sectional view along line 24a—24a in FIG. 24.

Figure 25:
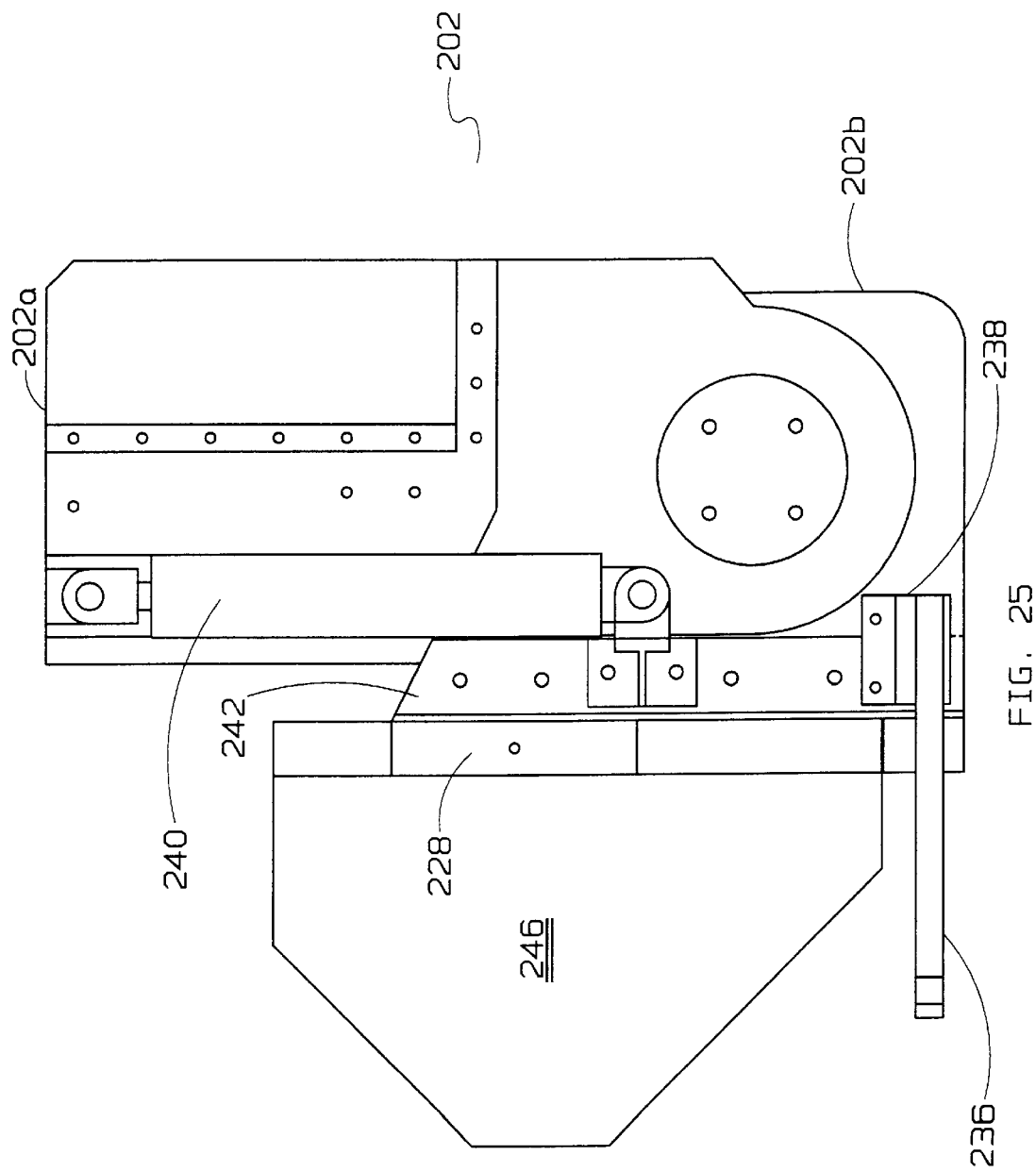

FIG. 25 is, in side elevation view, the slope trimmer attachment of the present invention in its retracted position.

Figure 26:
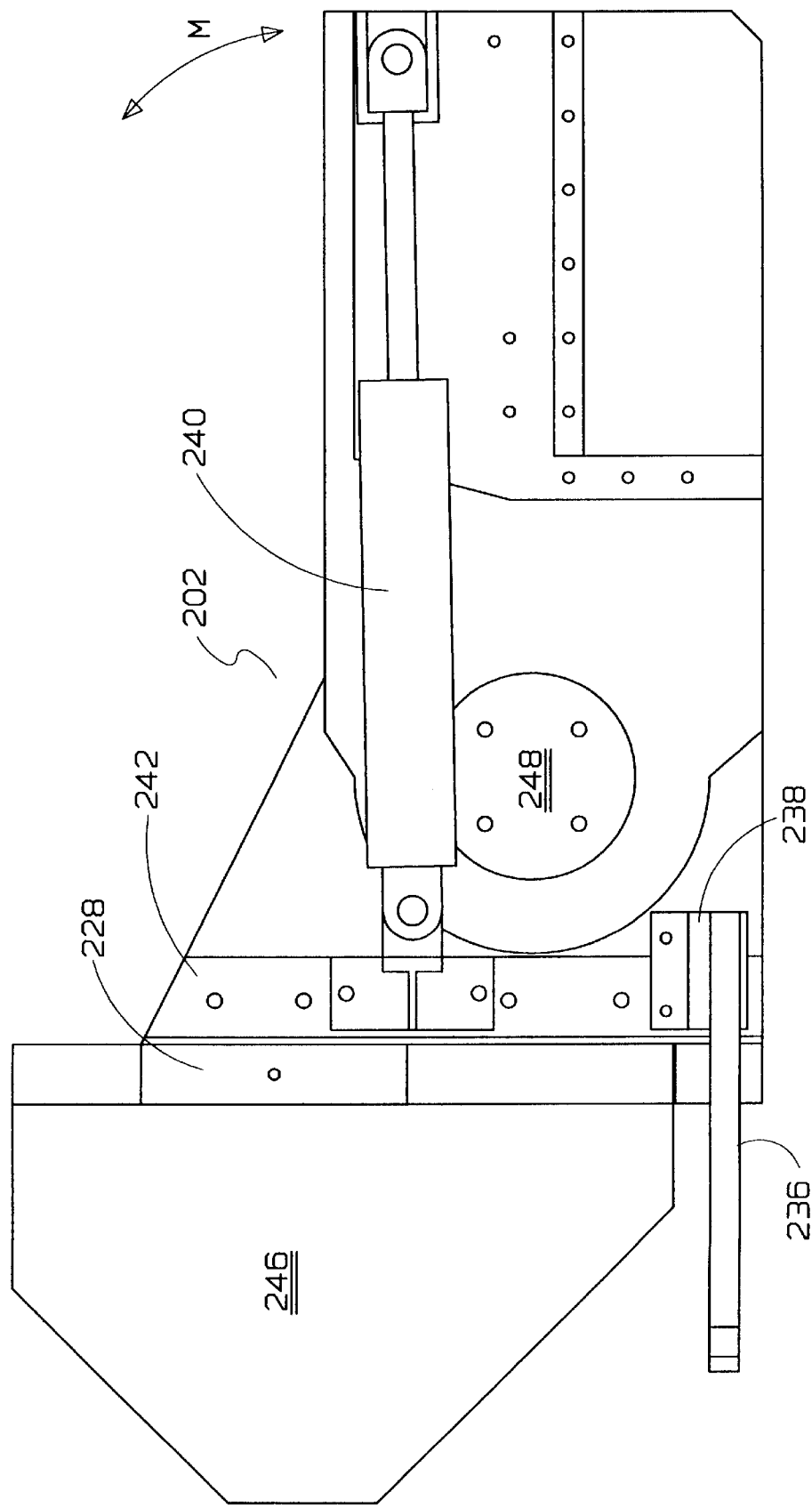

FIG. 26 is a view along line 26—26 in FIG. 24 showing the slope trimmer attachment of the present invention in its horizontally deployed position.

Figure 27:
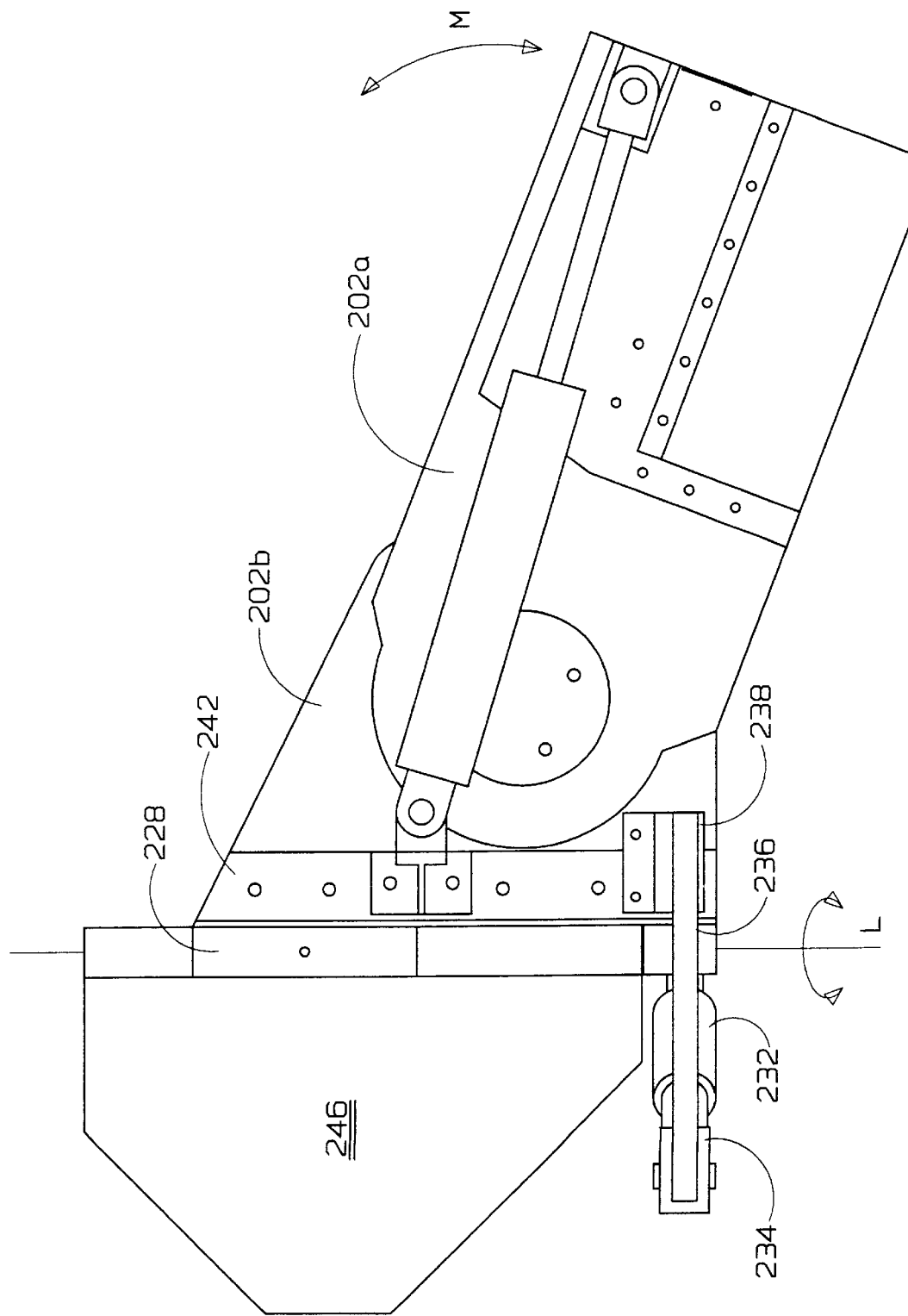

FIG. 27 is the slope trimmer attachment of FIG. 26 deployed into a downwardly inclined position.

Lifting Axle Shoulder Compactor

Figure 28:
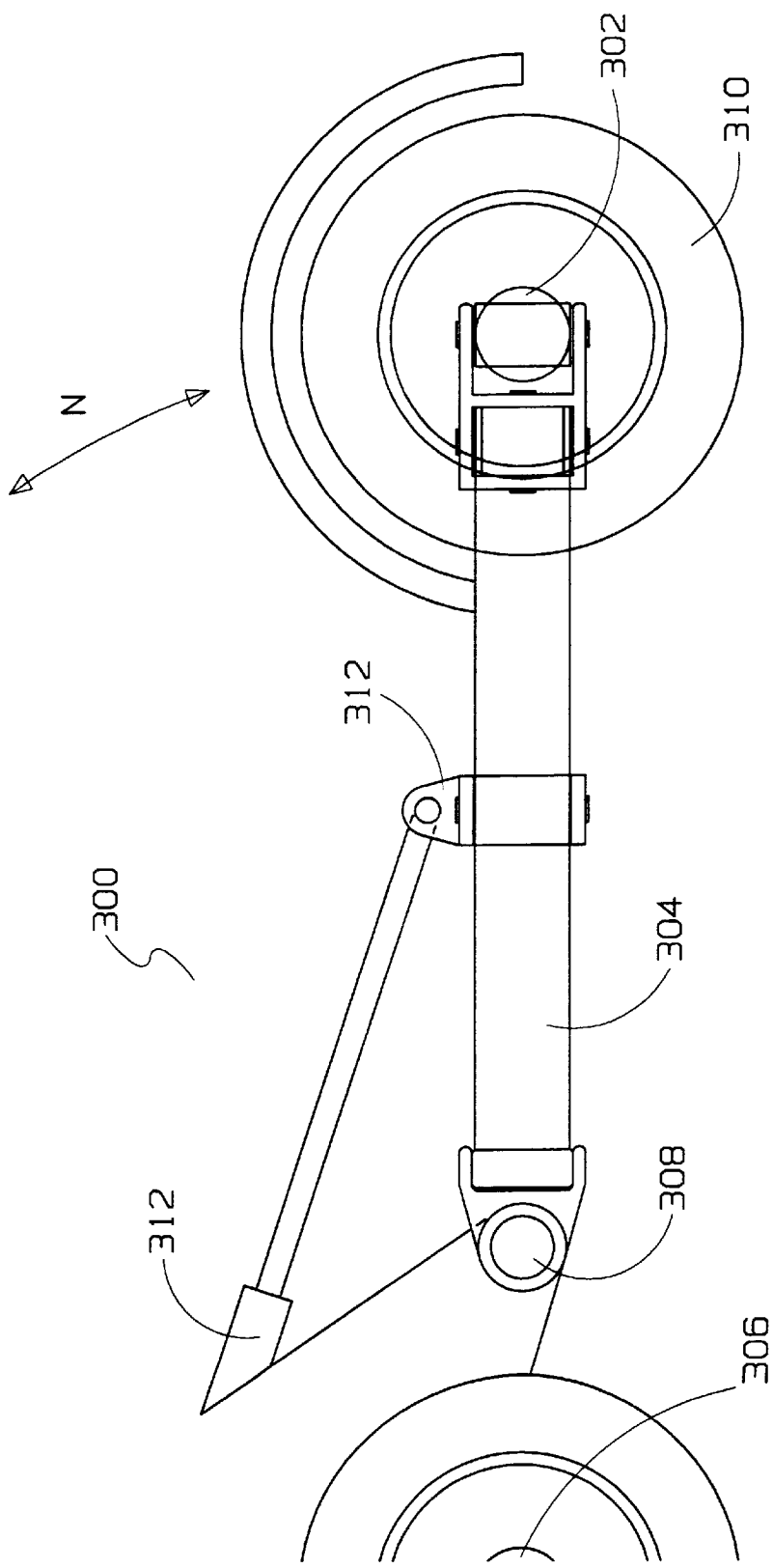

FIG. 28 illustrates a side elevation view of the invention.

Figure 29:
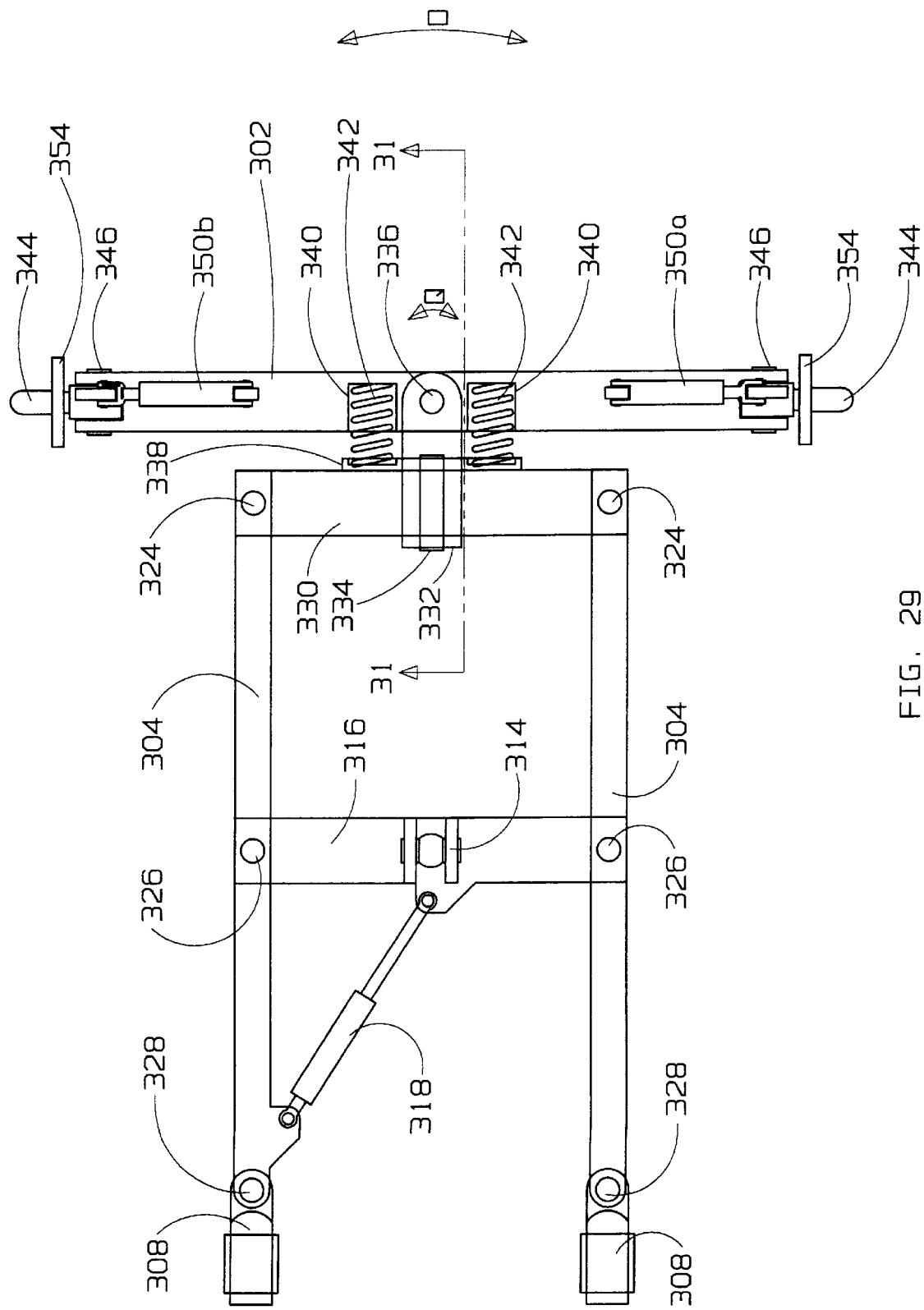

FIG. 29 illustrates a plan view of the frame and axle assembly.

Figure 30:
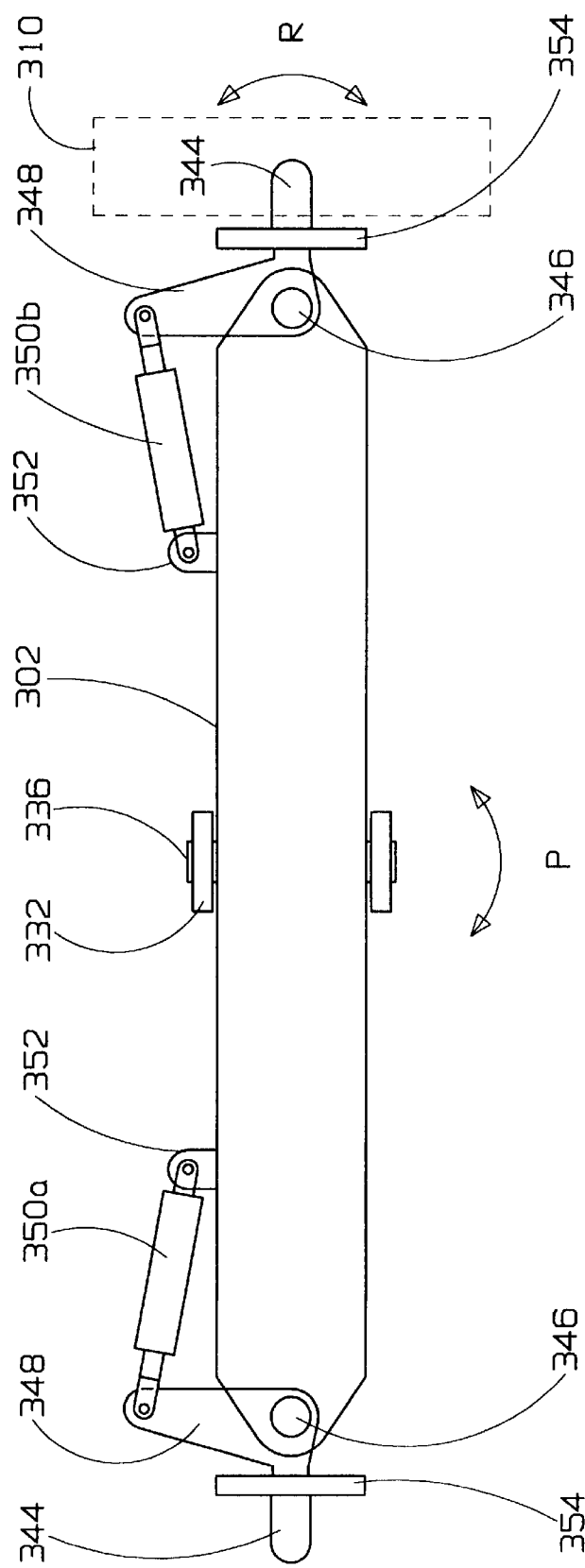

FIG. 30 illustrates a side elevation view of the axle assembly.

Figure 31:
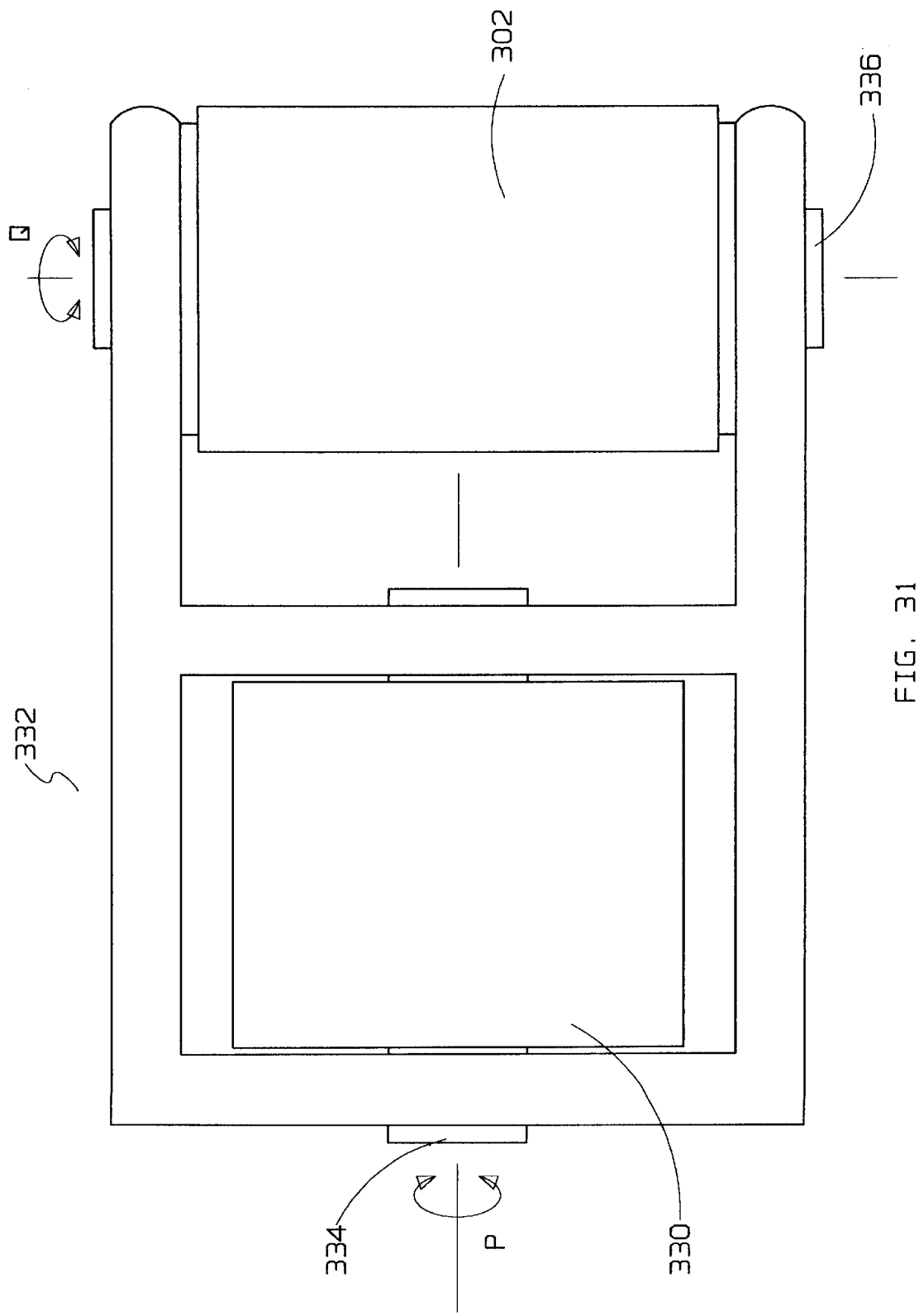

FIG. 31 illustrates a side elevation view of the swivel bracket.

Extendable Axle Shoulder Compact

Figure 32:
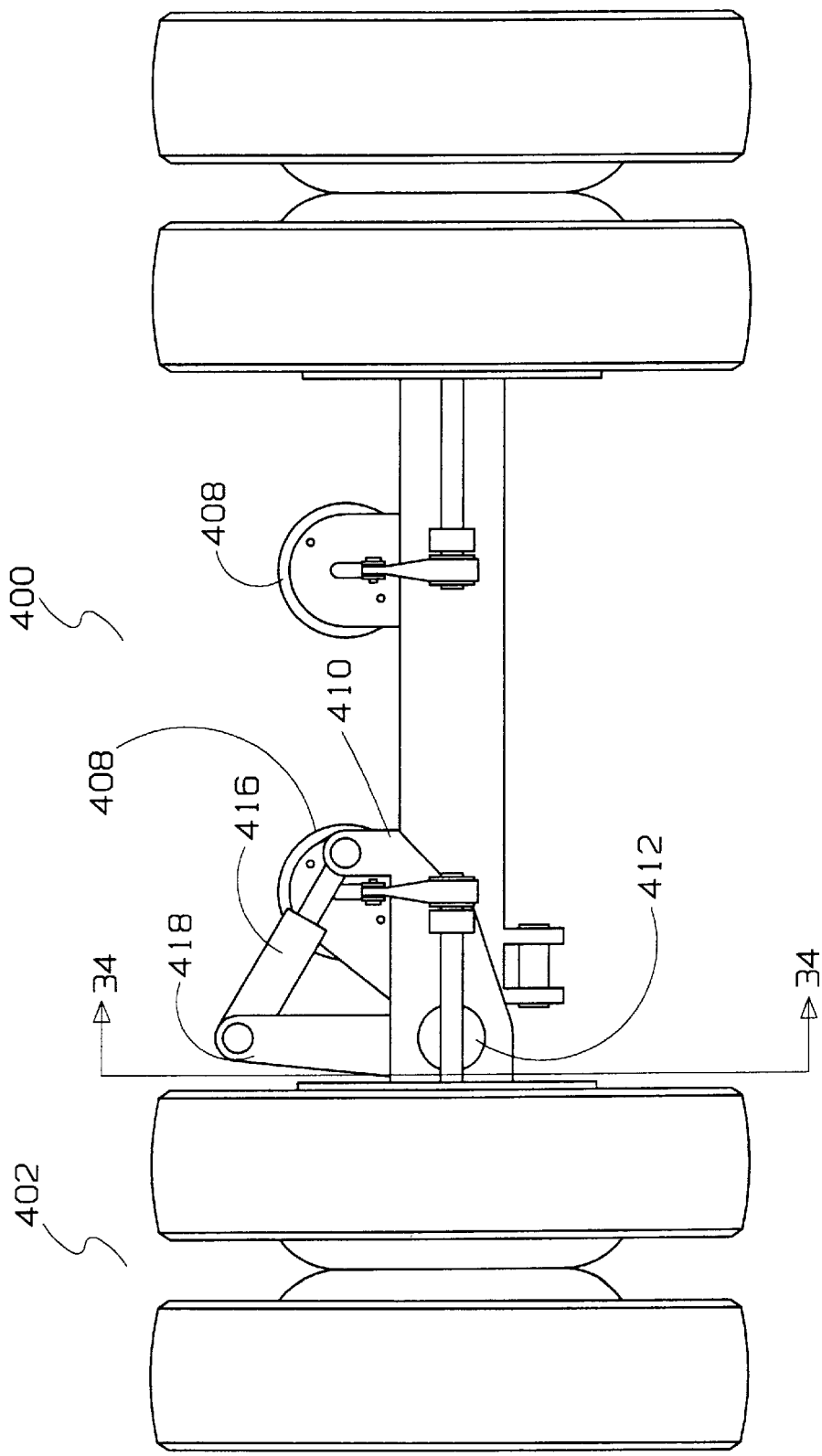

FIG. 32 illustrates an axle assembly consisting of two dual wheel assemblies in the normal transport position.

Figure 33:
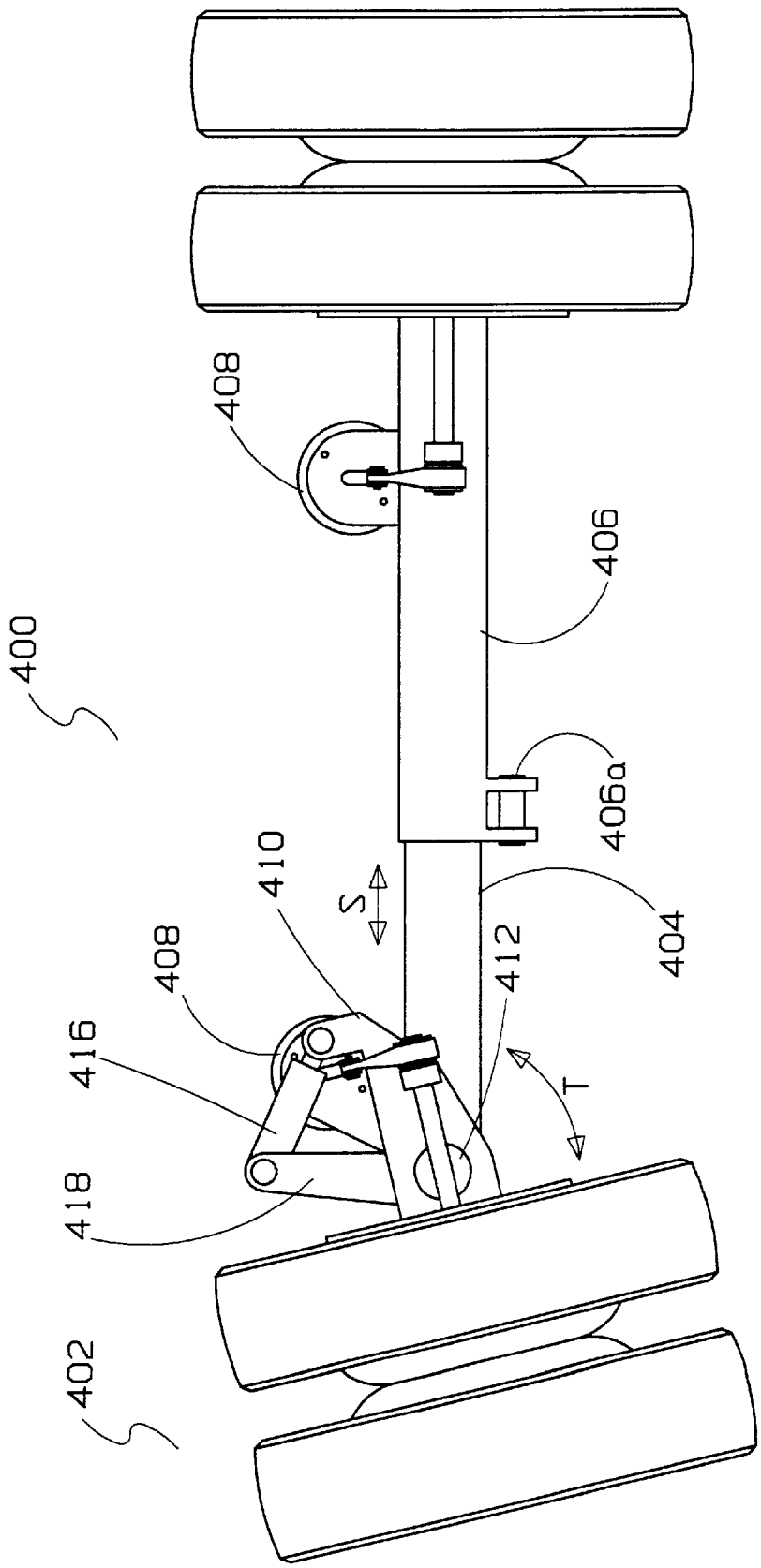

FIG. 33 illustrates the left wheel assembly in an extended and tilted position.

Figure 34:
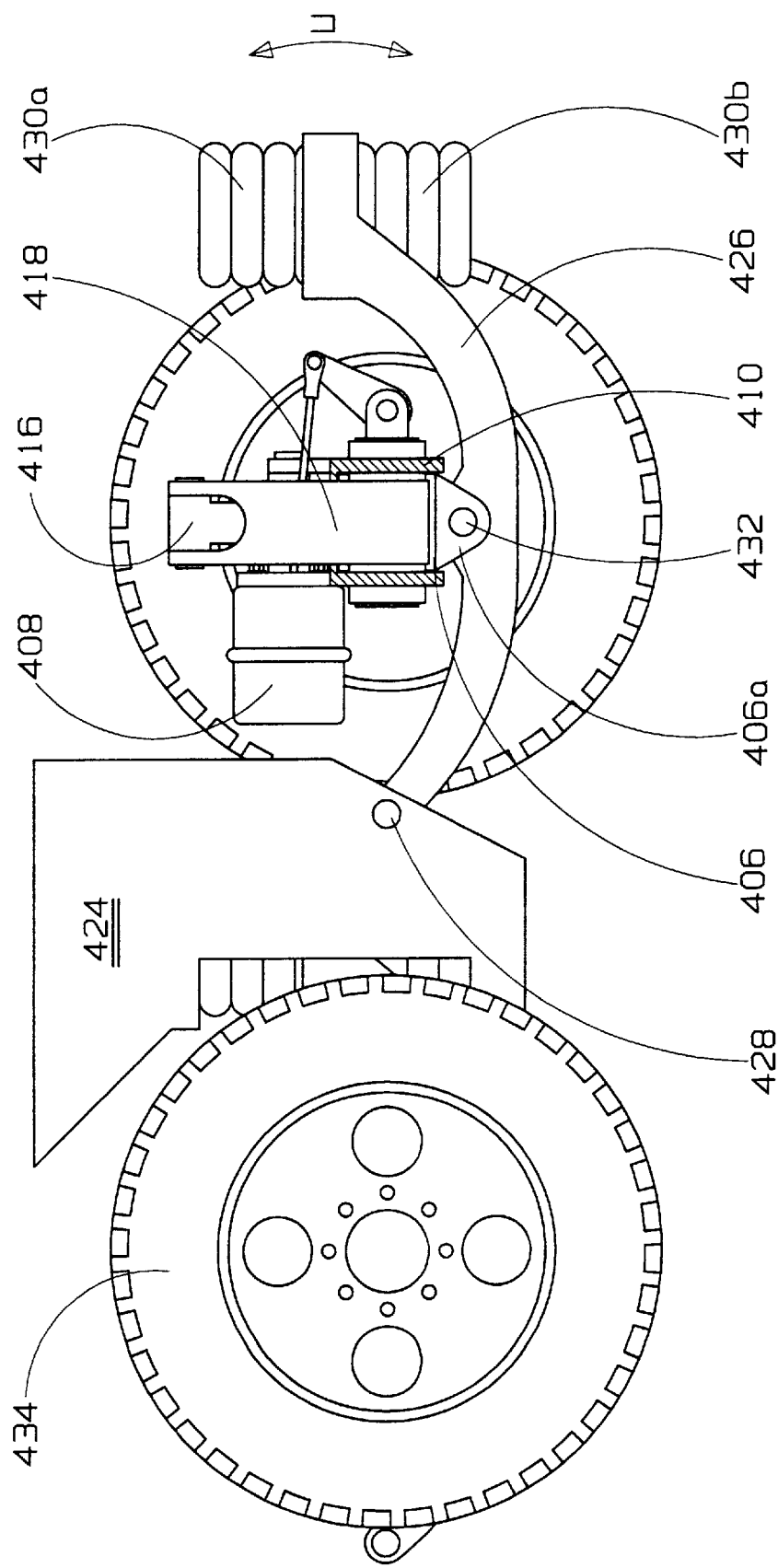

FIG. 34 illustrates an end section view of the extension axle and the attached tilt cylinder mounting bracket.

Figure 1A:
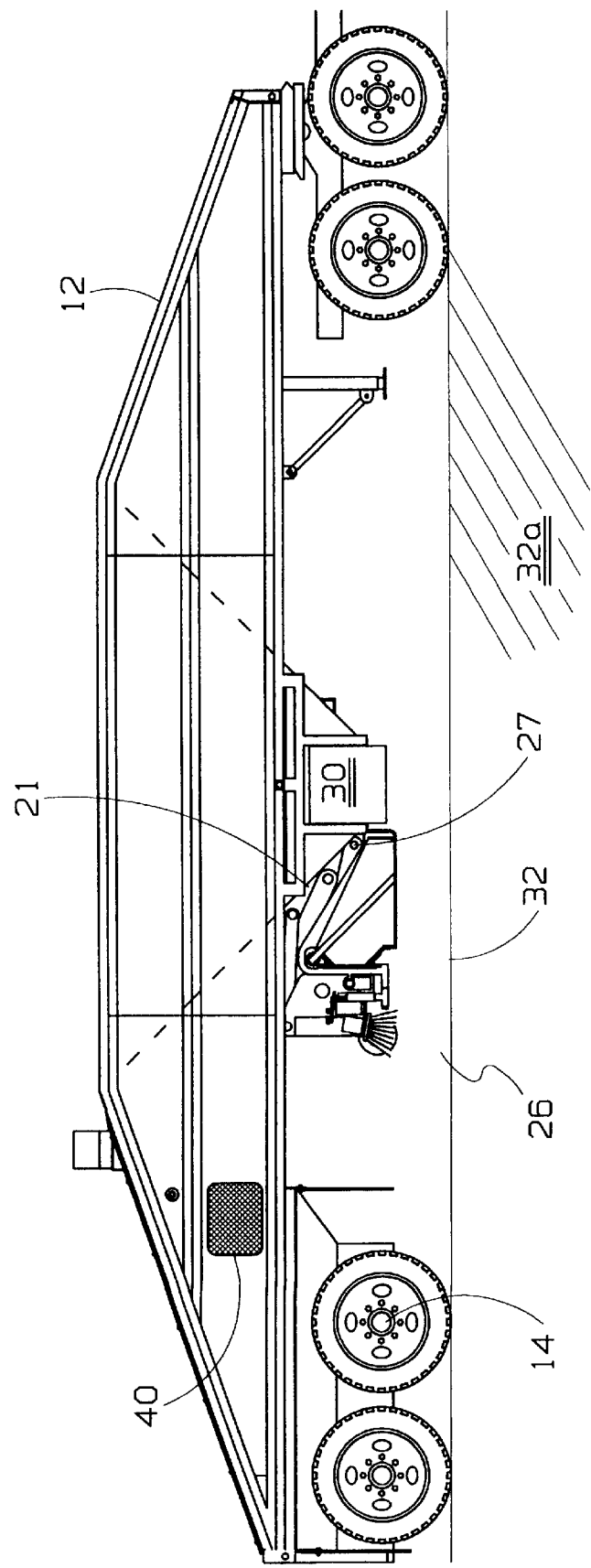
FIG. 1a is, in side elevation view, a trailer in a second embodiment incorporating the spreading machine of the present invention.
Figure 1C:
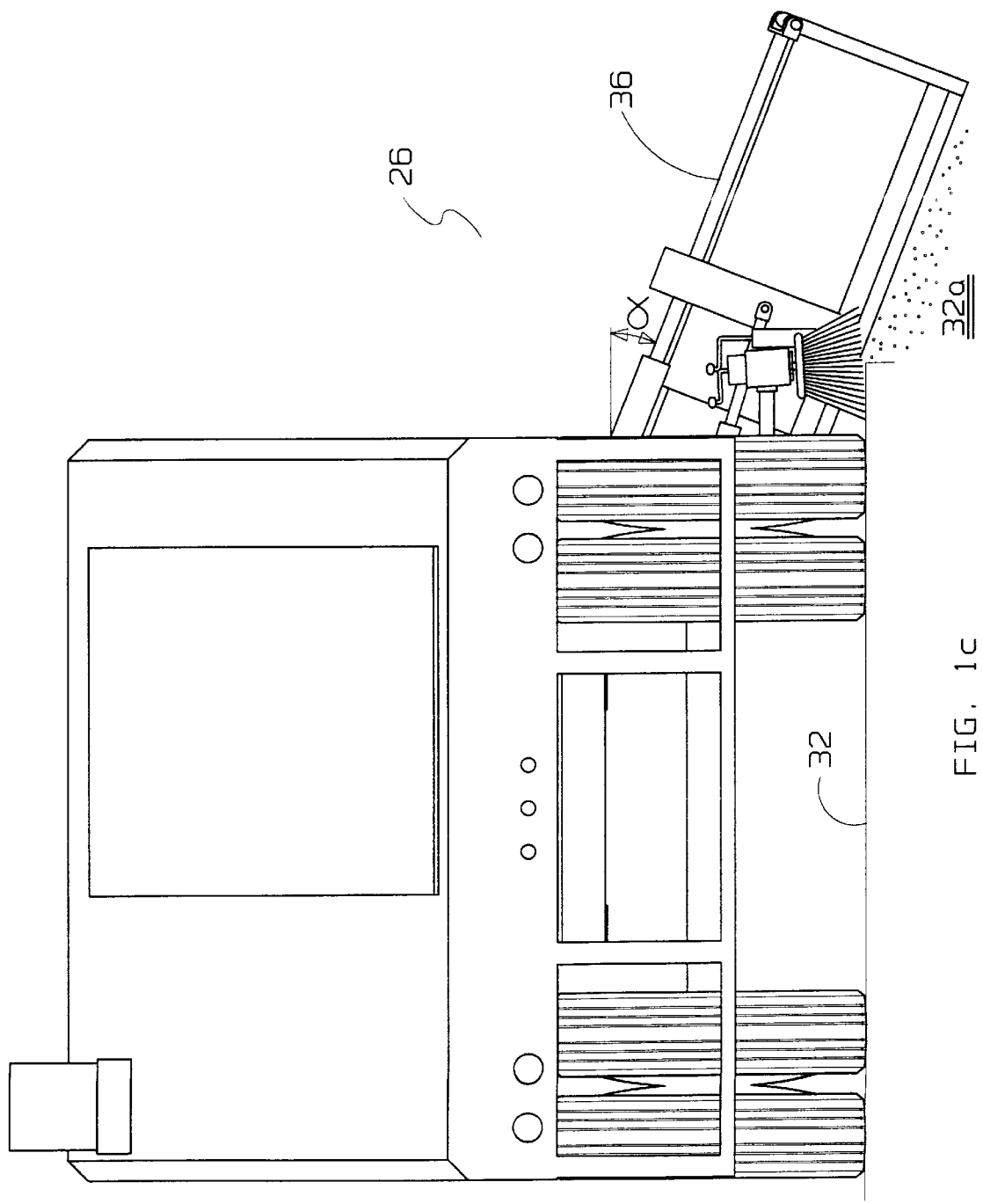
FIG. 1c is, in rear elevation view, the view of FIG. 1b with the blade inclined.
Figure 1D:
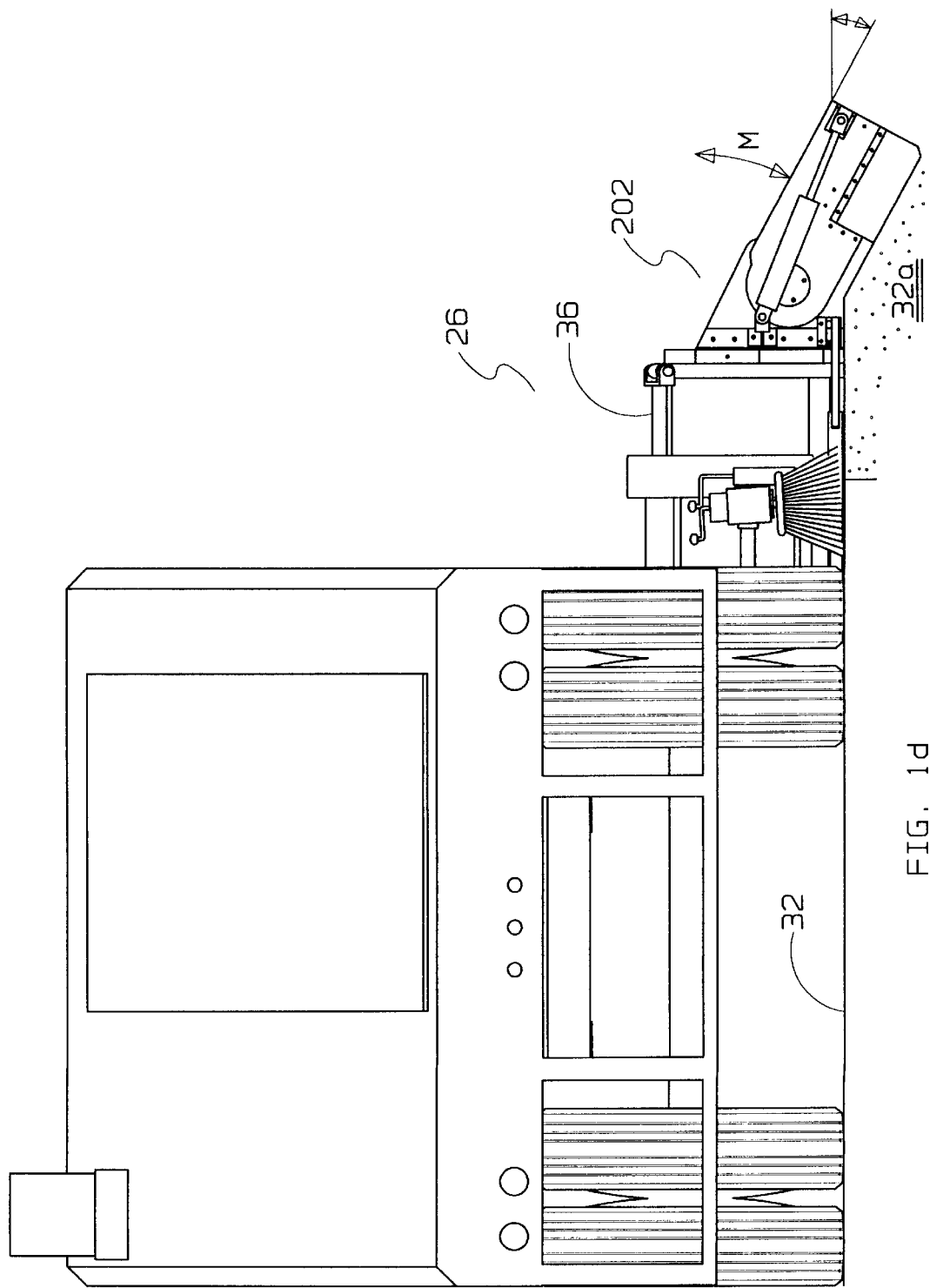
FIG. 1d is the view of FIG. 1b with a slope trimmer attachment mounted to the outermost end of the blade and inclined relative to the blade.
Figure 1E:
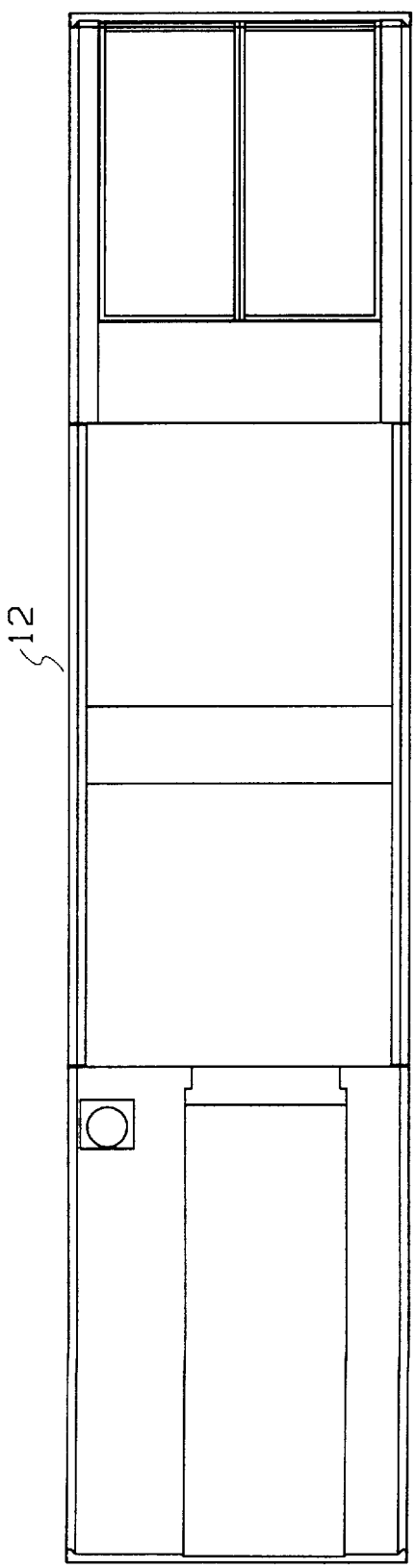
Figure 35:
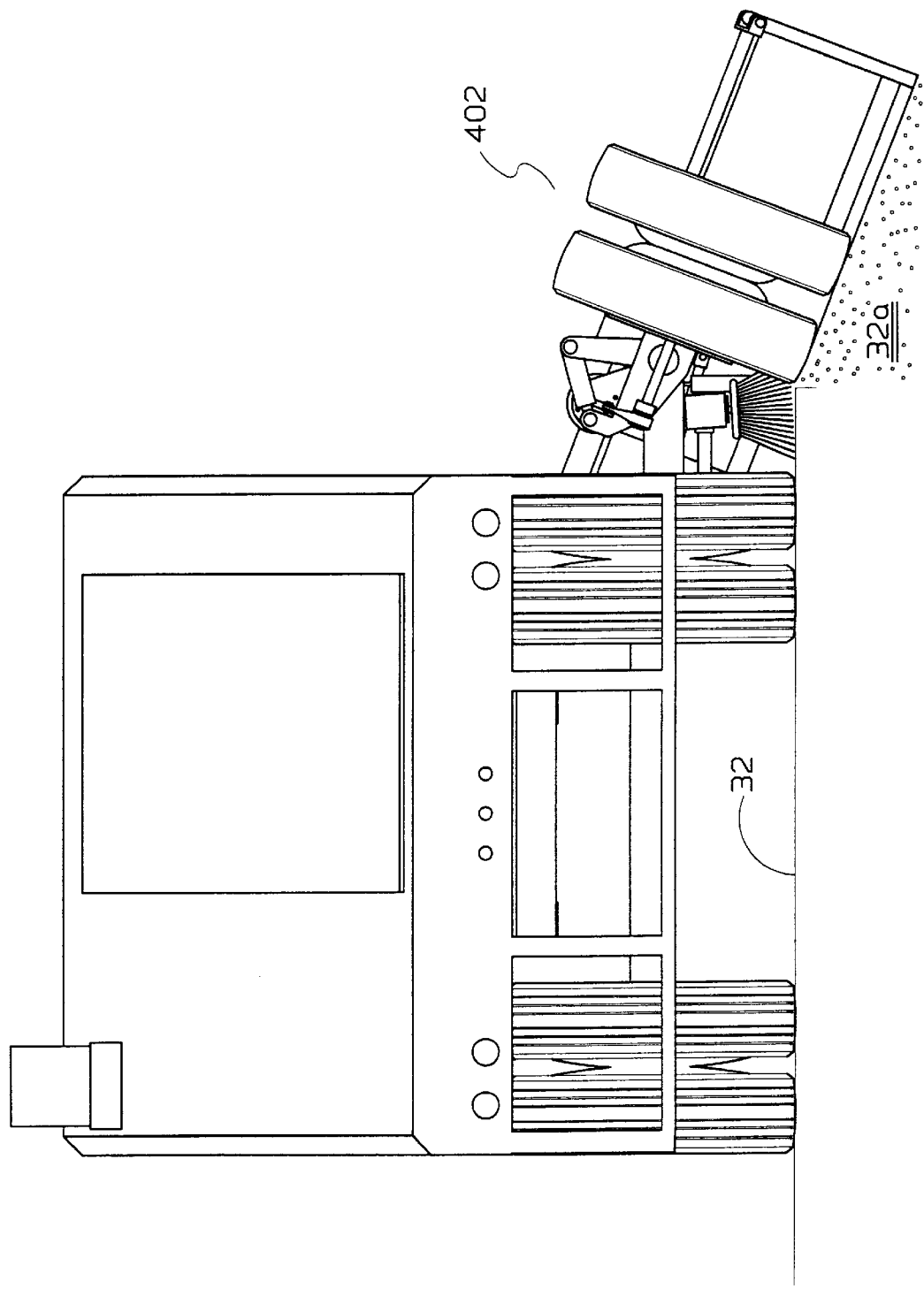

FIG. 35 is, in rear elevation view, the trailer of FIG. 1c with the dual wheel assembly inclined with the blade.

Figure 36:
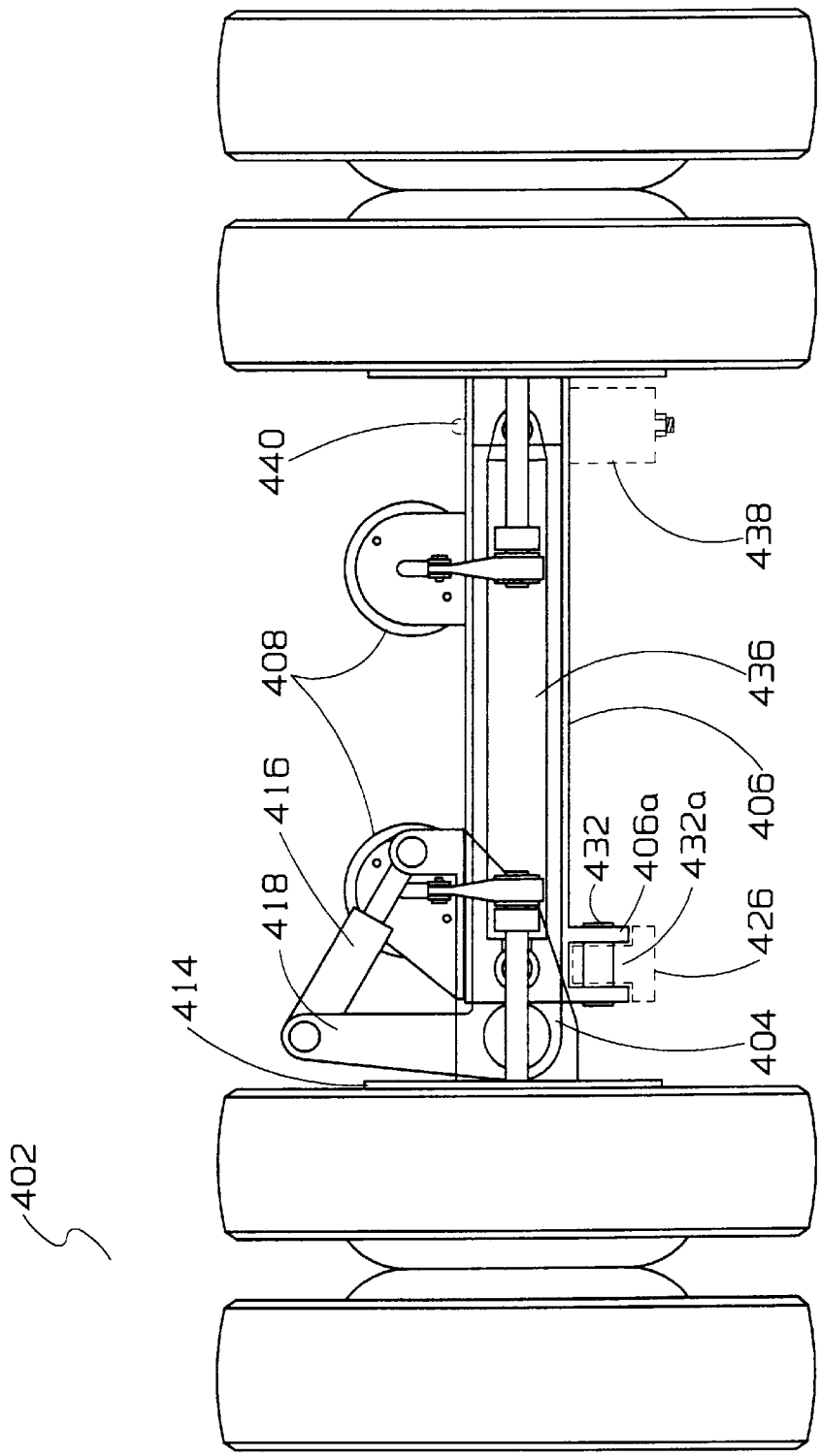

FIG. 36 shows the extension axle as well as the extension hydraulic cylinder.

Figure 37B:
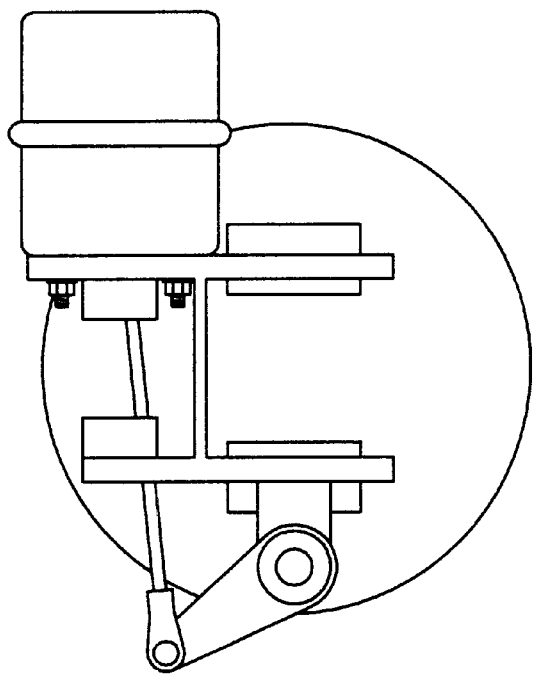
Figure 37A:
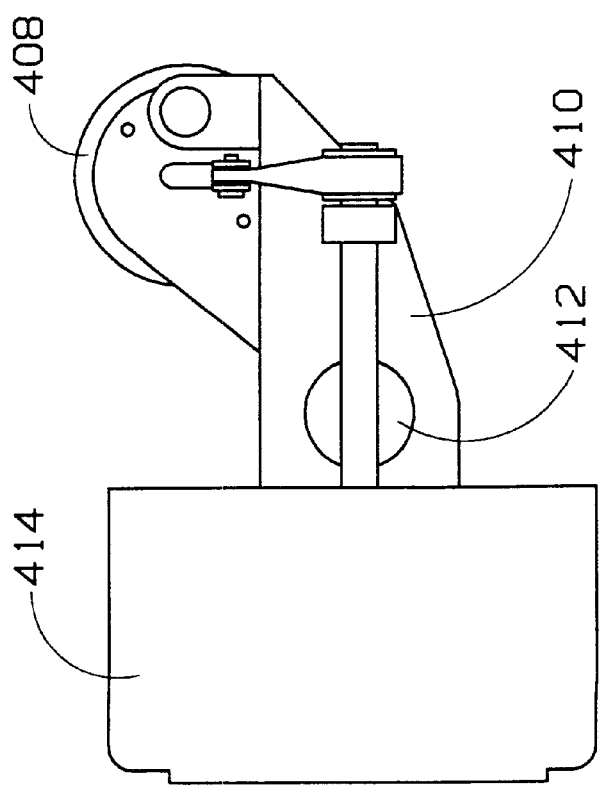
Figure 38B:
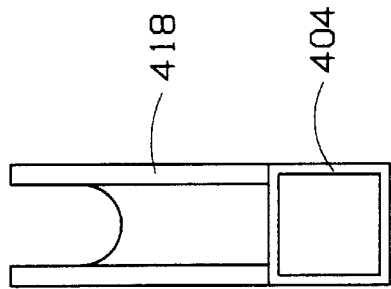

FIG. 37a is, in side elevational view, the brake assembly for the extension axle.

FIG. 37b is, in end elevational view, the brake assembly of FIG. 37a.

Figure 38A:
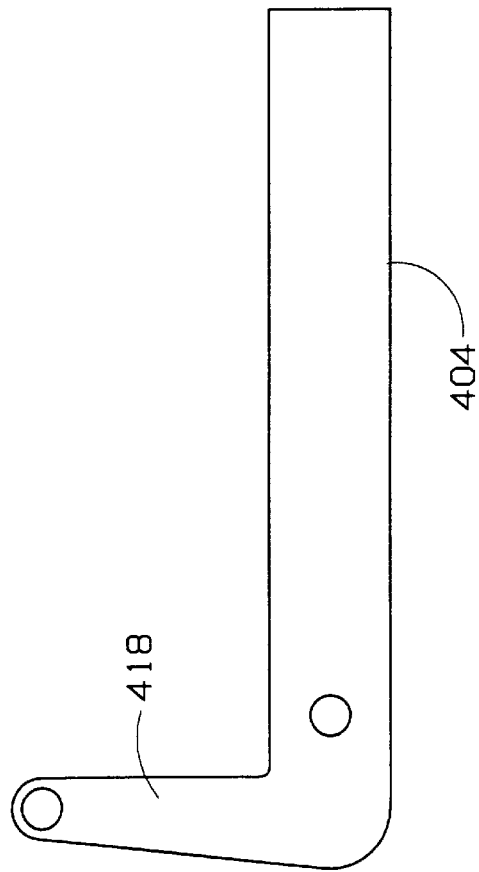

FIG. 38a is, in side elevation view, the extension tube of the extension axle of FIG. 36.

Figure 39B:
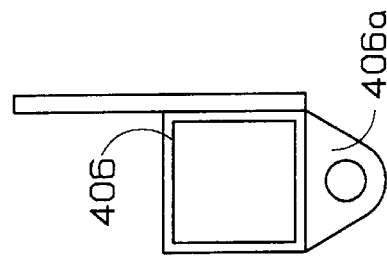
Figure 39A:
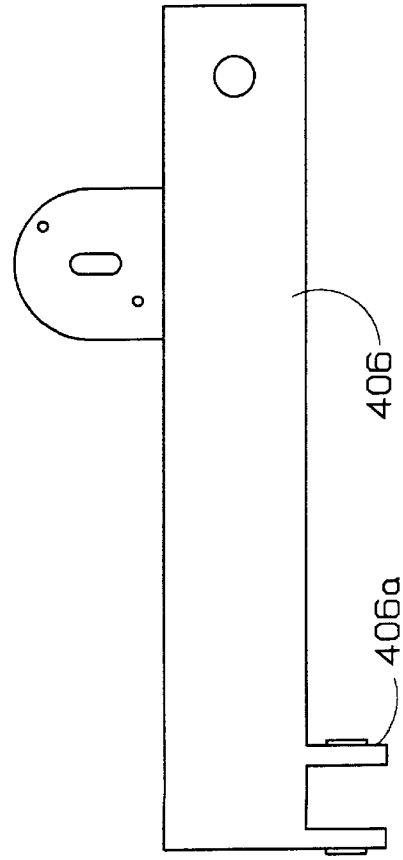

FIG. 39a is, in side elevation view, the axle housing of the extension axle of FIG. 36.

FIG. 39b is, in end view, the axle housing of FIG. 39a.

FIG. 40 illustrates suspension control arm and air bags.

FIG. 41 illustrates the vehicle frame bracket with the air bag housing for one axle in a tandem axle configuration and the pin boss for attaching the control arm for the other axle assembly and also illustrates the wheel tilt and extension hydraulic cylinders.

FIGS. 42a and 42b show an alternative design for a single wheel configuration in their extended and retracted positions respectively.

Figure 43:
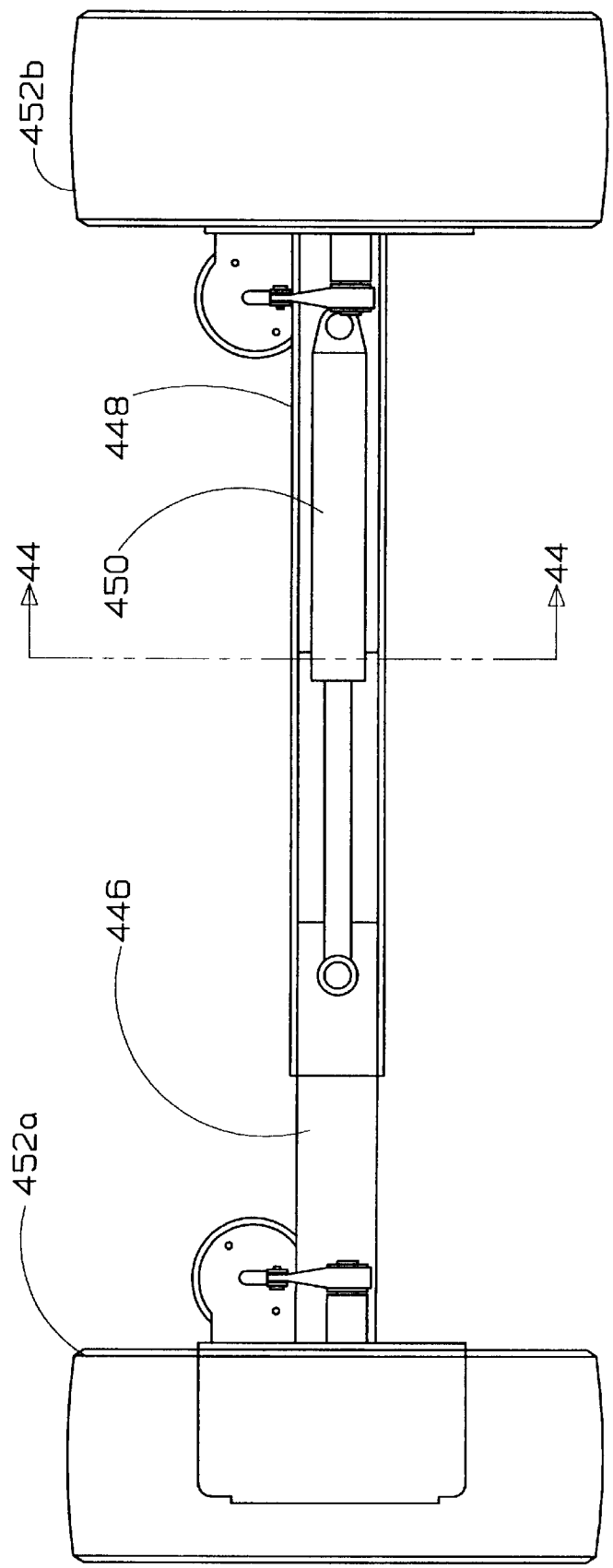

FIG. 43 illustrates an end section elevation of the axle housing attached to the vehicle suspension.

Figure 44:
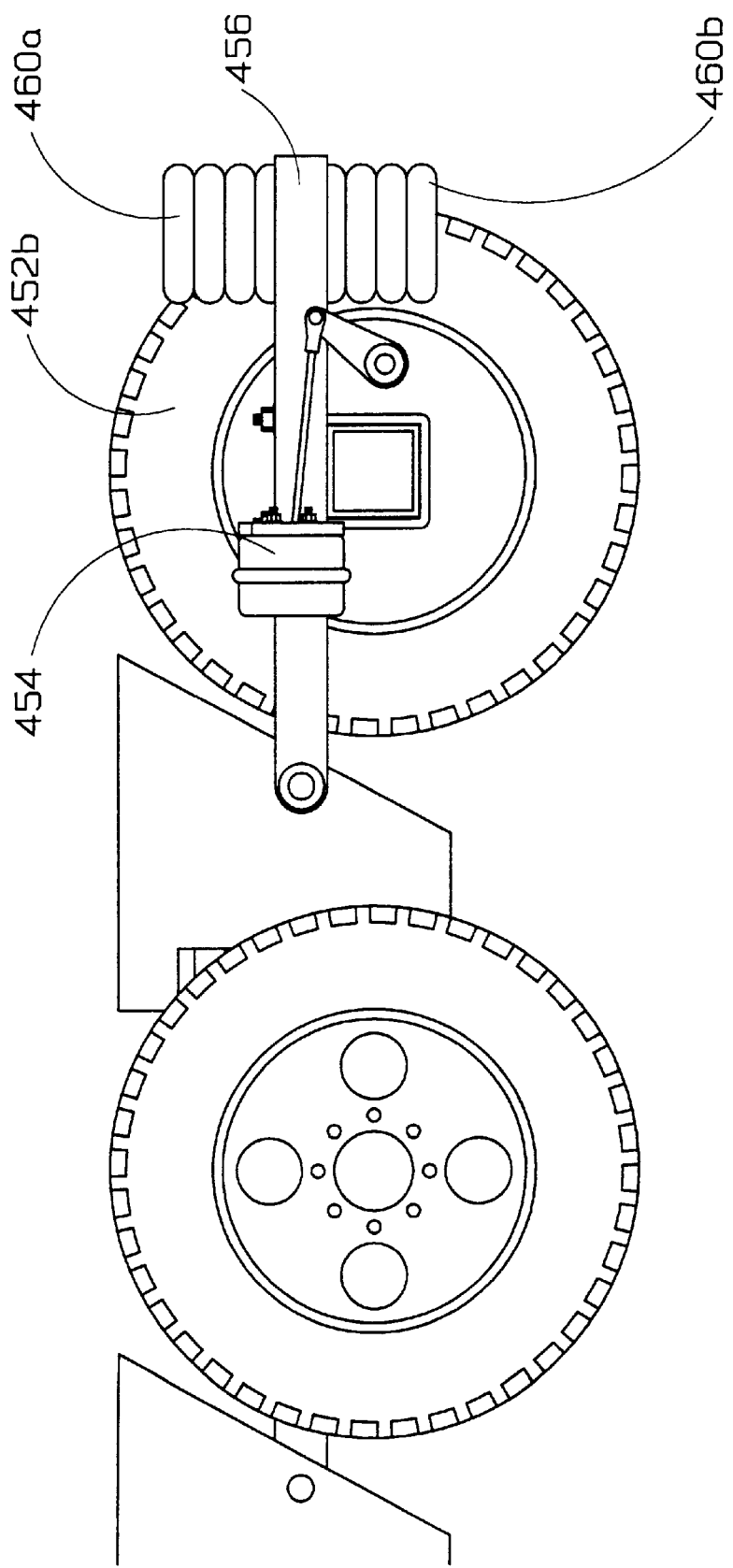

FIG. 44 is a seciton view along line 44—44 in FIG. 43.

FIG. 45 illustrates the right extension axle as well as suspension components.

FIG. 46 illustrates the the control arm airbags of FIG. 44.

Trailer Design

Figure 47:
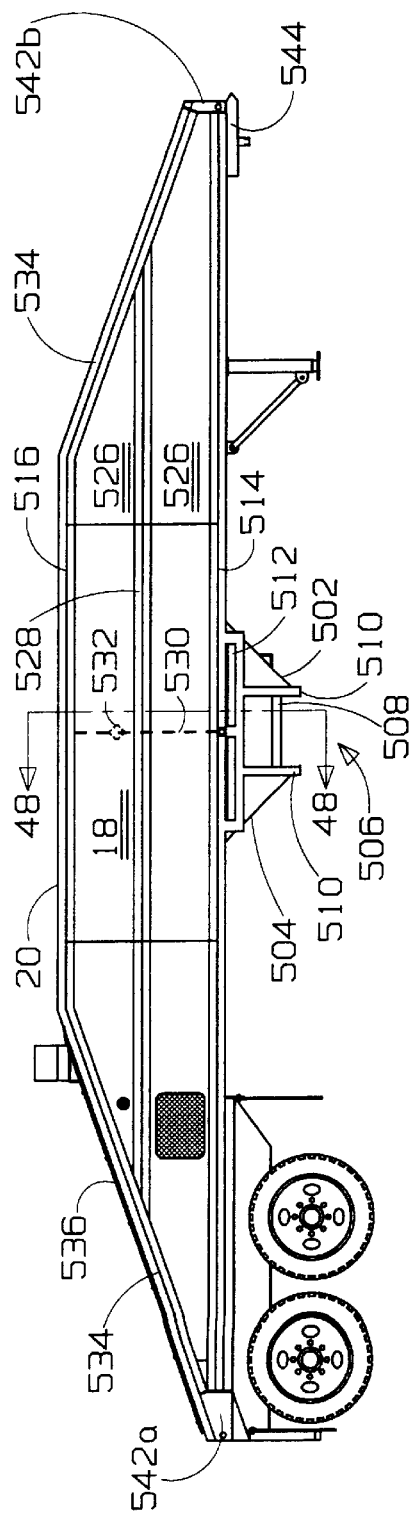

FIG. 47 is, in side elevation view, one embodiment of a trailer.

Figure 48:
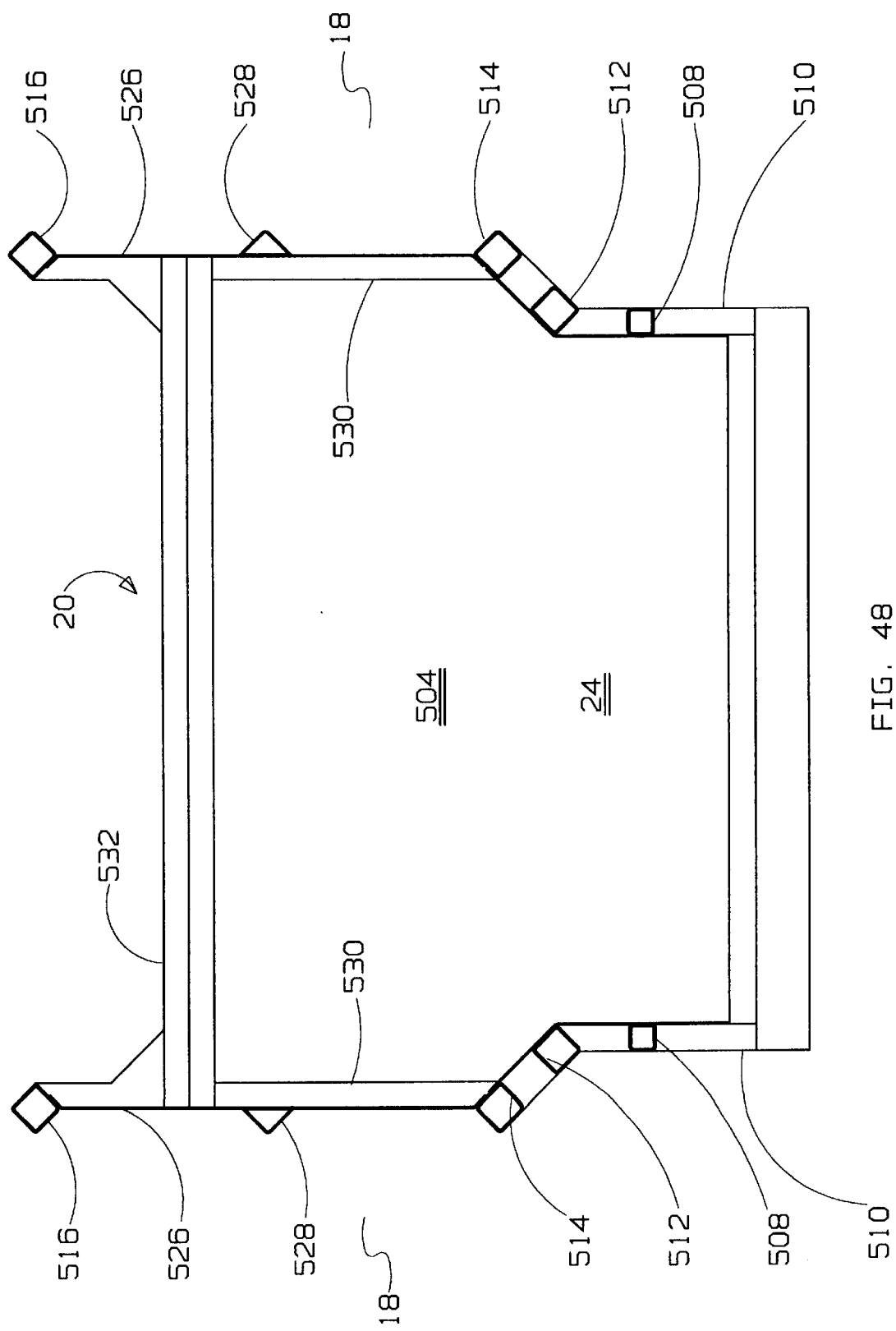

FIG. 48 is a cross-sectional view along line 48—48 in FIG. 47.

Figure 49:
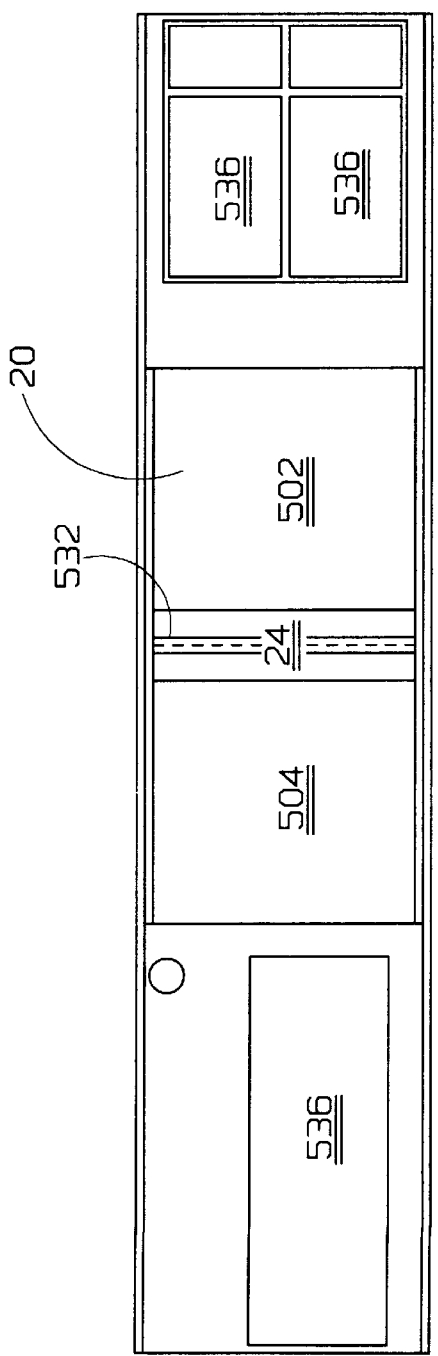

FIG. 49 is, in plan view, the trailer of FIG. 47.

Figure 50:
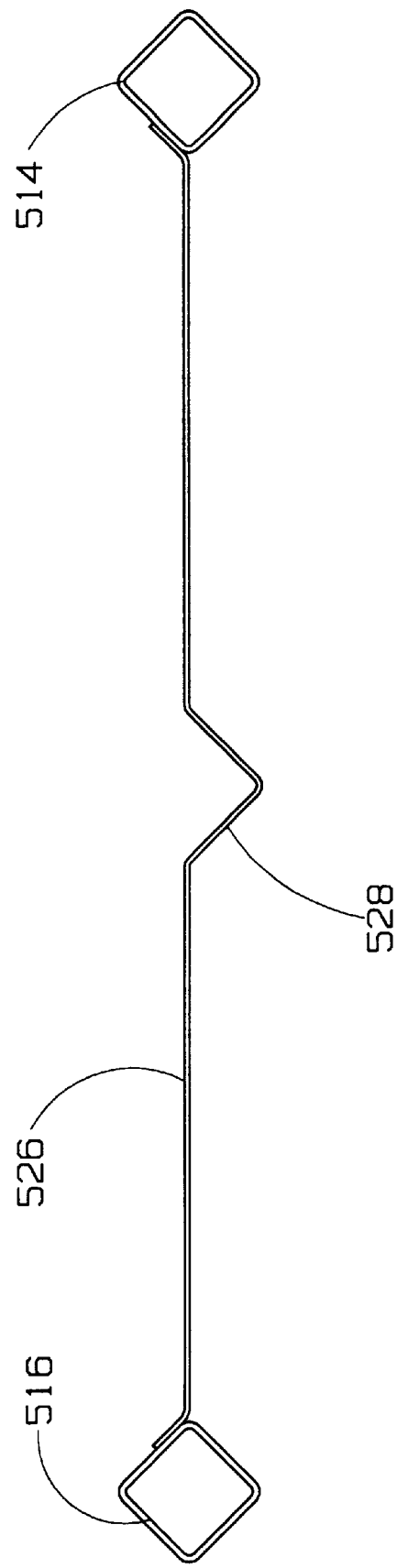

FIG. 50 is an enlarged cross-sectional view through a portion of a trailer sidewall, including skin and tube members, according to the design of FIG. 48.

Figure 51:
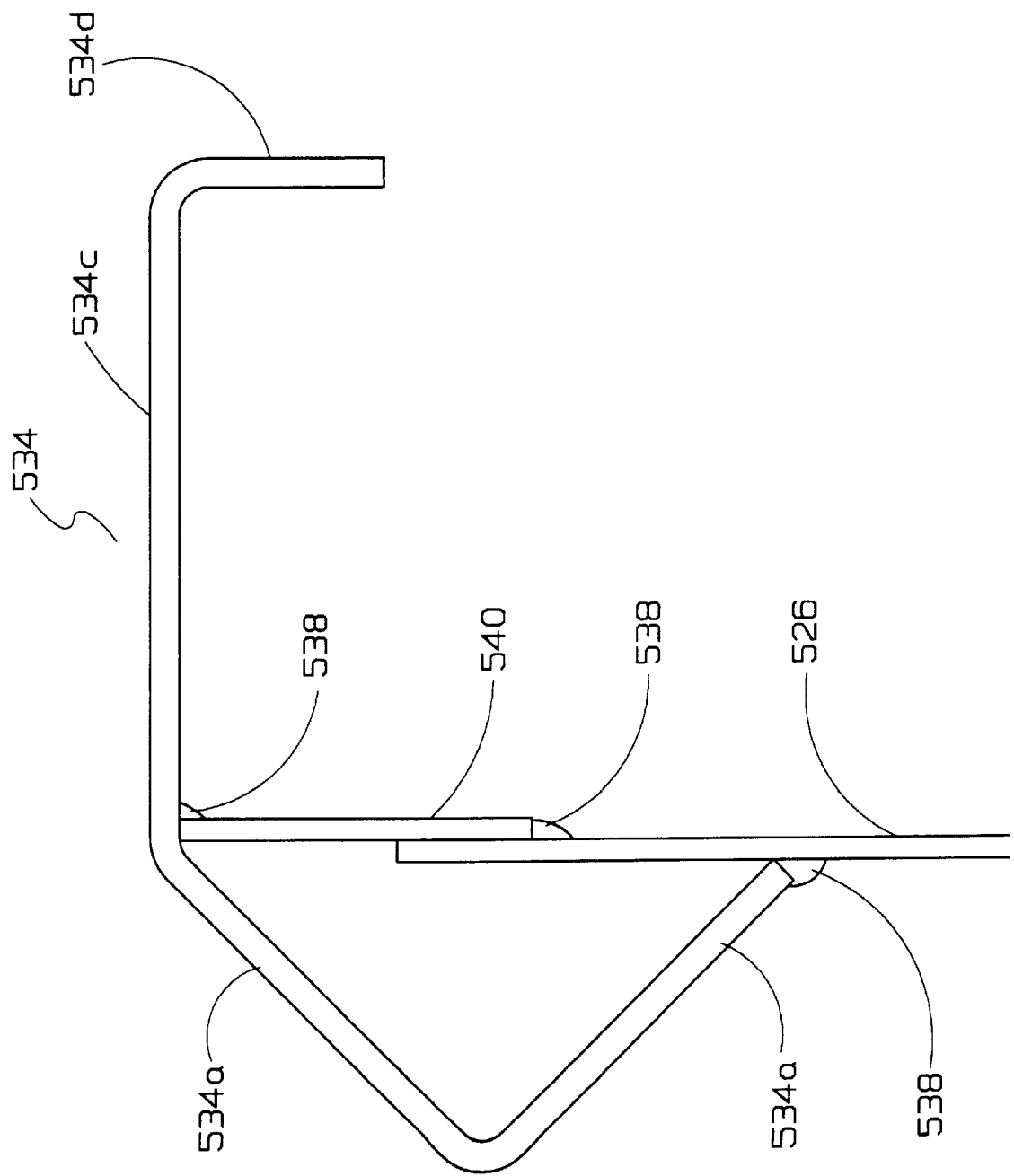

FIG. 51 is, in enlarged cut-away cross-sectional view, longitudinal formed members for rigid mounting onto the trailer of FIG. 47.

Figure 52:
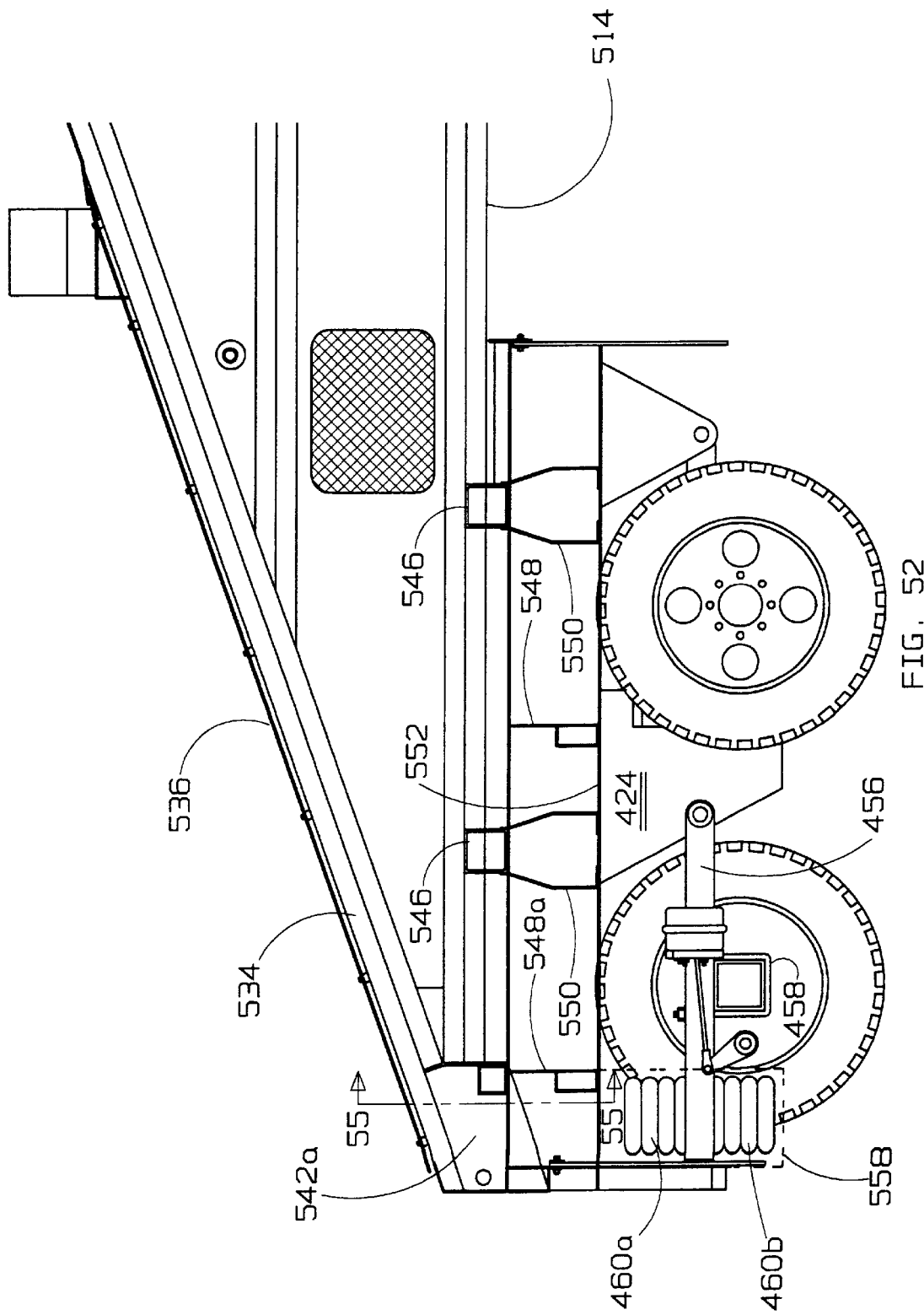

FIG. 52 is, an enlarged cut-away view of the rear end of the trailer of 47.

Figure 53:
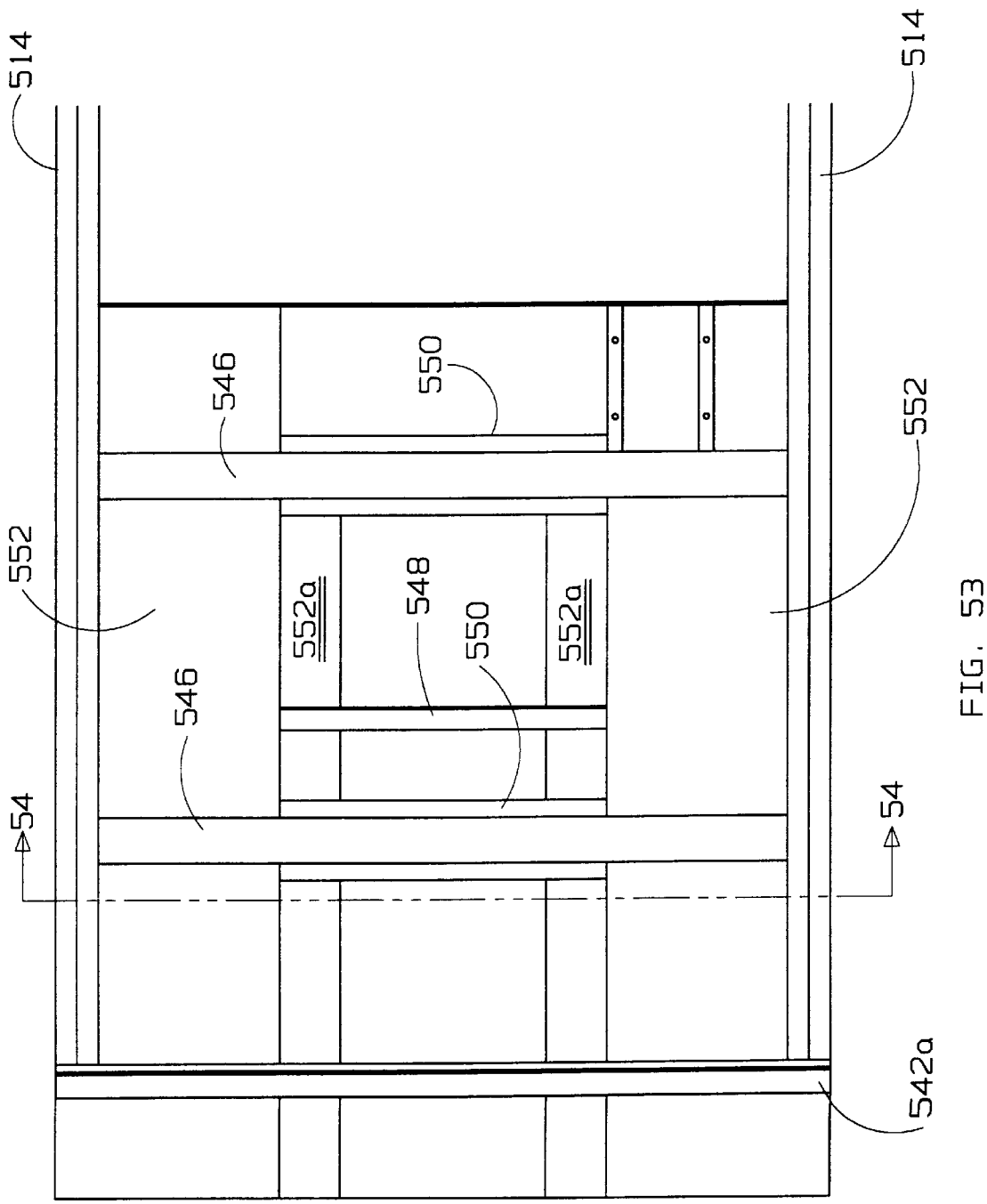

FIG. 53 is, in plan view, the view of FIG. 52.

Figure 54:
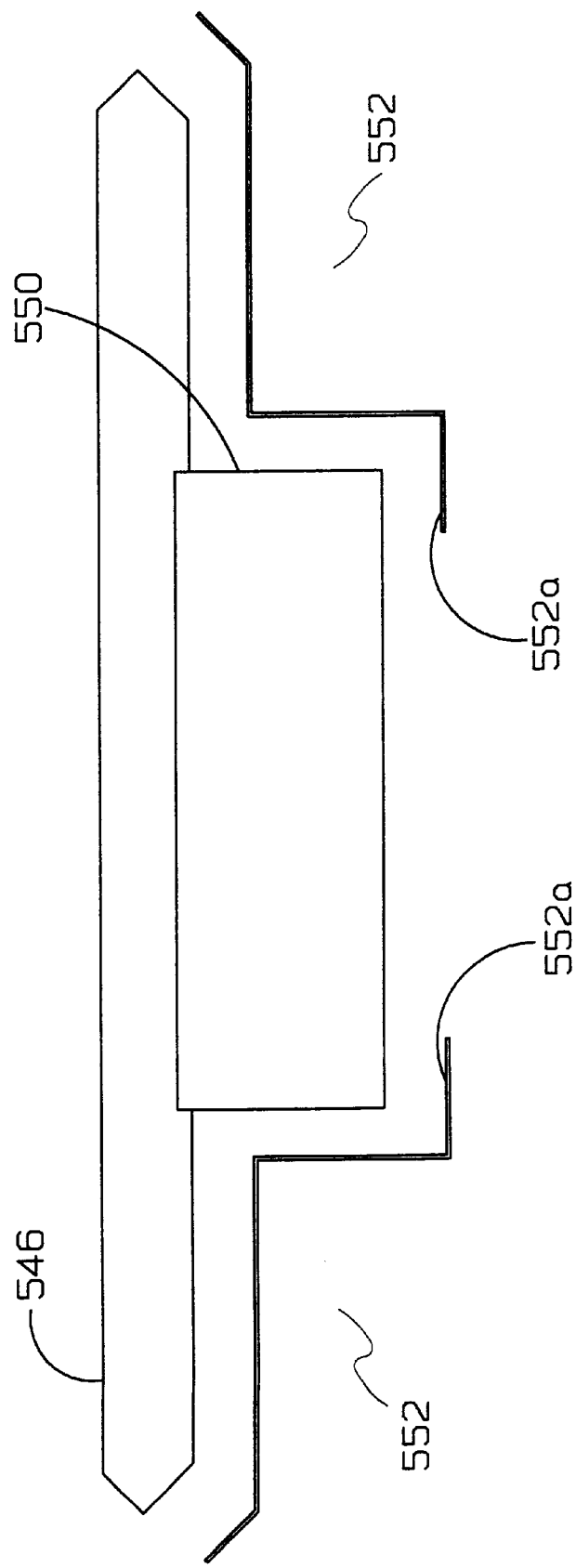

FIG. 54 is a cross-sectional view along line 54—54 in FIG. 53.

FIG. 55 is a sectional view along line 55—55 in FIG. 52.

FIG. 56 is, in rear elevation partially cut-away view, the rear most end of the trailer of FIG. 52.

DETAILED DESCRIPTION OF PREFERRED EMBODIMENTS

Spreading Machine With Rear Mounted Blade

As seen in FIGS. 1 and 1a, the spreading and compacting machine of the present invention, in its first embodiment, may be mounted beneath a belly-dumper style trailer. Thus for example, as seen in FIG. 1, a transportable storage bin for hauling spreadable materials such as aggregate and asphalt may take the form of trailer 10 or trailer 12. It is understood that other designs of belly-dumper trailer may be employed. Trailer 10 may be of the so-called "fifth wheel"-type. Advantageously, the rear trailer axle 14 is a steering axle which can be remotely operated and controlled from the cab of the trailer by means known in the art by a driver of a tractor pulling the trailer. Rear axle 14 may be one of a pair of trailer rear axles. The driver, while using the machine of the present invention, would advantageously steer the rear of the trailer outwardly to the side on which material is being deposited so as to improve the drive's view of the delivery, spreading and compacting operation.

In this embodiment, advantageously a second and rearmost trailer axle 16 of the pair of rear tandem axles is provided. The axle may be a lift axle as hereinafter better described. Otherwise, both tandem axles may be extendible as described below. With the lift axle down, typical dimensions of trailer 10 would be approximately 44 feet in length and 8.5 feet in diameter, that is, measured laterally from the outside surfaces of the opposed sidewalls 18 of bin 20. Bin 20 has inclined front and rear walls so as to funnel spreadable material 22 to a lowermost funnel aperture 24 at the bottom of bin 20. Funnel aperture 24, shown in dotted outline in FIG. 2, may extend laterally the full distance between side walls 18.

A spreading device generally indicated by the reference numeral 26 is mounted below, so as to depend from trailer 10. In this embodiment, spreading device 26 is mounted immediately aft of funnel aperture 24, it being understood that, in use, trailer 10 is translated in direction A. Legs 28 are retracted when the trailer is in use.

In operation, spreadable material 22 falls through funnel aperture 24 onto conveyor 30. Conveyor 30 deposits spreadable material 22 in direction B as a stream of material which falls onto the ground surface 32 immediately ahead of a blade cavity. Conveyor 30 in FIG. 1 is illustrated in a retracted position for transport and in FIG. 2 in a deployed position for discharging spreadable material 22.

As trailer 10 is translated in direction A, material 22 falling from conveyor 30 is channelled between retainer fences 34a and 34b so as to collect against blade 36 which has been positioned in proximity to ground surface 32. The retainer fences and blade define the aforementioned blade cavity. Rotating broom 38 may be provided aft of blade 36 to sweep clean ground surface 32 which typically would be the outermost edge of the road surface if the spreading device 26 is being employed to construct or maintain a road shoulder 32a.

In an alternative trailer embodiment seen in FIG. 1a, which is also a "fifth-wheel"-style trailer, tandem rear trailer axles are provided under the rearmost end of the trailer. As in the embodiment of FIG. 1, a self-contained engine or pressurizing the hydraulic system may be contained within engine compartment 40, aft of bin 20.

In operation, as better seen in FIGS. 1b–1c, A3, A3a, A4, A6 and A6a, spreading device 26 may be selectively extended laterally from underneath the trailer, selectively to either side of the trailer, and may be selectively inclined to accommodate formation of, for example, an inclined road shoulder according to a desired specification. Spreading device 26 is selectively elevated or lowered by selective actuation of lift cylinder 27. Lift cylinder 27 is pivotally mounted at one end to bracket 29 and at its other end to trailer frame member 21. Bracket 29 and control arm 31 are pivotally mounted to trailer frame member 21 though common pin 33. The opposite end of control arm 31 is pivotally mounted to swivel housing 62 by pin 35. Control arm 37 is also pivotally mounted to trailer frame member 21. Control arm 37 is mounted to trailer frame member 21 by means of pin 37a, and is pivotally mounted to swivel housing 62 by pin 37b. Actuation of lift cylinder 27 rotates spreading device 26 in direction C so as to rotate panographic control arms 31 and 37 thereby selectively elevating or lowering spreading device 26. Lowering spreading device 26 engages wheel 42 with ground surface 32.

Blade 36 is extended laterally outwardly of the trailer and wheel assembly by means of extension cylinder 44. One end of extension cylinder 44 is pinned to extension cylinder bracket 46 and the other end is pinned to end cap retainer fence 34a on the opposite laterally outermost end of blade 36.

Inner retainer fence 34b is also selectively positionable relative to the wheel assembly. Inner retainer fence 34b is selectively positioned by means of cylinder 48. Inner retainer fence 34b has shaped slot and aperture 50 through which may be slid blade 36 so as to allow selective adjustment of retainer fence 34b relative to blade 36. In operation, inner retainer fence 34b is maintained at a position aligned with the edge of road surface 32.

The angle of inclination α of blade 36 relative to the horizontal is selectively adjustable by means of actuable tilt cylinder 50. Tilt cylinder 50 is pinned at an upper end to frame member 52 which is mounted to the swivel housing 62. Wheel cylinder housing 54 in swivel housing 62 houses wheel cylinder 56, pinned at its upper end within the housing and pinned at its lower end to its wheel assembly 58 supporting wheel 42. The lower end of tilt cylinder 50 is pinned to a slide bracket 60 itself rotatably mounted to a swivel housing 62 by means of a swivel assembly 64. Thus in this embodiment, blade 36 may be extended laterally out of either the port side or the starboard side of trailer 10 by selective actuation of extension cylinder 44. It is understood that a retainer fence similar to end cap retainer fence 34a, indicated by reference numeral 34a' provides an end cap on the port side of blade 36. Retainer fence 34b may be adjusted along the length of blade 36 so that the desired width of material 22 is deposited onto ground surface 32 for example so as to form shoulder 32a of a desired width.

The operation of conveyor 30 is better seen in FIGS. 7 and 8 wherein in 7, the end of conveyor 30 is retracted for transport, and in FIG. 8 the end of conveyor 30 is deployed so as to discharge material 22. The end of conveyor 30 which may be retracted or deployed includes a pivotally mounted rigid member 66 pivotally mounted by shaft 68 to base rigid member 70. Member 66 may be triangular in shape so as to provide a lever arm when extension cylinder 72 is pinned to the vertex 74 of member 66, the opposite end of extension cylinder 72 pinned to base member 70. Actuation of extension cylinder 72 pivots member 66 about shaft 68 in direction D. A conveyor chain 76 rotates in a closed loop around sprockets 78 so as to form a selectively actuable closed loop conveyor. The tension of chain 76 may be adjusted by means of tension adjustment bolt 80. It is understood that chain 76 may be replaced by a rubber conveyor belt. Other means of delivering material 22 from bin 20 are also comprehended within the scope of this invention. For example, a pivotable chute may be employed to direct material 22 laterally outward from under bin 20.

Conveyor 30 is mounted to the trailer. Base rigid member 70 is slidably mounted on trailer frame 82 so as to be selectively extendable laterally outwardly in direction D' by means of selectively actuable slide cylinder 84.

Figure 9:
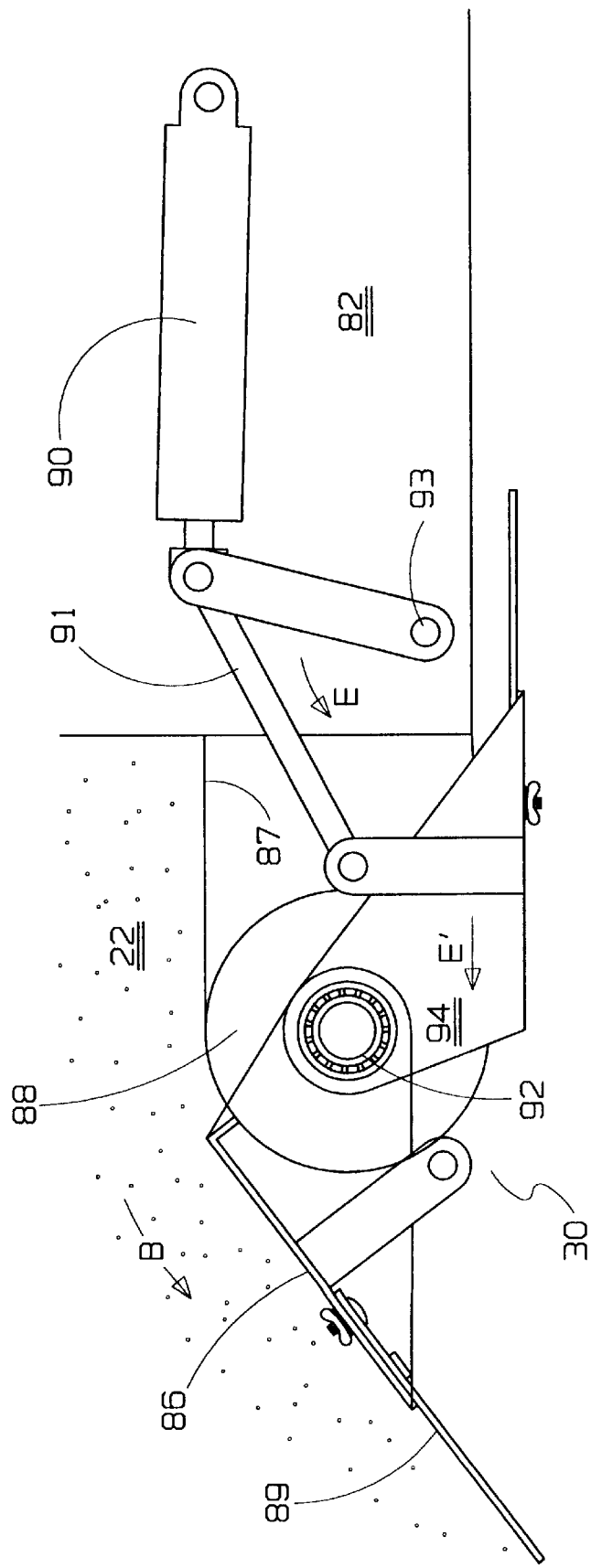
FIG. 9 is, in side elevation view, the conveyor head pulley assembly of the spreading machine of the present invention.

As seen in FIG. 9, for use as an example when conveyor 30 is a rubber conveyor, adjustable chute 86 is provided to position and deliver material 22 further laterally outwardly of the trailer or, for example, so as to be deposited over a roadside curb. The laterally outermost end of conveyor 30 has rubber belt 87 rotating around head pulley 88 so as to deliver material 22 in direction B over chute 86. Adjustable extension member 89 may be removably mounted to adjustable chute 86. Selectively actuable cylinder 90, mounted to trailer frame 82 may be actuated to drive parallelogram linkage 91 to selectively position head pulley 88 and chute 86, chute 86 mounted to common shaft 92 upon which head pulley 88 is rotatably mounted. Actuation of cylinder 90 rotates linkage 91 about torsion rod 93 in direction F, so as to translate head pulley frame member 94 and chute 86 in direction E'. This embodiment may be used in conjunction with, or as a substitute for, laterally extending the conveyor outwardly from under the trailer.

Figure 6A:
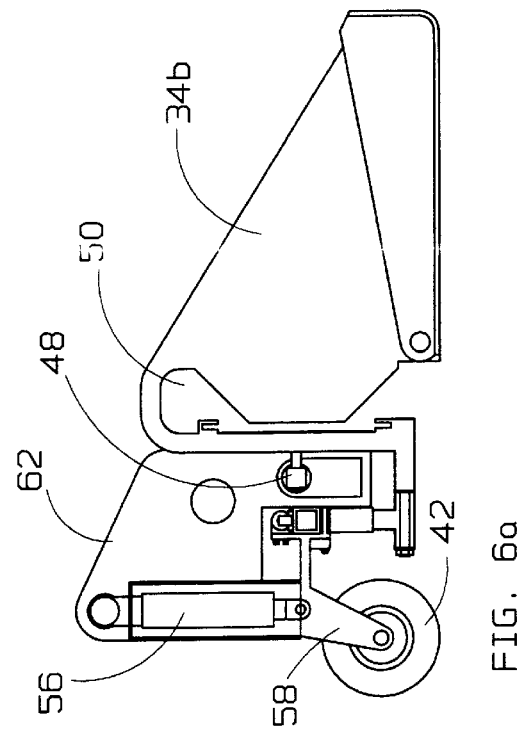
FIG. 6a is, in side elevation view, the wheel and blade assembly of FIG. 6.
Figure 6:
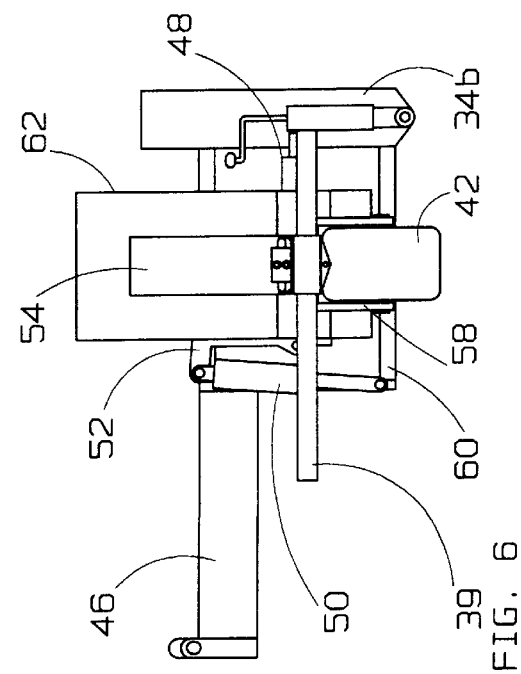
FIG. 6 is, in rear elevation view, the wheel and blade assembly of the spreading machine of the present invention.

Broom 38 is maintained in a generally level orientation independent of the inclination of blade 36, by means of levelling bracket 39. As better seen in FIGS. 6b and 6c, which are enlarged view of the levelling mechanism of FIGS. 6 and 6a, levelling bracket 39 is slidably journalled through sleeve 41. Sleeve 41 is pivotally mounted to swivel housing 62 at pin 41a. Levelling bracket 39 is pivotally mounted to retainer fence 34b by common pin 39a. Thus as blade 36 is inclined relative to swivel housing 62 so as to also incline retainer fence 34b from the vertical, levelling bracket 39 is urged out of the horizontal. Movement of levelling bracket 39 by way of rotation about pin 41a, trips hydraulic switch mechanism 43. Hydraulic switch mechanism 43 is tied into the hydraulic control of wheel cylinder 56 so that, as levelling bracket 39 rotates out of the horizontal, hydraulic switch mechanism 43 actuates wheel cylinder 56 to either raise or lower wheel 42 as required to return levelling bracket 39 to the horizontal.

Figure 10B:
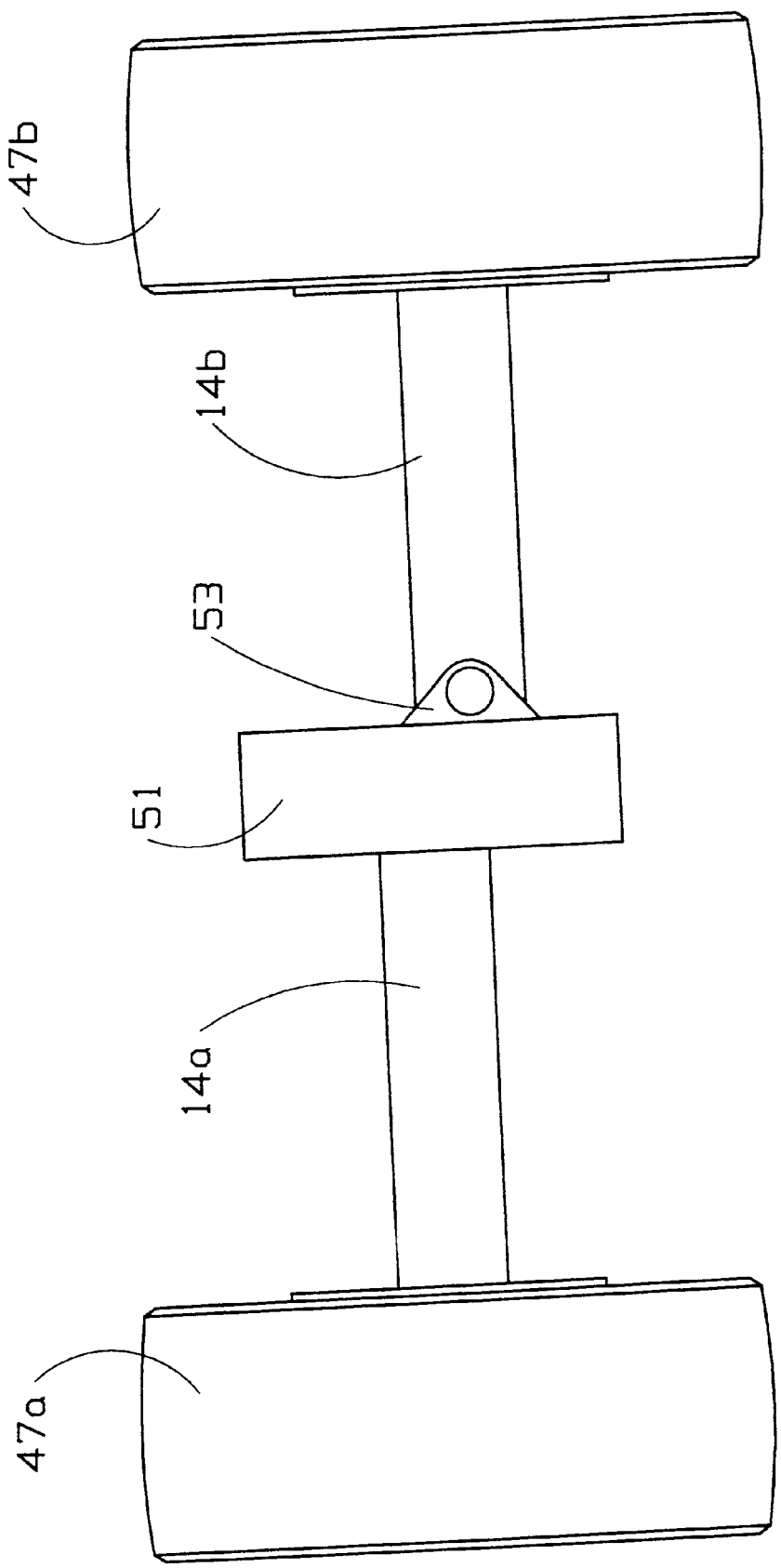

As mentioned above, trailer axle 14 is a steering axle. As bettor seen in FIGS. 10 and 10a, axle 14 is split into two opposing stub axles 14a and 14b. Stub axles 14a and 14b abut at a sliding coupling 45. Sliding coupling 45 is laterally centered between trailer wheels 47a and 47b. Sliding coupling 45 has tube 49 snugly slidably journalled within sleeve 51. Tube 49 is rigidly mounted to the laterally innermost end of stub axle 14a. Sleeve 51 is pivotally mounted to the laterally innermost end of stub axle 14b about pivot assembly 53. Slider cylinder 55 is mounted within tube 49 along the common vertical plane of symmetry, common between tube 49 and sleeve 51. One end of slider cylinder 55 is pivotally mounted to sleeve 51 at pin 55a. Slider cylinder 55 is pivotally mounted to tube 49 at pin 55b. Actuation of slider cylinder 55 slides tube 49 relative to sleeve 51 thereby selectively altering the alignment of stub axle 14a relative to stub axle 14b. Selective actuation of slider cylinder 55 thereby allows co-linear alignment of stub axle 14a with stub axle 14b so that wheels 47a and 47b are parallel width the other trailer wheels, for example, during road transportation of the trailer. Selective actuation of cylinder 55 also thereby allows dog-tracking of wheels 47a and 47b so as to steer the rear of the trailer laterally relative to the line of travel of the trailer in direction A. Dog-tracking of the wheels of course refers to turning of the wheels in a common direction by a common degree of rotation so as to maintain wheels 47a and 47b parallel to each other but angularly offset relative to the wheels on the tractor as seen in FIG. 10b.

Spreading Machine With Forward Mounted Blade

An alternative embodiment is illustrated in FIGS. 11–19. In this embodiment, the material spreading device 100 is mounted forwardly relative to trailer 102 in the direction of tractor 104 so as to be mounted forwardly of a funnel aperture 106 through a lowermost end of bin 108 formed between bin walls 108a. Spreadable material 22 such as aggregate or asphalt held within bin 108 falls through funnel aperture 106 onto first conveyor 110. First conveyor 110 conveys material 22 in direction F so as to deposit material 22 onto second conveyor 112. Second conveyor 112 moves material 22 in a direction orthogonal to the view of FIGS. 11 and 12, for example, as illustrated in FIG. 11, material 22 is moving towards the view so as to be deposited in direction G into blade assembly 14.

Trailer 102 is pulled in direction H by tractor 104 during the material spreading operation of material spreading device 100. Thus, as material 22 is deposited in direction G into blade assembly 114, it accumulates between rigid fences 116 and 117 on either side of adjustable fence 118, depending on the position of adjustable fence 118 between rigid fences 116 and 117. Adjustable fence 118 provides for controlled spreading of material 22 in a width, to either side or below the trailer as defined by the lateral spacing between adjustable fence 118 and the corresponding rigid fence be it rigid fence 116 or rigid fence 117. Because blade assembly 114 is also translating in direction H, material 22 accumulates against blade 120. Blade 120 may be seen in side elevation view best seen in FIGS. 18 and 19 and extends between rigid fences 116 and 117. The elements of blade 20 are generally planar.

Adjustable fence 118 is rigidly mounted perpendicular to channel member 124. Channel member 124 is slidably mounted onto the uppermost edge of blade 120 and onto guide flange 120a which extends rigidly upwardly of the upper surface of blade 120 generally parallel to the upper edge of blade 120. Adjustable fence 118 may be selectively adjusted relative to blade 120 by selectively sliding fence 118 relative to blade 120. A motivating means such as motor 126 may be mounted onto channel member 124 for rotation of pulley 126a. Pulley 126a winds itself along a cable 126b so as to selectively translate channel member 124 and adjustable fence 118 relative to blade 120. Cable 126b is mounted fixed at its ends to either end of the blade. As pulley 126a is rotated it winds itself along the cable and carries the retainer fence 118 and its motor with it along the length of the blade.

The lateral position of blade 120 is selectively laterally adjustable by selective sliding of blade 120 relative to blade slide bracket 128 mounted to wheel assembly 130 better seen in FIG. 15. Rigid generally vertical flanges 132a and 132b are rigidly mounted so as to extend, respectively, upwardly and downwardly from blade 120. Flanges 132a and 132b are generally planar and elongate and are slidably mounted within guide channels 128a and 128b in blade slide bracket 128 better seen in FIG. 16. Rollers 134 are mounted at the ends of the guide channels so that flanges 132a and 132b may roll thereover during lateral translation of blade 120, Frame assembly 136 pivotally mounts wheel assembly 130 to bin 108 on trailer 102. Relative movement and positioning of wheel assembly 130 is accomplished by four independently selectively actuable cylinders. Positioning of blade assembly 114 relative to wheel assembly 130 is accomplished by further selectively actuable cylinder. In particular, pivotally mounted parallelogram members 138a and 138b are pinned to opposite sidewalls of bin 108 by corresponding universal joints 140a and 140b. Lifting cylinders 142a and 142b are selectively actuable and pivotally mounted so as to extend between corresponding parallelogram members 138a and 138b respectively and the corresponding sidewalls of bin 108. Lifting cylinders 142a and 142b may be selectively actuated so as to independently adjust the height of the free ends of parallelogram members 138a and 138b, that is, so as to adjust their position relative to trailer 102. Independent actuation of the cylinders causes blade assembly 114 to tilt to a desired angle relative to road surface 144.

Thus lifting cylinders 142a and 142b allow for inclining the blade at an inclination angle β as seen in FIG. 13.

Swing cylinder 146 is pivotally mounted at one end to the trailer frame or a wall of bin 108, and is pivotally mounted at its other end to one of the parallelogram members, illustrated as mounted to parallelogram member 138a. Selective actuation of swing cylinder 146 rotates parallelogram members 138 in radial arc I to thereby swing blade assembly 114 out from under trailer 102 so as to position, for example, blade 120 over road shoulder 144a, and so as to improve the operators' view of the material spreading operation. Parallelogram members 138 are maintained in parallel relation by pinned cross member 148. Consequently, as parallelogram members 138 are swung in radial arc I by selective actuation of swing cylinder 146, blade 120 is maintained parallel to cross member 148 and generally perpendicular to the direction of travel H as blade 120 is translated in direction J by the selective actuation of swing cylinder 146.

Translation of blade 120 as part of blade assembly 114 in direction J means that the blade and blade assembly are translated laterally outward relative to trailer 102 so as to extend blade 120 over road shoulder 144a. Blade 120 may then be tilted by angle β by the actuation of lifting cylinders 142a and 142b to provide the desired slope of road shoulder 144a. It is understood that swing cylinder 146 may be selectively actuated so as laterally extend the blade assembly from either side of trailer 102, although illustrated by way of example in FIG. 17 as being laterally translated from under the port side of the trailer.

As blade assembly 114 as translated hi direction J, so too of course wheel assembly 130 is also translated in the same direction. Wheel assembly 130 is mounted to the free ends of parallelogram members 138a and 138b by means of pinned couplings 150a and 150b better seen in FIG. 14. Selectively actuable tilt cylinder 152 is pivotally mounted at its ends so as to extend between cross member 148 and wheel assembly frame 154 better seen in FIGS. 18 and 19. Wheel 156 is mounted so as to depend from wheel frame assembly 154 by means of wheel struts 158. The height of wheel assembly frame 154 above wheel 156 may be selectively adjusted by means of hand crank 160. Selective actuation of tilt cylinder 152 tilts wheel assembly 130 and blade assembly 114 in direction K about the axis of rotation of wheel 156. Thereby allowing adjustment of the angle of attack of blade 120 relative to the ground and the inclination of the fences.

Blade slide bracket 128 is pivotally mounted to wheel assembly frame 154 by means of pins or stub axles 162. Selectively actuable blade angle cylinder 164 is pinned at its ends so as to extend between wheel assembly frame 154 and blade slide bracket 128.

Blade slide motor 166, or other actuating means, translate blade 120 laterally relative to blade slide bracket 128. In the example illustrated, blade slide motor 166 turns blade slide pulley 166a so as to run the pulley along a cable 166b. Blade slide motor 166 is rigidly mounted to blade slide bracket 128. Cable 166b is fixed at its ends to the ends of the blade and wrapped around pulley 166a so that rotating the pulley winds the blade along the cable.

Combination Adjustable Retainer Fence and Blade Extension

FIGS. 20 and 25 illustrates, respectively, a manually adjustable embodiment and a hydraulically adjustable embodiment of the combination retainer fence and blade extension 200. As before, the retainer fence provides an end cap for greater blade 120 to keep material 122 from flowing off the end of the blade retainer fence member 202 provides the end cap function when selectively positioned at right angles to the longitudinal axis of blade 120. Which member 202 is selectively positioned so as to be parallel with the longitudinal axis of blade 120, member 202 acts as an extension to the length of blade 120. In this position, member 202 may be pivoted or otherwise rotated downwardly so as to be inclined relative to blade 120, that is, so that the longitudinal axis of member 202 forms an angle relative to the longitudinal axis of blade 120. This allows material to be graded into a desired position at an angle other than the angle of inclination α of blade 120. Thus a road shoulder may be built to a slope specification in a single path where the slope specification calls for two separate slope angles. When it is desirable to move material 22 along in front of blade 120, for example, when moving material along road surface 144, member 202 will be selectively positioned so as to form a fence generally at right angles to blade 120.

As seen in FIG. 20, member 202 is positioned to function as a retainer fence generally perpendicular to blade 120. In this manually selectively positionable embodiment, member 202 has mounted thereto a square hollow sleeve 204. A correspondingly sized square tube 206 is rigidly mounted to the free end of blade 120 so as to extend generally vertically therefrom into snug sliding mating engagement journalled within and along square hollow sleeve 204. It is understood that sleeve 204 and tube 206 do not necessarily have to be square, but rather, may be shaped other than round in cross section so as to prevent rotation of sleeve 204 on tube 206. Thus, in order to manually selectively position member 202 relative to blade 120, member 202 must be lifted so as to free sleeve 204 from tube 206, then rotated relative to blade 120, for example, 90 degrees or 180 degrees, until tube 206 is aligned with sleeve 204 so flat sleeve 204 may be once again slid over tube 206.

Thus as seen in FIGS. 21–23, retainer fence member 202 may be manually rotated from the position illustrated in FIG. 20 wherein member 202 serves as an end cap on the end of blade 120, to a position wherein the longitudinal axis of member 202 is generally parallel to the longitudinal axis of blade 120 so that member 202 serves as an extension of blade 120. Blade 120 thus has a longer effective length. The end cap function of blade 202 is replaced by folding end plate 208 which is deployed from a position as seen in FIG. 20 stowed flush along member 202, to a position generally perpendicular to member 202 such as seen in FIGS. 21 and 22. The mechanism for selectively deploying end plate 208 relative to member 202 is similar to the arrangement described above in respect of square hollow sleeve 204 and square tube 206. In particular, upper and lower sections along one edge of end plate 208 are formed as square sleeves 210a and 210b. In particular sleeves 210a and 210b are spaced apart co-linear hollow sleeves along the edge of end plate 208 adjacent the free end of member 202. Square sleeves 210a and 210b snugly slide over corresponding square mating pegs 212a and 212b formed parallel with the end edge of member 202. Thus, with sleeves 210a and 210b aligned vertically over square pegs 212a and 212b respectively, accomplished by positioning sleeve 210b into cut-out 214 formed in the free end of member 202, end plate 208 may be vertically lowered so as to slide square sleeves 210 and 210b over square pegs 212a and 212b respectively thereby locking the position of end plate 208 relative to member 202.

Member 202 is pivotally mounted relative to blade 120 by means of pin or stub axle 216 rigidly mounted to, so as to protrude from, square sleeve 204. The free end of pin 216 may be secured through aperture 217 in member 202 by means of a wash and cotter as illustrated.

Inclination angle of member 202 relative to blade 120 when member 202 is pivoted about pin 216, is selectively releasably locked by means of adjustment nut and lever 218 threadably mounted onto stud 220. Stud 224 is rigidly mounted to so as to extend rigidly from a lower end of sleeve 204. Stud 224 is free to slide along slot 226 in member 202 when the adjustment nut 218 has been loosened from a friction fit against the outer surface of slot 226.

A hydraulically actuable embodiment of the combination adjustable retainer fence and blade extension is illustrated in FIGS. 24–27. As best appreciated from FIG. 24, member 202 is selectively pivotable relative to blade 120 by means of sleeve 228 rotating on shaft rod 230. Pivoting of member 202 relative to blade 120 so as to swing member 202 in direction L is accomplished by selective actuation of swing cylinder 232, shown in dotted outline in FIG. 24.

As better seen in FIG. 24a, swing cylinder 232 is rigidly pivotally mounted to a lower rear surface of blade 120. The opposition of swing cylinder 232 is rigidly mounted to the rod 234 which, advantageously, may be hollow to accommodate journalling hydraulic lines therethrough. The opposite end of the rod 234, opposite to swing cylinder 232, is pivotally mounted to link arm 236. The opposite end of link arm 236 is pivotally mounted to lever arm 238 on member 202. Consequently, selective actuation of swing cylinder 232 translates the rod 234 in direction M thereby driving the connecting linkage of link arm 236 and lever arm 238 to selectively rotate member 202 in direction L.

Member 202 may be selectively inclined relative to blade 120 as illustrated in FIGS. 25–27, by means of selective actuation of cylinder 240. It is understood that in FIG. 24, for sake of clarity, cylinder 240 is omitted. Cylinder 240 is pivotally mounted at its end closest to blade 120 to flange 242 on member 202. Sleeve 228 is rigidly mounted to flange 242 so that flange 242 is adjacent blade end cap 246. The opposite end of cylinder 240 is pivotally mounted to the free end of member 202. Selective actuation of cylinder 240 thus rotates blade 202a of member 202 about swivel pin 248 mounted to base member 202b of member 202.

Lifting Axle Shoulder Compactor

It is known in the art to provide heavy trucks, in jurisdictions where such designs are allowed, a lifting axle to increase the load capacity of the vehicle, As seen in FIG. 1, a rearmost trailer axle may be a lifting axle so that when the vehicle or trailer is not loaded to the point where the second axle is required for load bearing capacity, the axle is pneumatically elevated by being tied into the air ride suspension of the trailer or vehicle. Advantageously, the spacing between the first and second rear axles is 10 feet and the beams or frame rails supporting the rearmost, that is, the second rear axle is pivotally mounted to the rear of the first rear axle. Thus as seen in FIG. 28, lifting axle shoulder compactor 300 has second rear axle 302 pivotally mounted on frame rails 304 relative to first rear axle 306 about pivot pins 308. Second rear axle 302 and its corresponding wheels 310 may be rotated in direction N by selective actuation of hydraulic or pneumatic cylinder 312. Hydraulic or pneumatic cylinder 312 is pivotally mounted at its ends so as to extend between the trailer frame and mounting bracket 314 on cross member 316 as better seen in FIG. 29.

Lifting axle assembly 300 is elevated or lowered selectively by actuation of cylinder 312. In the lowered position, cylinder 312 applies pressure downwardly onto axle 302 and wheels 310 so as to take up some of the weight of the trailer so that when normally transporting a load in the trailer, the weight is evenly distributed between axles 302 and 306. However, when the trailer is at the work site and it is desired to use the device of the present invention to constructing or maintaining in a single pass, the last step in the operation after unloading material 22, placing material 22 with blade 120, sweeping the road surface behind the blade, and finally compacting material 22 has been deposited and graded so as to form the road shoulder.

Such compaction in ibis lifting axle embodiment is accomplished by skewing lifting axle assembly 300 laterally relative to the trailer so as to position a wheel 310, or a pair of wheels 310 where such wheels are dual wheel assemblies as hereinafter described and illustrated. Skewing of lifting axle assembly 300 is accomplished by selective actuation of cylinder 318 so as to rotate or pivot in direction O frame rails 304 in the manner of a parallelogram about frame pins 324,326 and 328. Thus laterally skewing the parallel linkage comprising frame rails 304 and cross members 316 and 330 positions axle 302 laterally outwardly of alignment with the trailer thus wheels 310 may be positioned over the road shoulder and, as hereinafter described, lowered into rolling engagement with the shoulders so as to compact the shoulder. As better seen in FIG. 29, axle 302 is pivotally mounted to cross member 330 by means of mounting bracket 332 better seen in FIG. 31. Mounting bracket 332 provides for coupled swivelling of axle 302 relative to frame rails 304 and cross member 330, and in particular, allows for rotation of mounting bracket 332 in direction P about pin 334 and allows for rotation of axle 302 relative to mounting bracket 332 in direction Q about pin 336. A pair of helical springs are mounted laterally adjacent mounting bracket 332 so as to extend between mounting plate 338 on cross member 330 and spring housings 340, which may be correspondingly sized cavities in axle 302. Springs 342 are under a compression loading when axle 302 is mounted to mounting bracket 332. Rotation of axle 302 in direction Q further compresses one of springs 342 and tensions the other spring 342 so that axle 302 is resiliently urged into parallel alignment with cross member 330. Rotation of axle 302 in direction Q about pin 336 acts to "castor" wheels 310 in a trailing position at the rearmost end of lifting axle assembly 300 to thereby inhibit damage to the assembly while the trailer is being turned into a corner.

Wheels 310 are mounted to axle 302 by means of stub axles 344. Stub axles 344 are pivotally mounted to the opposite ends of axle 302 by pins 346. Lever arms 348 are rigidly mounted to stub axles 344 and extend generally perpendicularly therefrom. Cylinders 350a and 350b are pivotally mounted at their ends between lever arms 348 and mounting flanges 352 on axle 302. Cylinders 350a and 350b are independently selectively actuable so as to independently selectively rotate wheels 310 about pins 346 in direction R. Wheels 310 are mounted, as by bolting, to mounting hubs 354.

Extendable Axle Shoulder Compact

For use on a trailer of a design, for example, illustrated in FIG. 2, the rearmost axle may be selectively laterally extendable so as to selectively laterally extend a single or dual rear assembly laterally from underneath the trailer so as to provide shoulder compaction of the roadway shoulder or so as to provide, as in the case also of the lifting axle design described above, increase trailer stability when operating the trailer on an inclined slope such as a side hill. As with the lifting axle embodiment described above, this embodiment assists in the compaction of a road shoulder for a single pass construction and compaction of such a shoulder. The extendable axle of this embodiment physically increases the distance between the laterally opposing rearmost wheel assemblies rather than, as in the lifting axle embodiment skewing the axle assembly out from underneath the trailer.

With respect to the advantage of increased stability when operating the trailer, presently it is a safety concern that the conventional heavy equipment must be operated on the edge of the road for constructing the shoulder and compacting the shoulder. In the event the shoulder collapses under the weight of the heavy equipment, the machine may roll over into the ditch. In the present invention, if the road shoulder collapses, the use of an outrigger wheel assembly may prevent such rollover. In the present embodiment, the trailer rear wheel assembly is lifted to facilitate extension or retraction of the extendable axle tube.

Thus as seen in the figures commencing with FIG. 32, a dual wheel assembly 402 is mounted on opposite ends of extendable axle assembly 400. Although depicted with dual wheel assemblies, it is understood that single wheel assemblies fall within the scope of this invention. The embodiment illustrated in FIGS. 32–41 show an extension to 404 selectively extendable in direction S so as to telescope in and out of axle housing 406 in sliding relation therewith. It is anticipated that this embodiment would be employed on one of two rear tandem axles. Consequently, it is anticipated that, and understood that a mirror image extendable axle assembly 400 would be provided in respect of the other, that is, the non-illustrated, axle of the pair of rear tandem axles. Thus, in what follows, it is understood that the same applies in a mirror image in respect of the other axle of the pair of rear tandem axles.

Axle housing 406 is rigidly mounted to the trailer frame. Both duel wheel assemblies 402 have their own independent brake assemblies 408 of conventional design. One brake assembly 408 is associated with a dual wheel assembly 402 pivotally mounted on extension tube 404 by means of tilt member 410 pivotally mounted on extension tube 404 by means of swivel pin 412. A dual wheel assembly 402 is mounted onto tilt member 410 by means of wheel hub 414.

Tilt cylinder 416 is pivotally mounted at its ends so as to extend between lever arm 418 rigidly mounted to extension tube 404 and the end of tilt member 410 opposite wheel hub 414. Selectively actuation of tilt cylinder 416 rotates tilt member 410 about swivel pin 412 in direction T.

In FIG. 34, the dual wheel assembly illustrated in FIGS. 32 and 33 as being mounted onto tilt member 410 has been removed along with the associated wheel hub 14 so as to illustrate the means by which that dual wheel assembly 402 may be unweighted prior to extension or retraction of extension tube 404 in direction S.

Frame bracket 424 is rigidly mounted so as to depend from the trailer frame. Pivot control arm 426 is pivotally mounted to frame bracket 424 at pin 428. The opposite end of pivot control arm 426 is supported between opposed airbags 430a and 430b. Airbag 430a forms part of a conventional air ride suspension. Airbag 430a when inflated forces pivot control arm downwardly so as to rotate about pin 428. Airbag 430b when inflated urges pivot control arm upwardly so as to rotate upwardly about pin 428. Axle housing 406 is pivotally mounted to pivot control arm 426 at pin 432. Pin 432 is journalled through brackets 406a and pin boss 432a better seen in FIG. 40 and illustrated in dotted outline in FIG. 36.

Inflation of airbag 430b rotates pivot control arm in direction U so as to unweight the dual wheel assembly 402 mounted onto wheel hub 414 thereby transferring the weight to the opposite dual wheel assembly 402 and to the other wheel assemblies 434 mounted on the other rear wheel tandem axle. Once the dual wheel assembly 402 which is to be extended has been unweighted by inflation of airbag 430b, extension cylinder 436 seen in the partial cutaway view of FIG. 36, is selectively actuated so as to extend extension tube 404 laterally outwardly. Tilt cylinder 416 may then be actuated so as to tilt dual wheel assembly 402 mounted on wheel hub 414 by rotation of tilt member 410 in direction T.

As seen in FIG. 41 and illustrated in dotted outline in FIG. 36, conventional torsion control arm 438 is rigidly mounted to axle housing 406 by means of conventional U-bolt 440. Bolting of axle housing 406 onto torsion control arm 438 holds the axle housing firmly relative to the trailer frame during the rotational moments exerted on axle housing 406 during breaking of dual wheel assemblies 402. Torsion control arm 438 is also pivotally mounted at its end to a frame bracket rigidly mounted to the trailer frame. In the dual wheel assembly embodiment depicted, of the upper and lower airbags 442*a* and 442*b* respectively only the upper airbag 442*a* is required as forming part of the conventional air ride suspension. The lower airbag 442*b* would be employed in the single wheel embodiment described below.

With dual wheel assembly 402 unweighted, extended laterally outwardly on extension tube 404 and inclined, if necessary, by actuation of tilt cylinder 416, airbag 430*b* may be deflated and airbag 430*a* inflated to force dual wheel assembly 402 downwardly onto the road shoulder so as to compact the shoulder as the trailer is rolled forwardly. This also provides the outrigger function described above in stabilizing the trailer on unstable shoulders or on inclined slopes such as side hills or the like.

In alternative embodiment, where it is neither desired nor required that the wheel assemblies be selectively inclined relative to the axle housing and extension tube, that is, where it is not required to incline the axis of rotation of the wheel or wheels used for compaction out of co-linear alignment with the co-linear longitudinal axes of the extension tube and axle housing, either laterally distal end of a single axle may be elevated to unweight the corresponding wheel or wheels so as to allow extension from that lateral side the corresponding wheel or wheels laterally outward of the trailer. Thus as seen in FIGS. 42*a*–46, axle tube 446 is telescopically slidably journalled within axle housing 448 so as to be selectively telescopically actuated between a retracted position shown in FIG. 42*a* and an extended position shown in FIG. 42*b*. Telescoping of axle tube 446 relative to axle housing 448 is the result of selective actuation of extension cylinder 450 seen in the partially cut away view of FIG. 43.

In FIG. 44, wheel 452*a* and its corresponding wheel hub and control arm assembly have been removed for clarity, thus exposing brace assembly 454 mounted to axle tube 446 and the remaining control arm assembly corresponding to wheel 452*b* consisting of control arm 456, U-bolt 458, and upper and lower airbags 460*a* and 460*b* respectively. Control arm 456 is pivotably mounted at a first end, opposite to a second end mounted between airbags 460*a* and 460*b* to frame bracket 462. Frame bracket 462 is rigidly mounted to the trailer frame. It is understood that a mirror image control arm assembly corresponding wheel 452*a* is mounted at the opposite end of axle housing 448, that is, adjacent wheel 452*a* when wheel 452*a* is in the retracted position.

Trailer Design

Figure 1F:
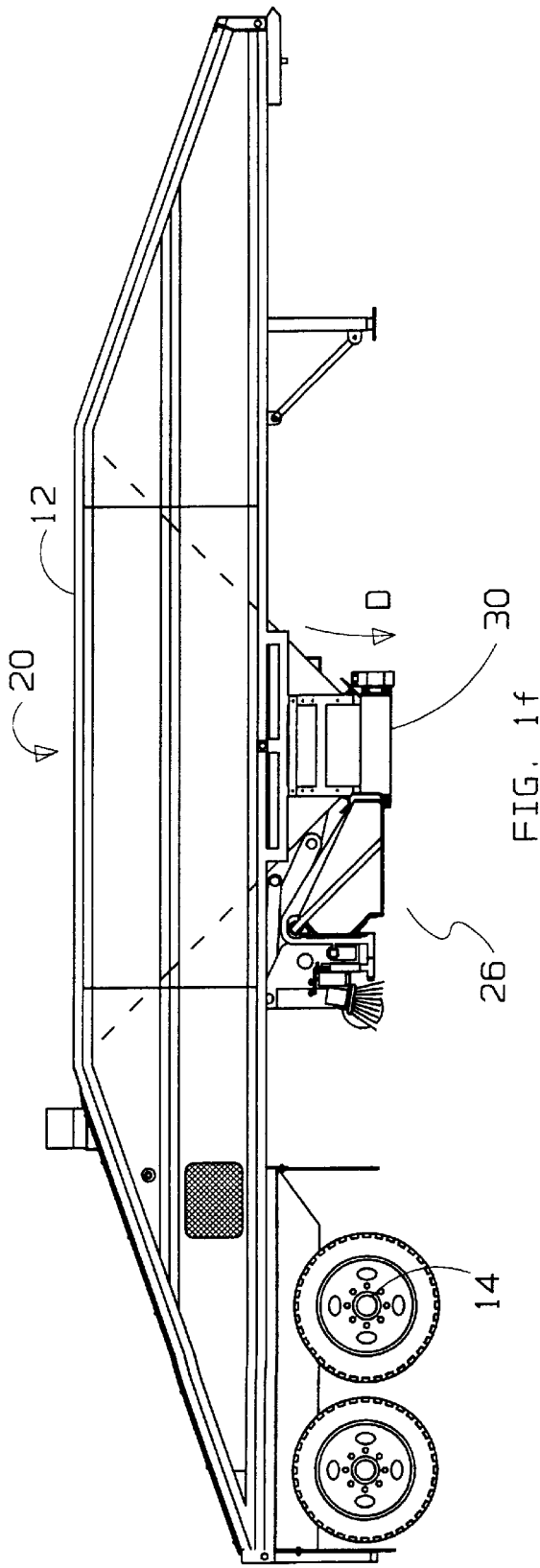
FIG. 1f is the view of FIG. 1a with the conveyor deployed.
Figure 4:
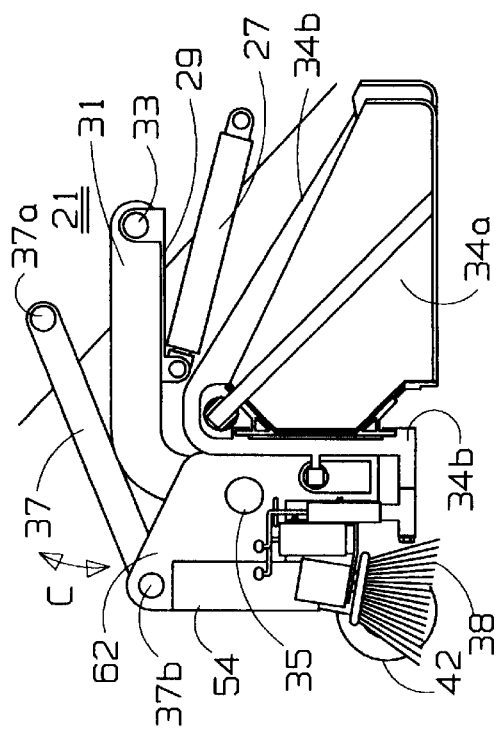
FIG. 4 is, in end elevation view, the spreading machine of FIG. 3.
Figure 3:
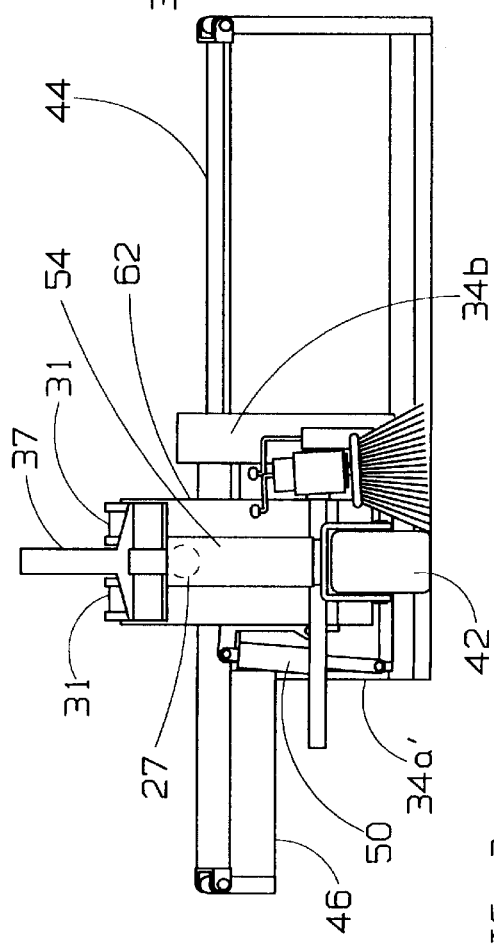
FIG. 3 is, in rear elevation view, the spreading machine of the present invention in a horizontal attitude.
Figure 3A:
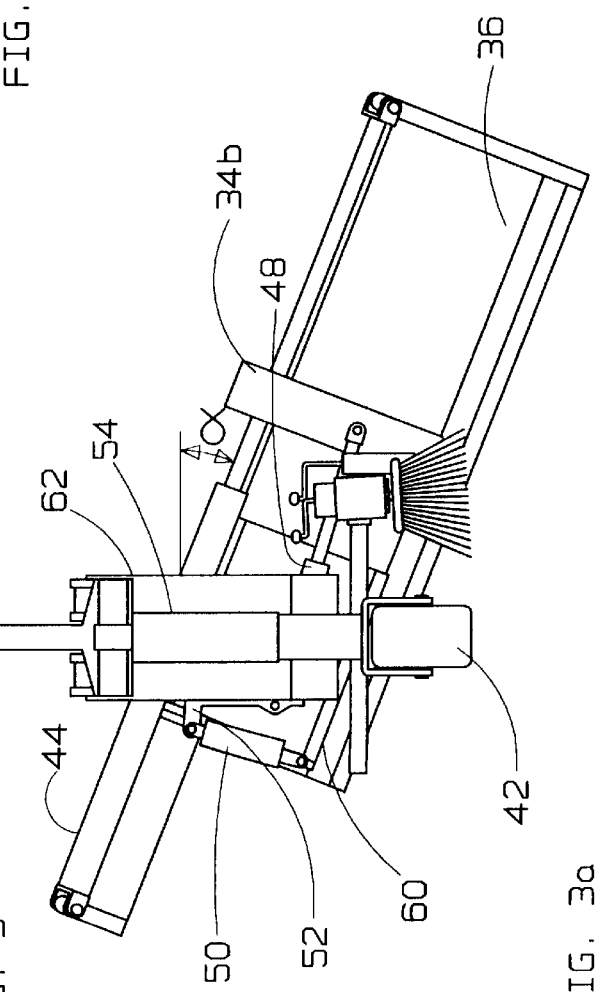
FIG. 3a is, in rear elevation view, the spreading machine of FIG. 3 in an inlined orientation relative to the trailer.
Figure 5A:
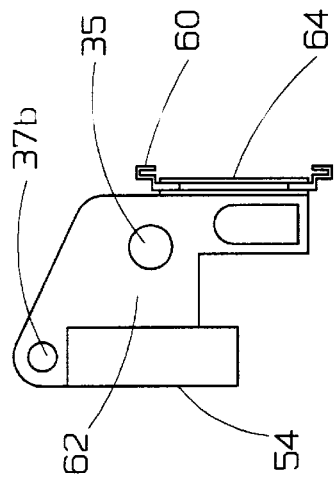
FIG. 5a is, in side elevation view, the swivel and slide bracket assembly of FIG. 5.
Figure 5:
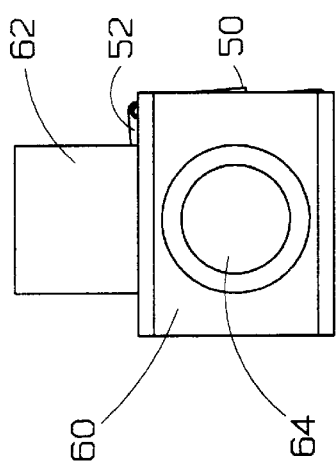
FIG. 5 is, in front elevation view, the swivel and slide bracket assembly of the spreading machine of the present invention.

The trailer 12 of FIG. 1*f* is again depicted in FIG. 47 with spreading device 26 and conveyor 30 removed so as to better see the underlying trailer frame. The various trailer frame members along the section of trailer 12 corresponding to bin 20 are seen in cross section in FIG. 48. As better seen in FIG. 49, bin 20 has fore and aft sloped walls 502 and 504 respectively. The fore and aft sloped walls define between them funnel aperture 24 which, as described above, is aligned vertically over conveyor 30 when mounted to conveyor frame 506. Conveyor frame 506 has longitudinally extending tube members 508 rigidly mounted to vertical tube members 510. Members 510 depend vertically below funnel aperture 24 and are rigidly mounted to tube members 512 which extend longitudinally horizontally so as to define the lateral sides of funnel aperture 24. Longitudinal horizontal tube members 514 form the lower base of bin 20. Longitudinally extending horizontal tube members 516 form the upper frame of bin 20. Tube members 512, 514 and 516 are rotated about their longitudinally centroidal axes 45 degrees from their conventional orientation such as seen in the conventional orientation of tube members 508. That is, tube members 512, 514 and 516 are rotated 45 degrees about their longitudinal centroidal axis so that a first pair of opposed edges of the tube members form upper and lower edges lying in a vertical plane. Disposed 90 degrees from the first and second or upper and lower edges are the remaining opposed pair of edges, now oriented as side edges lying in a horizontal plane. With tube members 516 vertically oriented relative to tube members 514, skin 526 which may, by way of example, ³⁄₁₆ inch T-1 steel, is rigidly mounted between vertically between opposed pairs of tube members 516 and 514, for example, rigidly mounted by way of welding, so as to extend in a load bearing capacity for the transfer of loading stresses between tube members 516 and 514 along bin side walls 18. Advantageously, skin 526 may be formed to provide a longitudinally extending stiffener 528 so as to generally bisect the distance between parallel tube members 516 and 514. Stiffener 528 may be formed by bending skin 526 into a stiffener having a triangular cross-section as illustrated.

Extending laterally between side walls 18 and rigidly mounted two vertical supports 530, where the vertical supports may be flat steel bars, is cross tube member 532. Cross tube member 532 is also oriented so as to present upper and lower vertically aligned edges rather than in the conventional manner of tubes 508 where opposed surfaces of the tube are vertical and horizontal.

Orienting tube members 512, 514 and 516 and 532 so as to form the "diamond"-shape as illustrated in cross section, provides the advantage that material dumped into bin 20 will shed from the upper inclined surfaces rather than be left on the upper horizontal surfaces of a conventionally oriented tube member. Additionally, the diamond orientation of tube members 514 and 516 allow for the direct transfer of bending loads exerted on tube members 514 and 516 through their opposed facing upper and lower edges respectively through skin 526 which is aligned in the plane containing the opposed upper and lower edges of tubes 514 and 516. The diamond orientation of tube members 514 also allow for the lower funnel-like side walls of bin 20 to be oriented easily during manufacturing at a 45 degrees inclination inwardly of bin side walls 18 thereby facilitating gravel flow. Applicant also believes that the diamond orientation increases the effective strength of tube members 512, 514 and 516 in bending because of the increased distance between the opposed upper and lower edges of the tube members lying in a vertical plane. Consequently, for the same loading, the tubes may be made lighter, thus lightening the weight of the trailer thereby increasing the pay load capacity. The object of reducing the trailer weight is also facilitated by the diamond orientation of the two members by removing the requirement for additional flanges or the like to provide the peaked upper surfaces of the upwardly exposed two members for shedding of material dropped downwardly onto the tube members. Extending longitudinally fore and aft of bin side walls 18 as defined by tube members 514, 516 and stiffener 528, are longitudinal formed members 534 better seen in cross section FIG. 51. Formed members 534 have side surfaces 534a and 534b forming a generally right triangular cross section so that, when formed members 534 are mounted rigidly onto the trailer as seen in FIG. 47, the vertex of the triangle formed in cross section between surfaces 534a and 534b forms a laterally outwardly disposed elongate "half-diamond"-shaped member resembling the outwardly disposed faces of tube members 514, 516 and stiffener 528. With formed members 534 thus mounted so as to extend between generally the ends of tube members 514 and 516, whereby stiffener 528 generally bisects the length of formed members 534, where as seen in FIG. 51, formed members 534 may be rigidly mounted to skin 526, as by welds 538. Formed members 534 present upwardly exposed inclined generally planar surfaces 534c extending between surface 534a and flange 534d oriented perpendicularly to planar surface 534c.

In jurisdictions where it is required, planar surfaces 534c thus provide a mounting base for covers 536 such as made of wood, aluminum or the like, so as to extend laterally between formed members 534, such covers prohibiting access of loose material into engine compartment 40, the wheel suspension assemblies, or otherwise into the framework of the trailer. Adjustment plates 540, which may be steel flat bar, may be used to provide a filler between the upper edges of skin 526 and the inner surface of formed members 534.

At the juncture between formed members 534 and tube members 514, end members or beams 542a and 542b may be provided, where end member 542a is better seen in FIG. 52. End member 542a contributes in transferring the trailer weight onto the suspension for the rear wheels. End member 542b contributes in transferring the trailer weight onto the pickup plate 544.

Formed members or rails 534 may be formed by breaking ¼ inch steel sheet plate, for example, in a press break.

As best seen in FIGS. 52–55, tube cross members 546 extend laterally between tube members 514. Channel members 548 and forms 550 also extend laterally between tubes 514, more particularly between opposed fenders 552. Fenders 552 serve as a load bearing frame. As seen in partially exploded view in FIG. 54, the lower surfaces of forms 550 rest on horizontal fender surfaces 552a. Tube cross members 546 rest in channels along the top of forms 550.

As better seen in FIG. 55, end member 542a consists of generally vertical formed plate 554 which may be ⅜ inch steel plate deflected 45 degrees along its upper edge so as to mount rigidly to an end of formed members 534. Formed plate 554 is rigidly mounted to tube cross member 556. Channel member 548a is rigidly mounted to so as to depend from tube cross member 556. Channel member 548a rests on fender horizontal surfaces 552a so as to extend snugly between fenders 552.

As seen in FIG. 560, airbag housings 558 house airbags 460a and 460b as also seen in FIG. 44.

Fenders 552 provide a suspension frame at the rear of the trailer which also acts to prevent distortion of the trailer under load and in particular skewing distortion of the trailer.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for spreading spreadable material from a vehicle, wherein said vehicle has a bin for holding said spreadable material and said bin has a lower aperture therein for gravity feeding therethrough of said spreadable material, and wherein said vehicle has a longitudinal axis corresponding to a direction of forward motion of said vehicle, said device comprising:

when said device is mounted to said vehicle, delivery means co-operating with said lower aperture for unloading, delivery and dispensing said spreadable material selectively on either a first lateral side of said vehicle or on an opposite second lateral side of said vehicle said dispensing on either said first or second lateral sides of said vehicle at a first lateral distance selectively spaced laterally outwardly of said vehicle, a selectively inclinable blade, selectively laterally translatable a second lateral distance corresponding to said first lateral distance, said selectively inclinable blade selectively laterally translatable on mounting and translation means mountable to said vehicle, said blade mountable generally perpendicular to said longitudinal axis, said mounting and translation means when mounted to said vehicle for selectively laterally outwardly translating said blade outward of either of said first or second lateral sides corresponding to said first or second lateral sides on which said spreadable material is dispensed by said delivery means, selective inclination means for selectively inclining said blade relative to a ground surface adjacent said vehicle, elevating and lowering means co-operating with said mounting and translation means for elevating and lowering said selectively inclinable blade into proximity to, at a generally constant elevation above, said ground surface in response to lateral translation of said inclinable blade when said inclinable blade is inclined from horizontal while said vehicle is translating in said direction of forward motion.

2. The device of claim 1 wherein said selectively inclinable blade has pivotally mounted at an end thereof a second blade member selectively pivotable about a generally vertical axis of rotation between an end cap position generally perpendicular to said selectively inclinable blade so as to extend forwardly of said selectively inclinable blade in said direction of forward motion, and pivotable from said end cap position to a slope trimmer position generally co-planar with said blade.

3. The device of claim 2 wherein said second blade is selectively inclinable by selective inclination means relative to said selectively inclinable blade when said second blade is in said slope trimmer position.

4. The device of claim 3 wherein said selectively inclinable blade is selectively rotatable by said selective rotation means about a generally vertical axis of rotation so as to selectively rotate said blade out of said generally perpendicular orientation to said longitudinal axis.

5. The device of claim 1 further comprising a shoulder compactor wherein said shoulder compactor is, when mounted on said vehicle, a rear weight-bearing wheel of said vehicle, mounted on a laterally translatable member, laterally selectively translatable outwardly of said vehicle by selective lateral translation means from a weight-bearing position under said vehicle to a position extended laterally outwardly of said vehicle, wherein said position extended laterally outwardly of said vehicle said shoulder compactor may be selectively elevated or lowered by vertical actuation means into contact with said ground surface so as to compact said ground surface or stabilize said vehicle when said ground surface is an inclined side-hill.

6. The device of claim 1 further comprising means for dog-tracking rear wheels of said vehicle so as to turn said rear wheels in a common direction towards a road shoulder by a common degree of rotation thereby angularly offsetting said rear wheels relative to said vehicle.

7. The device of claim 1 wherein said inclinable blade further comprises an inner retainer member extending forwardly perpendicular to said blade and selectively positionable relative to said blade along said blade, said inner retainer member positionable along said blade so as to be adjacent a road edge when said blade is extended over a road shoulder adjacent said road edge, said inner retainer member slidably mounted on said blade and co-operating with said elevating and lowering means so that when said inner retainer is adjacent a road edge and said blade is rotated so as to change its inclination, said blade is elevated or lowered to maintain said generally constant elevation.

8. The device of claim 7 wherein said inner retainer member co-operates with said elevating and lowering means by means of an arm, said arm mounted to said inner retainer member so that as said blade is inclined said arm is rotated out of a horizontal alignment, said elevating and lowering means including a hydraulic valve co-operating with said arm so as to trigger a hydraulic actuator hydraulically actuating, thereby elevating or lowering, said blade in response to said arm being rotated out of said horizontal alignment.

9. A device for spreading spreadable material from a vehicle, wherein said vehicle has a bin for holding said spreadable material and said bin has a lower aperture therein for gravity feeding therethrough of said spreadable material, and wherein said vehicle has a longitudinal axis corresponding to a direction of forward motion of said vehicle, said device comprising:

when said device is mounted to said vehicle, delivery means co-operating with said lower aperture for unloading, delivery and dispensing said spreadable material from a lateral side of said vehicle at a first lateral distance selectively spaced laterally outwardly of said vehicle, a selectively inclinable blade, selectively laterally translatable a second lateral distance corresponding to said first lateral distance, said selectively inclinable blade selectively laterally translatable on mounting and translation means mountable to said vehicle, said blade mountable generally perpendicular to said longitudinal axis, said mounting and translation means when mounted to said vehicle for selectively laterally outwardly translating said blade outward of said lateral side, selective inclination means for selectively inclining said blade relative to a ground surface adjacent said vehicle, elevating and lowering means co-operating with said mounting and translation means for elevating and lowering said selectively inclinable blade into proximity to, at a generally constant elevation above, said ground surface in response to lateral translation of said inclinable blade while said inclinable blade is inclined from horizontal when said vehicle is translating in said direction of forward motion, wherein said selectively inclinable blade has pivotally mounted at an end thereof a second blade member selectively pivotable about a generally vertical axis of rotation between an end cap position generally perpendicular to said selectively inclinable blade so as to extend forwardly of said selectively inclinable blade in said direction of forward motion, and pivotable from said end cap position to a slope trimmer position generally co-planar with said blade.

10. The device of claim 9, wherein said second blade is selectively inclinable by selective inclination means relative to said selectively inclinable blade when said second blade is in said slope trimmer position.

11. The device of claim 10, wherein said selectively inclinable blade is selectively rotatable by said selective rotation means about a generally vertical axis of rotation so as to selectively rotate said blade out of said generally perpendicular orientation to said longitudinal axis.

\* \* \* \* \*